United States Patent
Kliner et al.

(10) Patent No.: US 10,732,439 B2
(45) Date of Patent: Aug. 4, 2020

(54) FIBER-COUPLED DEVICE FOR VARYING BEAM CHARACTERISTICS

(71) Applicant: nLIGHT, Inc., Vancouver, WA (US)

(72) Inventors: Dahv A. V. Kliner, Portland, OR (US); Roger L. Farrow, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/939,064

(22) Filed: Mar. 28, 2018

(65) Prior Publication Data
US 2018/0217409 A1 Aug. 2, 2018

Related U.S. Application Data

(63) Continuation-in-part of application No. PCT/US2017/034848, filed on May 26, 2017, and a
(Continued)

(51) Int. Cl.
*G02F 1/01* (2006.01)
*B23K 26/067* (2006.01)
(Continued)

(52) U.S. Cl.
CPC .......... *G02F 1/0115* (2013.01); *B23K 26/067* (2013.01); *G02B 6/14* (2013.01);
(Continued)

(58) Field of Classification Search
CPC .................................................... G02F 1/0115
See application file for complete search history.

(56) References Cited

U.S. PATENT DOCUMENTS 3,388,461 A 6/1968 Lins
4,138,190 A 2/1979 Bryngdahl
(Continued)

FOREIGN PATENT DOCUMENTS

CA 2637535 8/2007
CN 1217030 C 8/2005
(Continued)

OTHER PUBLICATIONS

Bergmann et al., Effects of diode laser superposition on pulsed laser welding of Aluminum, Lasers in Manufacturing Conference 2013, Physics Procedia 41 ( 2013 ) 180-189 (Year: 2013).*
(Continued)

*Primary Examiner* — Peter Radkowski
(74) *Attorney, Agent, or Firm* — Klarquist Sparkman, LLP

(57) ABSTRACT

Disclosed herein are methods, apparatus, and systems for providing an optical beam delivery system, comprising an optical fiber including a first length of fiber comprising a first RIP formed to enable, at least in part, modification of one or more beam characteristics of an optical beam by a perturbation assembly arranged to modify the one or more beam characteristics, the perturbation assembly coupled to the first length of fiber or integral with the first length of fiber, or a combination thereof and a second length of fiber coupled to the first length of fiber and having a second RIP formed to preserve at least a portion of the one or more beam characteristics of the optical beam modified by the perturbation assembly within one or more first confinement regions. The optical beam delivery system may include an optical system coupled to the second length of fiber including one or more free-space optics configured to receive and transmit an optical beam comprising the modified one or more beam characteristics.

23 Claims, 16 Drawing Sheets

Related U.S. Application Data continuation-in-part of application No. 15/607,411, filed on May 26, 2017, now Pat. No. 10,295,845, and a continuation-in-part of application No. 15/607,399, filed on May 26, 2017, and a continuation-in-part of application No. 15/607,410, filed on May 26, 2017.

(60) Provisional application No. 62/401,650, filed on Sep. 29, 2016.

(51) Int. Cl.
| | | |
|---|---|---|
| *G02B 6/26* | (2006.01) | |
| *G02B 27/09* | (2006.01) | |
| *G02B 6/42* | (2006.01) | |
| *G02B 6/14* | (2006.01) | |
| *G02B 6/12* | (2006.01) | |
| *G02B 6/036* | (2006.01) | |
| *G02B 6/028* | (2006.01) | |

(52) U.S. Cl.
CPC ............ *G02B 6/262* (2013.01); *G02B 6/4296* (2013.01); *G02B 27/0933* (2013.01); *G02B 6/0281* (2013.01); *G02B 6/0365* (2013.01); *G02B 6/03616* (2013.01); *G02B 6/03627* (2013.01); *G02B 6/03633* (2013.01); *G02B 6/03638* (2013.01); *G02B 6/03688* (2013.01); *G02B 2006/12121* (2013.01)

(56) References Cited

U.S. PATENT DOCUMENTS

| | | | | |
|---|---|---|---|---|
| 4,252,403 | A * | 2/1981 | Salisbury | G02B 6/262 |
| | | | | 385/124 |
| 4,266,851 | A * | 5/1981 | Salisbury | G02B 6/2551 |
| | | | | 250/227.24 |
| 4,475,027 | A * | 10/1984 | Pressley | B23K 26/0732 |
| | | | | 219/121.6 |
| 4,475,789 | A | 10/1984 | Kahn | |
| 4,713,518 | A | 12/1987 | Yamazaki et al. | |
| 4,863,538 | A | 9/1989 | Deckard | |
| 4,998,797 | A | 3/1991 | van den Bergh et al. | |
| 5,008,555 | A | 4/1991 | Mundy | |
| 5,153,773 | A * | 10/1992 | Muraki | G02B 3/0056 |
| | | | | 359/211.1 |
| 5,252,991 | A | 10/1993 | Storlie et al. | |
| 5,319,195 | A | 6/1994 | Jones et al. | |
| 5,463,497 | A | 10/1995 | Muraki et al. | |
| 5,475,415 | A * | 12/1995 | Noethen | B41J 2/45 |
| | | | | 347/238 |
| 5,509,597 | A | 4/1996 | Laferriere | |
| 5,523,543 | A | 6/1996 | Hunter, Jr. et al. | |
| 5,745,284 | A | 4/1998 | Goldberg et al. | |
| 5,748,824 | A | 5/1998 | Smith | |
| 5,818,630 | A | 10/1998 | Fermann et al. | |
| 5,864,430 | A * | 1/1999 | Dickey | B23K 26/073 |
| | | | | 219/121.69 |
| 5,903,696 | A | 5/1999 | Krivoshlykov | |
| 5,909,306 | A | 6/1999 | Goldberg et al. | |
| 5,932,119 | A | 8/1999 | Kaplan et al. | |
| 5,986,807 | A * | 11/1999 | Fork | G02B 5/1876 |
| | | | | 359/566 |
| 5,999,548 | A | 12/1999 | Mori et al. | |
| 6,072,184 | A | 6/2000 | Okino et al. | |
| 6,132,104 | A | 10/2000 | Bliss et al. | |
| 6,265,710 | B1 | 7/2001 | Miller et al. | |
| 6,330,382 | B1 | 12/2001 | Harshbarger et al. | |
| RE37,585 | E | 3/2002 | Mourou et al. | |
| 6,353,203 | B1 | 3/2002 | Hokodate et al. | |
| 6,362,004 | B1 | 3/2002 | Noblett | |
| 6,426,840 | B1 | 7/2002 | Partanen et al. | |
| 6,433,301 | B1 * | 8/2002 | Dunsky | B23K 26/073 |
| | | | | 219/121.67 |
| 6,434,177 | B1 | 8/2002 | Jurgensen | |
| 6,483,973 | B1 * | 11/2002 | Mazzarese | H01S 3/06708 |
| | | | | 372/6 |
| 6,490,376 | B1 | 12/2002 | Au et al. | |
| 6,496,301 | B1 * | 12/2002 | Koplow | G02B 6/14 |
| | | | | 359/337 |
| 6,542,665 | B2 | 4/2003 | Reed et al. | |
| 6,556,340 | B1 | 4/2003 | Wysocki et al. | |
| 6,577,314 | B1 | 6/2003 | Yoshida et al. | |
| 6,639,177 | B2 * | 10/2003 | Ehrmann | B23K 26/032 |
| | | | | 219/121.68 |
| 6,671,293 | B2 | 12/2003 | Kopp et al. | |
| 6,711,918 | B1 | 3/2004 | Kliner et al. | |
| 6,724,528 | B2 | 4/2004 | Koplow et al. | |
| 6,772,611 | B2 | 8/2004 | Kliner et al. | |
| 6,777,645 | B2 | 8/2004 | Ehrmann et al. | |
| 6,779,364 | B2 * | 8/2004 | Tankala | C03B 37/01211 |
| | | | | 65/390 |
| 6,801,550 | B1 | 10/2004 | Snell et al. | |
| 6,825,974 | B2 | 11/2004 | Kliner et al. | |
| 6,839,163 | B1 | 1/2005 | Jakobson et al. | |
| 6,882,786 | B1 | 4/2005 | Kliner et al. | |
| 6,895,154 | B2 | 5/2005 | Johnson et al. | |
| 6,917,742 | B2 | 7/2005 | Po | |
| 6,941,053 | B2 | 9/2005 | Lauzon et al. | |
| 6,963,062 | B2 | 11/2005 | Cyr et al. | |
| 6,989,508 | B2 * | 1/2006 | Ehrnnann; Jonathan S | |
| | | | | B23K 26/032 |
| | | | | 219/121.73 |
| 7,068,900 | B2 | 6/2006 | Croteau et al. | |
| 7,079,566 | B2 | 7/2006 | Kido et al. | |
| 7,099,533 | B1 | 8/2006 | Chenard | |
| 7,116,887 | B2 * | 10/2006 | Farroni | C03B 37/01217 |
| | | | | 385/142 |
| 7,146,073 | B2 | 12/2006 | Wan | |
| 7,148,447 | B2 | 12/2006 | Ehrmann et al. | |
| 7,151,787 | B2 | 12/2006 | Kulp et al. | |
| 7,157,661 | B2 * | 1/2007 | Amako | B23K 26/0608 |
| | | | | 219/121.73 |
| 7,170,913 | B2 | 1/2007 | Araujo et al. | |
| 7,184,630 | B2 | 2/2007 | Kwon et al. | |
| 7,235,150 | B2 | 6/2007 | Bischel et al. | |
| 7,257,293 | B1 * | 8/2007 | Fini | G02B 6/02 |
| | | | | 385/123 |
| 7,317,857 | B2 | 1/2008 | Manyam et al. | |
| 7,349,123 | B2 | 3/2008 | Clarke et al. | |
| 7,359,604 | B2 | 4/2008 | Po | |
| 7,373,070 | B2 | 5/2008 | Wetter et al. | |
| 7,382,389 | B2 | 6/2008 | Cordingley et al. | |
| 7,394,476 | B2 | 7/2008 | Cordingley et al. | |
| 7,421,175 | B2 | 9/2008 | Varnham | |
| 7,463,805 | B2 * | 12/2008 | Li | H01S 3/06708 |
| | | | | 385/123 |
| 7,526,166 | B2 * | 4/2009 | Bookbinder | G02B 6/02366 |
| | | | | 385/123 |
| 7,527,977 | B1 | 5/2009 | Fruetel et al. | |
| 7,537,395 | B2 * | 5/2009 | Savage-Leuchs | G02B 6/4296 |
| | | | | 372/6 |
| 7,592,568 | B2 | 9/2009 | Varnham et al. | |
| 7,593,435 | B2 | 9/2009 | Gapontsev et al. | |
| 7,748,913 | B2 | 7/2010 | Oba | |
| 7,764,854 | B2 | 7/2010 | Fini | |
| 7,781,778 | B2 | 8/2010 | Moon et al. | |
| 7,783,149 | B2 | 8/2010 | Fini | |
| 7,835,608 | B2 | 11/2010 | Minelly et al. | |
| 7,839,901 | B2 | 11/2010 | Meleshkevich et al. | |
| 7,876,495 | B1 * | 1/2011 | Minelly | C03B 37/0122 |
| | | | | 359/341.1 |
| 7,880,961 | B1 | 2/2011 | Feve et al. | |
| 7,920,767 | B2 | 4/2011 | Fini | |
| 7,924,500 | B1 * | 4/2011 | Minelly | G02B 6/023 |
| | | | | 359/341.1 |
| 7,925,125 | B2 | 4/2011 | Cyr et al. | |
| 7,955,905 | B2 | 6/2011 | Cordingley et al. | |
| 7,955,906 | B2 | 6/2011 | Cordingley et al. | |
| 8,027,555 | B1 | 9/2011 | Kliner et al. | |
| 8,071,912 | B2 | 12/2011 | Costin, Sr. et al. | |
| 8,184,363 | B2 * | 5/2012 | Rothenberg | G02B 6/02042 |
| | | | | 359/349 |

(56) References Cited

U.S. PATENT DOCUMENTS

| | | | |
|---|---|---|---|
| 8,217,304 B2 | 7/2012 | Cordingley et al. | |
| 8,237,788 B2 | 8/2012 | Cooper et al. | |
| 8,243,764 B2 | 8/2012 | Tucker et al. | |
| 8,251,475 B2 | 8/2012 | Murray et al. | |
| 8,269,108 B2 | 9/2012 | Kunishi et al. | |
| 8,270,441 B2 | 9/2012 | Rogers et al. | |
| 8,270,445 B2 | 9/2012 | Morasse et al. | |
| 8,278,591 B2 | 10/2012 | Chouf et al. | |
| 8,288,683 B2 | 10/2012 | Jennings et al. | |
| 8,310,009 B2 | 11/2012 | Saran et al. | |
| 8,317,413 B2 | 11/2012 | Fisher et al. | |
| 8,362,391 B2 | 1/2013 | Partlo et al. | |
| 8,395,084 B2 | 3/2013 | Tanaka | |
| 8,414,264 B2 | 4/2013 | Bolms et al. | |
| 8,433,161 B2 | 4/2013 | Langseth et al. | |
| 8,442,303 B2 | 5/2013 | Cheng et al. | |
| 8,472,099 B2 | 6/2013 | Fujino et al. | |
| 8,509,577 B2 | 8/2013 | Liu | |
| 8,526,110 B1 | 9/2013 | Honea et al. | |
| 8,537,871 B2 | 9/2013 | Saracco | |
| 8,542,145 B2 | 9/2013 | Galati | |
| 8,542,971 B2 | 9/2013 | Chatigny | |
| 8,593,725 B2 | 11/2013 | Kliner et al. | |
| 8,711,471 B2* | 4/2014 | Liu | G02B 6/14 359/337 |
| 8,728,591 B2* | 5/2014 | Inada | G02B 1/04 428/1.31 |
| 8,755,649 B2 | 6/2014 | Yilmaz et al. | |
| 8,755,660 B1 | 6/2014 | Minelly | |
| 8,774,237 B2 | 7/2014 | Maryashin et al. | |
| 8,781,269 B2 | 7/2014 | Huber et al. | |
| 8,809,734 B2 | 8/2014 | Cordingley et al. | |
| 8,835,804 B2 | 9/2014 | Farmer et al. | |
| 8,873,134 B2 | 10/2014 | Price et al. | |
| 8,947,768 B2 | 2/2015 | Kliner et al. | |
| 8,948,218 B2 | 2/2015 | Gapontsev et al. | |
| 8,953,914 B2 | 2/2015 | Genier | |
| 9,014,220 B2 | 4/2015 | Minelly et al. | |
| 9,136,663 B2 | 9/2015 | Taya | |
| 9,140,873 B2 | 9/2015 | Minelly | |
| 9,158,066 B2 | 10/2015 | Fini et al. | |
| 9,170,359 B2 | 10/2015 | Van Bommel et al. | |
| 9,170,367 B2* | 10/2015 | Messerly | G02B 6/02 |
| 9,207,395 B2 | 12/2015 | Fini et al. | |
| 9,217,825 B2 | 12/2015 | Ye et al. | |
| 9,250,390 B2 | 2/2016 | Muendel et al. | |
| 9,310,560 B2 | 4/2016 | Chann et al. | |
| 9,322,989 B2* | 4/2016 | Fini | G02B 6/0288 |
| 9,325,151 B1* | 4/2016 | Fini | H01S 3/102 |
| 9,339,890 B2* | 5/2016 | Woods | B23K 26/06 |
| 9,366,887 B2* | 6/2016 | Tayebati | G02F 1/295 |
| 9,397,466 B2 | 7/2016 | McComb et al. | |
| 9,431,786 B2 | 8/2016 | Savage-Leuchs | |
| 9,442,252 B2 | 9/2016 | Genier | |
| 9,507,084 B2 | 11/2016 | Fini et al. | |
| 9,537,042 B2 | 1/2017 | Dittli et al. | |
| 9,547,121 B2 | 1/2017 | Hou et al. | |
| 9,634,462 B2 | 4/2017 | Kliner et al. | |
| 9,837,783 B2 | 12/2017 | Kliner et al. | |
| 10,048,661 B2 | 8/2018 | Arthur et al. | |
| 10,112,262 B2 | 10/2018 | Cheverton et al. | |
| 10,207,489 B2 | 2/2019 | Dave et al. | |
| 2001/0050364 A1 | 12/2001 | Tanaka et al. | |
| 2002/0097963 A1 | 7/2002 | Ukechi et al. | |
| 2002/0146202 A1* | 10/2002 | Reed | A61B 5/0084 385/34 |
| 2002/0158052 A1* | 10/2002 | Ehrmann | B23K 26/032 219/121.69 |
| 2002/0176676 A1 | 11/2002 | Johnson et al. | |
| 2003/0031407 A1 | 2/2003 | Weisberg et al. | |
| 2003/0059184 A1* | 3/2003 | Tankala | C03B 37/01211 385/123 |
| 2003/0095578 A1* | 5/2003 | Kopp | G02B 6/02085 372/6 |
| 2003/0118305 A1 | 6/2003 | Reed et al. | |
| 2003/0213998 A1 | 11/2003 | Hsu et al. | |
| 2003/0219208 A1 | 11/2003 | Kwon et al. | |
| 2004/0013379 A1 | 1/2004 | Johnson et al. | |
| 2004/0086245 A1* | 5/2004 | Farroni | C03B 37/01217 385/123 |
| 2004/0112634 A1 | 6/2004 | Tanaka et al. | |
| 2004/0207936 A1 | 10/2004 | Yamamoto et al. | |
| 2004/0208464 A1* | 10/2004 | Po | G02B 6/032 385/123 |
| 2005/0002607 A1 | 1/2005 | Neuhaus et al. | |
| 2005/0017156 A1* | 1/2005 | Ehrnnann Jonathan S | B23K 26/032 250/216 |
| 2005/0027288 A1 | 2/2005 | Oyagi et al. | |
| 2005/0041697 A1 | 2/2005 | Seifert et al. | |
| 2005/0168847 A1 | 8/2005 | Sasaki | |
| 2005/0185892 A1 | 8/2005 | Kwon et al. | |
| 2005/0233557 A1 | 10/2005 | Tanaka et al. | |
| 2005/0259944 A1 | 11/2005 | Anderson et al. | |
| 2005/0265678 A1* | 12/2005 | Manyam | G02B 6/02033 385/127 |
| 2005/0271340 A1 | 12/2005 | Weisberg et al. | |
| 2006/0024001 A1 | 2/2006 | Kobayashi | |
| 2006/0054606 A1* | 3/2006 | Amako | B23K 26/0608 219/121.73 |
| 2006/0067632 A1 | 3/2006 | Broeng et al. | |
| 2006/0219673 A1 | 10/2006 | Varnham et al. | |
| 2006/0275705 A1 | 12/2006 | Dorogy et al. | |
| 2006/0291788 A1 | 12/2006 | Po | |
| 2007/0075060 A1 | 4/2007 | Shedlov et al. | |
| 2007/0104436 A1* | 5/2007 | Li | H01S 3/06708 385/125 |
| 2007/0104438 A1* | 5/2007 | Varnham | H01S 3/06708 385/126 |
| 2007/0147751 A1* | 6/2007 | Fini | G02B 6/02009 385/123 |
| 2007/0178674 A1* | 8/2007 | Imai | B23K 26/0604 438/487 |
| 2007/0195850 A1* | 8/2007 | Schluter | H01S 5/4025 372/50.124 |
| 2007/0215820 A1 | 9/2007 | Cordingley et al. | |
| 2008/0037604 A1* | 2/2008 | Savage-Leuchs | G02B 6/4296 372/44.01 |
| 2008/0141724 A1 | 6/2008 | Fuflyigin | |
| 2008/0181567 A1* | 7/2008 | Bookbinder | G02B 6/02366 385/127 |
| 2008/0246024 A1 | 10/2008 | Touwslager et al. | |
| 2009/0034059 A1* | 2/2009 | Fini | G02B 6/02023 359/341.3 |
| 2009/0059353 A1* | 3/2009 | Fini | G02B 6/02009 359/341.3 |
| 2009/0080835 A1 | 3/2009 | Frith | |
| 2009/0122377 A1 | 5/2009 | Wagner | |
| 2009/0127477 A1* | 5/2009 | Tanaka | B23K 26/0738 250/492.22 |
| 2009/0152247 A1 | 6/2009 | Jennings et al. | |
| 2009/0154512 A1 | 6/2009 | Simons et al. | |
| 2009/0175301 A1 | 7/2009 | Li et al. | |
| 2009/0274833 A1 | 11/2009 | Li | |
| 2009/0297108 A1 | 12/2009 | Ushiwata et al. | |
| 2009/0314752 A1 | 12/2009 | Manens et al. | |
| 2010/0025387 A1 | 2/2010 | Arai et al. | |
| 2010/0067013 A1 | 3/2010 | Howieson et al. | |
| 2010/0067860 A1 | 3/2010 | Ikeda et al. | |
| 2010/0129029 A1 | 5/2010 | Westbrook | |
| 2010/0150186 A1 | 6/2010 | Mizuuchi | |
| 2010/0163537 A1* | 7/2010 | Furuta | B23K 26/38 219/121.72 |
| 2010/0225974 A1 | 9/2010 | Sandstrom | |
| 2010/0230665 A1 | 9/2010 | Verschuren et al. | |
| 2011/0032602 A1* | 2/2011 | Rothenberg | G02B 6/02042 359/341.1 |
| 2011/0058250 A1* | 3/2011 | Liu | G02B 6/14 359/341.3 |
| 2011/0080476 A1 | 4/2011 | Dinauer et al. | |
| 2011/0091155 A1 | 4/2011 | Yilmaz et al. | |

(56) References Cited

U.S. PATENT DOCUMENTS

| | | |
|---|---|---|
| 2011/0127697 A1 | 6/2011 | Milne |
| 2011/0133365 A1 | 6/2011 | Ushimaru et al. |
| 2011/0163077 A1* | 7/2011 | Partlo ............ B23K 26/0732 |
| | | 219/121.66 |
| 2011/0187025 A1 | 8/2011 | Costin, Sr. |
| 2011/0248005 A1 | 10/2011 | Briand et al. |
| 2011/0278277 A1 | 11/2011 | Stork Genannt Wersborg |
| 2011/0279826 A1 | 11/2011 | Miura et al. |
| 2011/0297229 A1* | 12/2011 | Gu ................ G02B 6/4298 |
| | | 136/259 |
| 2011/0305256 A1 | 12/2011 | Chann |
| 2012/0002919 A1 | 1/2012 | Liu |
| 2012/0009511 A1 | 1/2012 | Dmitriev |
| 2012/0051084 A1 | 3/2012 | Yalin et al. |
| 2012/0051692 A1 | 3/2012 | Seo |
| 2012/0082410 A1* | 4/2012 | Peng ................ G02B 6/02304 |
| | | 385/11 |
| 2012/0127097 A1 | 5/2012 | Gaynor et al. |
| 2012/0145685 A1 | 6/2012 | Ream et al. |
| 2012/0148823 A1 | 6/2012 | Chu |
| 2012/0156458 A1 | 6/2012 | Chu |
| 2012/0168411 A1* | 7/2012 | Farmer ............ G02B 19/0052 |
| | | 219/121.67 |
| 2012/0262781 A1 | 10/2012 | Price et al. |
| 2012/0295071 A1 | 11/2012 | Sato |
| 2012/0301733 A1 | 11/2012 | Eckert et al. |
| 2012/0301737 A1 | 11/2012 | Labelle et al. |
| 2012/0321262 A1 | 12/2012 | Goell et al. |
| 2012/0329974 A1* | 12/2012 | Inada ................ G02B 1/04 |
| | | 527/303 |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0038923 A1 | 2/2013 | Jespersen et al. |
| 2013/0087694 A1 | 4/2013 | Creeden et al. |
| 2013/0095260 A1 | 4/2013 | Bovatsek et al. |
| 2013/0146569 A1* | 6/2013 | Woods ................ B23K 26/06 |
| | | 219/121.64 |
| 2013/0148925 A1* | 6/2013 | Muendel ............ G02B 6/32 |
| | | 385/27 |
| 2013/0202264 A1* | 8/2013 | Messerly ............ G02B 6/02 |
| | | 385/123 |
| 2013/0223792 A1* | 8/2013 | Huber ................ B23K 26/073 |
| | | 385/18 |
| 2013/0228442 A1 | 9/2013 | Mohaptatra et al. |
| 2013/0251324 A1* | 9/2013 | Fini ................ G02B 6/02009 |
| | | 385/124 |
| 2013/0272657 A1 | 10/2013 | Salokatve |
| 2013/0299468 A1 | 11/2013 | Unrath et al. |
| 2013/0308661 A1 | 11/2013 | Nishimura et al. |
| 2013/0343703 A1* | 12/2013 | Genier ................ G02B 6/32 |
| | | 385/33 |
| 2014/0044143 A1 | 2/2014 | Clarkson et al. |
| 2014/0086526 A1 | 3/2014 | Starodubov et al. |
| 2014/0104618 A1 | 4/2014 | Potsaid et al. |
| 2014/0155873 A1 | 6/2014 | Bor |
| 2014/0177038 A1 | 6/2014 | Rrataj et al. |
| 2014/0178023 A1 | 6/2014 | Oh et al. |
| 2014/0205236 A1* | 7/2014 | Noguchi ............ G02B 6/2835 |
| | | 385/33 |
| 2014/0233900 A1 | 8/2014 | Hugonnot et al. |
| 2014/0241385 A1 | 8/2014 | Fomin et al. |
| 2014/0268310 A1 | 9/2014 | Ye et al. |
| 2014/0313513 A1 | 10/2014 | Liao |
| 2014/0332254 A1 | 11/2014 | Pellerite et al. |
| 2014/0333931 A1 | 11/2014 | Lu et al. |
| 2014/0334788 A1* | 11/2014 | Fini ................ G02B 6/0283 |
| | | 427/163.2 |
| 2015/0049987 A1 | 2/2015 | Grasso et al. |
| 2015/0104139 A1 | 4/2015 | Brunet et al. |
| 2015/0125114 A1 | 5/2015 | Genier |
| 2015/0125115 A1 | 5/2015 | Genier |
| 2015/0138630 A1 | 5/2015 | Honea et al. |
| 2015/0165556 A1 | 6/2015 | Jones et al. |
| 2015/0241632 A1 | 8/2015 | Chann et al. |
| 2015/0293300 A1 | 10/2015 | Fini et al. |
| 2015/0293306 A1 | 10/2015 | Huber et al. |
| 2015/0316716 A1* | 11/2015 | Fini ................ G02B 6/02009 |
| | | 385/124 |
| 2015/0331205 A1 | 11/2015 | Tayebati et al. |
| 2015/0349481 A1 | 12/2015 | Kliner |
| 2015/0352664 A1 | 12/2015 | Errico et al. |
| 2015/0378184 A1* | 12/2015 | Tayebati ............ G02F 1/295 |
| | | 250/492.1 |
| 2016/0013607 A1* | 1/2016 | McComb ............ H01S 3/06704 |
| | | 372/6 |
| 2016/0097903 A1 | 4/2016 | Li et al. |
| 2016/0104995 A1 | 4/2016 | Savage-Leuchs |
| 2016/0116679 A1 | 4/2016 | Muendel et al. |
| 2016/0158889 A1 | 6/2016 | Carter et al. |
| 2016/0179064 A1 | 6/2016 | Arthur et al. |
| 2016/0187646 A1 | 6/2016 | Ehrmann |
| 2016/0218476 A1 | 7/2016 | Kliner et al. |
| 2016/0285227 A1 | 9/2016 | Farrow et al. |
| 2016/0320565 A1 | 11/2016 | Brown et al. |
| 2016/0320685 A1 | 11/2016 | Tayebati et al. |
| 2017/0090119 A1 | 3/2017 | Logan et al. |
| 2017/0090462 A1 | 3/2017 | Dave et al. |
| 2017/0110845 A1 | 4/2017 | Hou et al. |
| 2017/0162999 A1 | 6/2017 | Saracco et al. |
| 2017/0271837 A1 | 9/2017 | Hemenway et al. |
| 2017/0293084 A1 | 10/2017 | Zhou et al. |
| 2017/0336580 A1 | 11/2017 | Tayebati et al. |
| 2017/0363810 A1 | 12/2017 | Holland et al. |
| 2018/0059343 A1 | 3/2018 | Kliner |
| 2018/0154484 A1 | 6/2018 | Hall |
| 2018/0203185 A1 | 7/2018 | Farrow et al. |

FOREIGN PATENT DOCUMENTS

| | | |
|---|---|---|
| CN | 1926460 | 3/2007 |
| CN | 1966224 | 5/2007 |
| CN | 101143405 | 3/2008 |
| CN | 101303269 | 11/2008 |
| CN | 101314196 | 12/2008 |
| CN | 101733561 | 6/2010 |
| CN | 101836309 | 9/2010 |
| CN | 201783759 | 4/2011 |
| CN | 102084282 | 6/2011 |
| CN | 102176104 | 9/2011 |
| CN | 102207618 | 10/2011 |
| CN | 102301200 | 12/2011 |
| CN | 102441740 | 5/2012 |
| CN | 102448623 | 5/2012 |
| CN | 101907742 B * | 7/2012 |
| CN | 102621628 | 8/2012 |
| CN | 103262367 | 8/2013 |
| CN | 104169763 | 11/2014 |
| DE | 4200587 | 4/1993 |
| DE | 203 20 269 | 4/2004 |
| DE | 10321102 | 12/2004 |
| DE | 202016004237 | 8/2016 |
| EP | 0366856 | 5/1990 |
| EP | 1266259 | 5/2011 |
| EP | 2587564 | 5/2013 |
| EP | 2642246 | 9/2013 |
| JP | H02220314 | 9/1990 |
| JP | H11-287922 | 10/1999 |
| JP | H11-344636 | 12/1999 |
| JP | 2003200286 | 7/2003 |
| JP | 2005-070608 | 3/2005 |
| JP | 2006-106227 | 4/2006 |
| JP | 2008-281395 | 11/2008 |
| JP | 2016-201558 | 12/2016 |
| KR | 10-2011-0109957 | 10/2011 |
| RU | 2008742 | 2/1994 |
| RU | 2021881 | 10/1994 |
| TW | 553430 | 9/2003 |
| TW | 200633062 | 9/2006 |
| TW | I271904 | 1/2007 |
| TW | 200707466 | 2/2007 |
| TW | 201307949 | 2/2013 |

(56) References Cited

FOREIGN PATENT DOCUMENTS

| WO | WO 1995/011100 | 4/1995 |
|---|---|---|
| WO | WO 1995/011101 | 4/1995 |
| WO | WO 2004/027477 | 4/2004 |
| WO | WO 2011/124671 | 10/2011 |
| WO | WO 2012/102655 | 8/2012 |
| WO | WO 2012/165389 | 12/2012 |
| WO | WO 2013/090236 | 6/2013 |
| WO | WO 2017/008022 | 1/2017 |
| WO | WO 2017/136831 | 8/2017 |

OTHER PUBLICATIONS

CAILabs, Canuda, Application Note, 2015 (Year: 2015).*
CAILabs, Canuda, Application note, Flexible high-power laser beam shaping (Year: 2015).*
J. M. Daniel, J. S. Chan, J. W. Kim, M. Ibsen, J. Sahu, and W. A. Clarkson, "Novel Technique for Mode Selection in a Large-Mode-Area Fiber Laser," in Conference on Lasers and Electro-Optics 2010, OSA Technical Digest (CD) (Optical Society of America, 2010), paper CWC5 (Year: 2010).*
J. M. O. Daniel, J. S. P. Chan, J. W. Kim, J. K. Sahu, M. Ibsen, and W. A. Clarkson, "Novel technique for mode selection in a multimode fiber laser," Opt. Express 19, 12434-12439 (2011) (Year: 2011).*
Faidel et al., Improvement of selective laser melting by beam shaping and minimized thermally induced effects in optical systems, 9th International Conference on Photonic Technologies LANE 2016 (Year: 2016).*
John M. Fini, "Bend-compensated design of large-mode-area fibers," Opt. Lett. 31, 1963-1965 (2006) (Year: 2006).*
John M. Fini and Jeffrey W. Nicholson, "Bend compensated large-mode-area fibers: achieving robust single-modedness with transformation optics," Opt. Express 21, 19173-19179 (2013) (Year: 2013).*
John M. Fini, "Large mode area fibers with asymmetric bend compensation," Opt. Express 19, 21866-21873 (2011) (Year: 2011).*
Garcia et al., Fast adaptive laser shaping based on multiple laser incoherent combining, Proc. SPIE 10097, High-Power Laser Materials Processing: Applications, Diagnostics, and Systems VI, 1009705 (Feb. 22, 2017); doi: 10.1117/12.2250303 (Year: 2017).*
Huang et al., "All-fiber mode-group-selective photonic lantern using graded-index multimode fibers," Opt. Express 23, 224-234 (2015) (Year: 2015).*
Jain et al., "Multi-Element Fiber Technology for Space-Division Multiplexing Applications," Opt. Express 22, 3787-3796 (2014) (Year : 2014).*
Jin et al., "Mode Coupling Effects in Ring-Core Fibers for Space-Division Multiplexing Systems," in Journal of Lightwave Technology , vol. 34, No. 14, pp. 3365-3372, Jul. 15, 15, 2016. doi: 10.1109/JLT.2016.2564991 (Year: 2016).*
King et al., Observation of keyhole-mode laser melting in laser powder-bed fusion additive manufacturing, Journal of Materials Processing Technology 214 (2014) 2915-2925 (Year: 2014).*
D. A. V. Kliner, "Novel, High-Brightness, Fibre Laser Platform for kW Materials Processing Applications," in 2015 European Conference on Lasers and Electro-Optics—European Quantum Electronics Conference, (Optical Society of America, 2015), paper CJ_11_2. (Year: 2015).*
Kliner D.A.V., Bambha R.P., Do B.T., Farrow R.L., Feve J.-P., Fox B.P., Hadley G.R., Wien G., Overview of Sandia's fiber laser program (2008) Proceedings of SPIE—The International Society for Optical Engineering, 6952 , art. No. 695202 (Year: 2008).*
Koplow et al., "Single-mode operation of a coiled multimode fiber amplifier," Opt. Lett. 25, 442-444 (2000) (Year: 2000).*
Laskin, Applying of refractive spatial beam shapers with scanning optics ICALEO, 941-947 (2011) (Year: 2011).*
Longhi et al., Self-focusing and nonlinear periodic beams in parabolic index optical fibres, Published May 4, 2004 o IOP Publishing Ltd Journal of Optics B: Quantum and Semiclassical Optics, vol. 6, No. 5 (Year: 2004).*

Mumtaz et al., Selective Laser Melting of thin wall parts using pulse shaping, Journal of Materials Processing Technology 210 (2010) 279-287 (Year: 2010).*
Putsch et al., Active optical system for laser structuring of 3D surfaces by remelting, Proc. SPIE 8843, Laser Beam Shaping XIV, 88430D (Sep. 28, 2013); doi: 10.1117/12.2023306 https://www.osapublishing.org/conference.cfm?meetingid=90&yr=2015 (Year: 2013).*
Sandia National Laboratories—Brochure (POC—D.A.V. Kliner); "Mode-Filtered Fiber Amplifier," 2007 (Year: 2007).*
SeGall et al., "Simultaneous laser mode conversion and beam combining using multiplexed volume phase elements," in Advanced Solid-State Lasers Congress, G. Huber and P. Moulton, eds., OSA Technical Digest (online) (Optical Society of America, 2013), paper AW2A.9. (Year: 2013).*
Thiel et al., Reliable Beam Positioning for Metal-based Additive Manufacturing by Means of Focal Shift Reduction, Lasers in Manufacturing Conference 2015. (Year: 2015).*
Wischeropp et al., Simulation of the effect of different laser beam intensity profiles on heat distribution in selective laser melting, Lasers in Manufacturing Conference 2015. (Year: 2015).*
Xiao et al., "Fiber coupler for mode selection and high-efficiency pump coupling," Opt. Lett. 38, 1170-1172 (2013) (Year: 2013).*
Ye et al., Mold-free fs laser shock micro forming and its plastic deformation mechanism, Optics and Lasers in Engineering 67 (2015) 74-82. (Year: 2015).*
Yu et al., Laser material processing based on non-conventional beam focusing strategies, 9th International Conference on Photonic Technologies LANE 2016 (Year: 2016).*
Zhirnov et al., Laser beam profiling: experimental study of its influence on single-track formation by selective laser melting, Mechanics & Industry 16, 709 (2015) (Year: 2015).*
Duocastella et al., Bessel and annular beams for materials processing, Laser Photonics Rev. 6, 607-621 (Year: 2012).*
Fuchs et al., Beam shaping concepts with aspheric surfaces, Proceedings vol. 9581, Laser Beam Shaping XVI; 95810L (2015) https://doi.org/10.1117/12.2186524 (Year: 2015).*
Li et al., High-quality near-field beam achieved in a high-power laser based on SLM adaptive beam-shaping system, Opt. Express 23, 681-689 (2015) (Year: 2015).*
Fleming Ove Olsen, 2011, Laser metal cutting with tailored beam patterns, available at, https://www.industrial-lasers.com/articles/print/volume-26/issue-5/features/laser-metal-cutting-with-tailored-beam-patterns.html (Year: 2011).*
Schulze et al., Mode Coupling in Few-Mode Fibers Induced by Mechanical Stress, Journal of Lightwave Technology, vol. 33, No. 21, Nov. 1, 2015 (Year: 2015).*
Neilson et al., Plastic modules for free-space optical interconnects, Applied Optics, V. 37, N. 14, 1998 (Year: 1998).*
Neilson et al., Free-space optical relay for the interconnection of multimode fibers, Applied Optics, V. 38, N. 11, 1999 (Year: 1999).*
Birks et al., The photonic lantern, Advances in Optics and Photonics 7, 107-167 (2015) (Year: 2015).*
Van Newkirk et al., Bending sensor combining multicore fiber with a mode-selective photonic lantern, Opt. Lett. 40, 5188-5191 (2015) (Year: 2015).*
Rocha, Ana. (2009). Modeling of Bend Losses in Single-Mode Optical Fibers. Conference: 7th Conference on Telecommunications—Conftele 2009 7th Conference on Telecommunications—Conftele 2009 (Year: 2009).*
Ivanov et al., Fiber-Optic Bend Sensor Based on Double Cladding Fiber, Journal of Sensors, vol. 2015, Article ID 726793. (Year: 2015).*
Oleg V Ivanov and Ivan V Zlodeev, Fiber structure based on a depressed inner cladding fiber for bend, refractive index and temperature sensing, 2014 Meas. Sci. Technol. 25 015201 (Year: 2014).*
Jollivet, Clemence, Specialty Fiber Lasers and Novel Fiber Devices, Doctoral Dissertation, University of Central Florida, 2014 (Year: 2014).*
Jollivet et al., Advances in Multi-Core Fiber Lasers, Invited Presentation, DOI: 10.1364/LAOP.2014.LM1D.3.,2014 (Year: 2014).*

(56) References Cited

OTHER PUBLICATIONS

Kosolapov et al., Hollow-core revolver fibre with a double-capillary reflective cladding, Quantum Electron. 46 267 (Year: 2016).*
Messerly, et al., Field-flattened, ring-like propagation modes, Optics Express, V. 21, N. 10, p. 12683 (Year: 2013).*
Messerly et al., Patterned flattened modes, Optics Letters, V. 38, N. 17, p. 3329 (Year: 2013).*
Salceda-Delgado et al., Compact fiber-optic curvature sensor based on super-mode interference in a seven-core fiber, Optics Letters, V. 40, N. 7, p. 1468, (Year: 2015).*
Zhang et al., Switchable multiwavelength fiber laser by using a compact in-fiber Mach-Zehnder interferometer, J. Opt. 14 (2012 (045403) (Year: 2012).*
I. V. Zlodeev and O.V. Ivanov, Transmission spectra of a double-clad fibre structure under bending, Quantum Electronics 43 (6) 535-541 (2013) (Year: 2013).*
Tam et al., An imaging fiber-based optical tweezer array for microparticle array assembly, Appl. Phys. Lett. 84, 4289 (2004); https://doi.org/10.1063/1.1753062 (Year: 2004).*
Advisory Action from U.S. Appl. No. 15/607,410, dated Sep. 24, 2018, 6 pages.
AlMangour et al., "Scanning strategies for texture and anisotropy tailoring during selective laser melting of TiC/316L stainless steel nanocomposites," *Journal of Alloys and Compounds*, 728:424-435 (Aug. 5, 2017).
Applicant-Initiated Interview Summary from U.S. Appl. No. 15/607,399, dated May 25, 2018, 3 pages.
Applicant-Initiated Interview Summary from U.S. Appl. No. 15/607,399, dated Jul. 27, 2018, 9 pages.
Applicant-Initiated Interview Summary from U.S. Appl. No. 15/607,410, dated May 25, 2018, 3 pages.
Applicant-Initiated Interview Summary from U.S. Appl. No. 15/607,410, dated Jul. 24, 2018, 9 pages.
Applicant-Initiated Interview Summary from U.S. Appl. No. 15/607,411, dated Jan. 17, 2018, 2 pages.
Applicant-Initiated Interview Summary from U.S. Appl. No. 15/607,411, dated Sep. 12, 2018, 17 pages.
Ayoola, "Study of Fundamental Laser Material Interaction Parameters in Solid and Powder Melting," Ph.D. Thesis, Cranfield University, 192 pages (May 2016).
Bertoli et al., "On the limitations of Volumetric Energy Density as a design parameter for Selective Laser Melting," *Materials and Design*, 113:331-340 (Oct. 19, 2016).
Burger et al., "Implementation of a spatial light modulator for intracavity beam shaping," *J. Opt.*, 17:1-7, (2015).
"Canunda, Application Note," CAILabs, available at: www.cailabs.com, 16 pages (Jun. 10, 2015).
"Canunda, Application Note: Flexible high-power laser beam shaping," CAILabs, available at: www.cailabs.com, 22 pages, date unknown (in a related U.S. Appl. No. 15/607,399).
Caprio, "Investigation of emission modes in the SLM of AISI 316L: modelling and process diagnosis," Ph.D. Thesis, Polytechnic University of Milan, 3 pages (Apr. 28, 2017).—Abstract only.
Chen et al., "Improving additive manufacturing processability of hard-to-process overhanging structure by selective laser melting," *Journal of Materials Processing Tech.*, 250:99-108 (Jul. 1, 2017).
Cloots et al., "Investigations on the microstructure and crack formation of IN738LC samples processed by selective laser melting using Gaussian and doughnut profiles," *Materials and Design*, 89:770-784 (2016).
DebRoy et al., "Additive manufacturing of metallic components—Process, structure and properties," *Progress in Materials Science*, 92:112-224 (2018).
Dehoff et al., "Site specific control of crystallographic grain orientation through electron beam additive manufacturing," *Materials Science and Technology*, 31:931-938 (2015).
Demir et al., "From pulsed to continuous wave emission in SLM with contemporary fiber laser sources: effect of temporal and spatial pulse overlap in part quality," *Int. J. Adv. Manuf. Technol.*, 91:2701-2714 (Jan. 10, 2017).

Dezfoli et al., "Determination and controlling of grain structure of metals after laser incidence: Theoretical approach," *Scientific Reports*, 7:1-11 (Jan. 30, 2017).
Eichenholz, "Photonic-crystal fibers have many uses," *Optoelectronics World*, 4 pages (Aug. 2004).
Faidel et al., "Improvement of selective laser melting by beam shaping and minimized thermally induced effects in optical systems," 9th International Conference on Photonic Technologies LANE 2016, pp. 1-4 (2016).
Fey, "3D Printing and International Security," PRIF Report No. 144, 47 pages (2017).
Final Office action from U.S. Appl. No. 15/607,399, dated May 3, 2018, 31 pages.
Final Office action from U.S. Appl. No. 15/607,410, dated May 11, 2018, 29 pages.
First Office Action for related Chinese Application No. 201610051671.X, dated Jun. 4, 2018, 25 pages (w/ English translation).
Florentin et al., "Shaping the light amplified in a multimode fiber," *Official Journal of the CIOMP, Light: Science & Applications*, 6:1-9 (Feb. 24, 2017).
Francis, "The Effects of Laser and Electron Beam Spot Size in Additive Manufacturing Processes," Ph.D. Thesis, Carnegie Mellon University, 191 pages (May 2017).
Fuse, "Beam Shaping for Advanced Laser Materials Processing," *Laser Technik Journal*, pp. 19-22 (Feb. 2015).
Garcia et al., "Fast adaptive laser shaping based on multiple laser incoherent combining," *Proc. of SPIE*, 10097:1009705-1-1009705-15 (Feb. 22, 2017).
Ghouse et al., "The influence of laser parameters and scanning strategies on the mechanical properties of a stochastic porous material," *Materials and Design*, 131:498-508 (2017).
Gissibl et al., "Sub-micrometre accurate free-form optics by three-dimensional printing on single-mode fibres," *Nature Communications*, 7:1-9 (Jun. 24, 2016).
Gockel et al., "Integrated melt pool and microstructure control for Ti—6Al—4V thin wall additive manufacturing," *Materials Science and Technology*, 31:912-916 (Nov. 3, 2014).
Gunenthiram et al., "Analysis of laser-melt pool-powder bed interaction during the selective laser melting of a stainless steel," *Journal of Laser Applications*, 29:022303-1-022303-8 (May 2017).
Gupta, "A Review on Layer Formation Studies in Selective Laser Melting of Steel Powders and Thin Wall Parts Using Pulse Shaping," *International Journal of Manufacturing and Material Processing*, 3:9-15 (2017).
Hafner et al., "Tailored laser beam shaping for efficient and accurate microstructuring," *Applied Physics A*, 124:111-1-111-9 (Jan. 10, 2018).
Han et al., "Selective laser melting of advanced $Al—Al_2O_3$ nanocomposites: Simulation, microstructure and mechanical properties," *Materials Science & Engineering A*, 698:162-173, (May 17, 2017).
Hansen et al., "Beam shaping to control of weldpool size in width and depth," *Physics Procedia*, 56:467-476 (2014).
Hauschild, "Application Specific Beam Profiles—New Surface and Thin-Film Refinement Processes using Beam Shaping Technologies," *Proc. of SPIE*, 10085:100850J-1-100850J-9 (Feb. 22, 2017).
Hebert, "Viewpoint: metallurgical aspects of powder bed metal additive manufacturing," *J. Mater. Sci.*, 51:1165-1175 (Nov. 18, 2015).
Heck, "Highly integrated optical phased arrays: photonic integrated circuits for optical beam shaping and beam steering," *Nanophotonics*, 6:93-107 (2017).
Hengesbach et al., "Brightness and average power as driver for advancements in diode lasers and their applications," *Proc. SPIE*, 9348, 18 pages (2015).
Huang et al., "3D printing optical engine for controlling material microstructure," *Physics Procedia*, 83:847-853 (2016).
Huang et al., "All-fiber mode-group-selective photonic lantern using graded-index multimode fibers," *Optics Express*, 23:224-234 (Jan. 6, 2015).
Injeyan et al., "Introduction to Optical Fiber Lasers," *High-Power Laser Handbook*, pp. 436-439 (2011).

(56) References Cited

OTHER PUBLICATIONS

International Search Report and Written Opinion from International Application No. PCT/US2018/024908, dated Jul. 19, 2018, 8 pages.
International Search Report and Written Opinion from International Application No. PCT/US2018/024904, dated Aug. 30, 2018, 5 pages.
Jain et al., "Multi-element fiber technology for space-division multiplexing applications," *Optics Express*, 22:3787-3796 (Feb. 11, 2014).
Ji et al., "Meta-q-plate for complex beam shaping," *Scientific Reports*, 6:1-7 (May 6, 2016).
Jin et al., "Mode Coupling Effects in Ring-Core Fibers for Space-Division Multiplexing Systems," *Journal of Lightwave Technology*, 34:3365-3372 (Jul. 15, 2016).
Kaden et al., "Selective laser melting of copper using ultrashort laser pulses," Lasers in Manufacturing Conference 2017, pp. 1-5 (2017).
Kaden et al., "Selective laser melting of copper using ultrashort laser pulses," *Applied Physics A*, 123:596-1-596-6 (Aug. 24, 2017).
Klerks et al., "Flexible beam shaping system for the next generation of process development in laser micromachining," 9th International Conference on Photonic Technologies LANE 2016, pp. 1-8 (2016).
"Lasers & Fibers," NKT Photonics, available at: https://www.nktphotonics.com/lasers-fibers/technology/photonic-crystal-fibers/, 4 pages, retrieved Feb. 13, 2018.
Lee et al., "FEM Simulations to Study the Effects of Laser Power and Scan Speed on Molten Pool Size in Additive Manufacturing," *International Journal of Mechanical and Mechatronics Engineering*, 11:1291-1295 (2017).
Li et al., "Melt-pool motion, temperature variation and dendritic morphology of Inconel 718 during pulsed-and continuous-wave laser additive manufacturing: A comparative study," *Materials and Design*, 119:351-360 (Jan. 23, 2017).
Litvin et al., "Beam shaping laser with controllable gain," *Appl. Phys. B*, 123:174-1-174-5 (May 24, 2017).
Liu et al., "Femtosecond laser additive manufacturing of YSZ," *Appl. Phys. A*, 123:293-1-293-8 (Apr. 1, 2017).
Malinauskas et al., "Ultrafast laser processing of materials: from science to industry," *Official Journal of the CIOMP, Light: Science & Applications*, 5:1-14 (2016).
Masoomi et al., "Quality part production via multi-laser additive manufacturing," *Manufacturing Letters*, 13:15-20 (May 27, 2017).
Matthews et al., "Diode-based additive manufacturing of metals using an optically-addressable light valve," *Optics Express*, 25:11788-11800 (May 15, 2017).
Meier et al., "Thermophysical Phenomena in Metal Additive Manufacturing by Selective Laser Melting: Fundamentals, Modeling, Simulation and Experimentation," available at: http://arxiv.org/pdf/1709.09510v1, pp. 1-59 (Sep. 4, 2017).
Morales-Delgado et al., "Three-dimensional microfabrication through a multimode optical fiber," available at: http://arxiv.org, 20 pages (2016).
Morales-Delgado et al., "Three-dimensional microfabrication through a multimode optical fiber," *Optics Express*, 25:7031-7045 (Mar. 20, 2017).
Naidoo et al., "Improving the laser brightness of a commercial laser system," *Proc. of SPIE*, 10036:100360V-1-100360V-8 (Feb. 3, 2017).
Ngcobo et al., "A digital laser for on-demand laser modes," *Nature Communications*, 4:1-6 (Aug. 2, 2013).
Ngcobo et al., "The digital laser," available at: http://arxiv.org, pp. 1-9 (2013).
Office action from U.S. Appl. No. 15/074,838, dated May 19, 2017, 12 pages.
Office action from U.S. Appl. No. 15/607,411, dated Jun. 12, 2018, 19 pages.
Office action from U.S. Appl. No. 15/607,399, dated Sep. 14, 2018, 19 pages.
Office action from U.S. Appl. No. 15/938,959, dated Jul. 18, 2018, 6 pages.
Okunkova et al., "Development of laser beam modulation assets for the process productivity improvement of selective laser melting," *Procedia IUTAM*, 23:177-186 (2017).
Okunkova et al., "Experimental approbation of selective laser melting of powders by the use of non-Gaussian power density distributions," *Physics Procedia*, 56:48-57 (2014). (2017).
Okunkova et al., "Study of laser beam modulation influence on structure of materials produced by additive manufacturing," *Adv. Mater. Lett.*, 7:111-115 (2016).
Pinkerton, "Lasers in Additive Manufacturing," *Optics & Laser Technology*, 78:25-32 (2016).
Prashanth et al., "Is the energy density a reliable parameter for materials synthesis by selective laser melting?" *Mater. Res. Lett.*, 5:386-390 (2017).
Putsch et al., "Active optical system for advanced 3D surface structuring by laser remelting," *Proc. of SPIE*, 9356:93560U-1-93560U-10 (Mar. 9, 2015).
Putsch et al., "Integrated optical design for highly dynamic laser beam shaping with membrane deformable mirrors," *Proc. of SPIE*, 10090:1009010-1-1009010-8 (Feb. 20, 2017).
Raghavan et al., "Localized melt-scan strategy for site specific control of grain size and primary dendrite arm spacing in electron beam additive manufacturing," *Acta Materialia*, 140:375-387 (Aug. 30, 2017).
Rashid et al., "Effect of scan strategy on density and metallurgical properties of 17-4PH parts printed by Selective Laser Melting (SLM)," *Journal of Materials Processing Tech.*, 249:502-511 (Jun. 19, 2017).
Roehling et al., "Modulating laser intensity profile ellipticity for microstructural control during metal additive manufacturing," *Acta Materialia*, 128:197-206 (2017).
Rosales-Guzman et al., "Multiplexing 200 modes on a single digital hologram," available at: http://arxiv.org/pdf/1706.06129v1, pp. 1-14 (Jun. 19, 2017).
Russell, "Photonic-Crystal Fibers," *IEEE JLT*, 24:4729-4749 (Dec. 2006).
Saint-Pierre et al., "Fast uniform micro structuring of DLC surfaces using multiple ultrashort laser spots through spatial beam shaping," *Physics Procedia*, 83:1178-1183 (2016).
Saleh et al., "Chapter 9.4 Holey and Photonic-Crystal Fibers," *Fundamentals of Photonics, Second Edition*, pp. 359-362 (2007).
Sames et al., "The metallurgy and processing science of metal additive manufacturing," *International Materials Reviews*, pp. 1-46 (2016).
SeGall et al., "Simultaneous laser mode conversion and beam combining using multiplexed volume phase elements," Advanced Solid-State Lasers Congress Technical Digest, Optical Society of America, paper AW2A.9, 3 pages (Oct. 27-Nov. 1, 2013).
Shusteff et al., "One-step volumetric additive manufacturing of complex polymer structures," *Sci. Adv.*, 3:1-7 (Dec. 8, 2017).
Smith et al., "Tailoring the thermal conductivity of the powder bed in Electron Beam Melting (EBM) Additive Manufacturing," *Scientific Reports*, 7:1-8 (Sep. 5, 2017).
Spears et al., "In-process sensing in selective laser melting (SLM) additive manufacturing," *Integrating Materials and Manufacturing Innovation*, 5:2-25 (2016).
Sundqvist et al., "Analytical heat conduction modelling for shaped laser beams," *Journal of Materials Processing Tech.*, 247:48-54 (Apr. 18, 2017).
Thiel et al., "Reliable Beam Positioning for Metal-based Additive Manufacturing by Means of Focal Shift Reduction," Lasers in Manufacturing Conference 2015, 8 pages (2015).
Tofail et al., "Additive manufacturing: scientific and technological challenges, market uptake and opportunities," *Materials Today*, pp. 1-16 (2017).
Trapp et al., "In situ absorptivity measurements of metallic powders during laser powder-bed fusion additive manufacturing," *Applied Materials Today*, 9:341-349 (2017).
Ulmanen, "The Effect of High Power Adjustable Ring Mode Fiber Laser for Material Cutting," M.S. Thesis, Tampere University of Technology, 114 pages (May 2017).

(56) References Cited

OTHER PUBLICATIONS

Van Newkirk et al., "Bending sensor combining multicore fiber with a mode-selective photonic lantern," Optics Letters, 40:5188-5191 (Nov. 15, 2015).
Valdez et al., "Induced porosity in Super Alloy 718 through the laser additive manufacturing process: Microstructure and mechanical properties," Journal of Alloys and Compounds, 725:757-764 (Jul. 22, 2017).
Wang et al., "Selective laser melting of W—Ni—Cu composite powder: Densification, microstructure evolution and nano-crystalline formation," International Journal of Refractory Metals & Hard Materials, 70:9-18 (Sep. 9, 2017).
Wetter et al., "High power cladding light strippers," Proc. of SPIE, 6873:687327-1-687327-8 (Jan. 21, 2008).
Wilson-Heid et al., "Quantitative relationship between anisotropic strain to failure and grain morphology in additively manufactured Ti—6Al—4V," Materials Science & Engineering A, 706:287-294 (Sep. 6, 2017).
Wischeropp et al., "Simulation of the effect of different laser beam intensity profiles on heat distribution in selective laser melting," Laser in Manufacturing Conference 2015, 10 pages (2015).
Xiao et al., "Effects of laser modes on Nb segregation and Laves phase formation during laser additive manufacturing of nickel-based superalloy," Materials Letters, 188:260-262 (Nov. 1, 2016).
Xu et al, "The Influence of Exposure Time on Energy Consumption and Mechanical Properties of SLM-fabricated Parts," 2017 Annual International Solid Freeform Fabrication Symposium, 7 pages (2017)—Abstract only.
Yan et al., "Formation mechanism and process optimization of nano $Al_2O_3$—$ZrO_2$ eutectic ceramic via laser engineered net shaping (LENS)," Ceramics International, 43:1-6 (2017).
Yu, "Laser Diode Beam Spatial Combining," Ph.D. Thesis, Politecnico di Torino, 106 pages (Jun. 6, 2017).
Yu et al., "Development of a 300 W 105/0.15 fiber pigtailed diode module for additive manufacturing applications," Proc. of SPIE, 10086:100860A-1-100860A-5 (Feb. 22, 2017).
Yu et al., "Laser material processing based on non-conventional beam focusing strategies," 9th International Conference on Photonic Technologies LANE 2016, pp. 1-10 (2016).
Yusuf et al., "Influence of energy density on metallurgy and properties in metal additive manufacturing," Materials Science and Technology, 33:1269-1289 (Feb. 15, 2017).
Zavala-Arredondo et al., "Diode area melting single-layer parametric analysis of 316L stainless steel powder," Int. J. Adv. Manuf. Technol., 94:2563-2576 (Sep. 14, 2017).
Zavala-Arredondo et al., "Laser diode area melting for high speed additive manufacturing of metallic components," Materials and Design, 117:305-315 (Jan. 3, 2017).
Zhirnov et al., "Laser beam profiling: experimental study of its influence on single-track formation by selective laser melting," Mechanics & Industry, 16:709-1-709-6 (2015).
Zhu et al., "Effect of processing parameters on microstructure of laser solid forming Inconel 718 superalloy," Optics and Laser Technology, 98:409-415 (Sep. 5, 2017).
Zou et al., "Adaptive laser shock micro-forming for MEMS device applications," Optics Express, 25:3875-3883 (Feb. 20, 2017).
Affine Transformation—from Wolfram MathWorld, http://mathworld.wolfram.com/AffineTransformation.html, downloaded Feb. 21, 2014, 2 pages.
Alcock et al., Element Table, Canadian Metallurgical Quarterly, 23:309-311 (1984).
Chung, "Solution-Processed Flexible Transparent Conductors Composed of Silver Nanowire Networks Embedded in Indium Tin Oxide Nanoparticle Matrices," Nano Research, 10 pages (Sep. 24, 2012).
Cui, et al., "Calibration of a laser galvanometric scanning system by adapting a camera model," Applied Optics 48(14):2632-2637 (Jun. 2009).
First Office Action from Chinese Application No. 201410455972.X, dated Jan. 26, 2016, 21 pages (with English translation).
First Office Action from Chinese Application No. 201480019324.8, dated Apr. 5, 2017, 20 pages (with English translation).
Gardner, "Precision Photolithography on Flexible Substrates," http://azorescorp.com/downloads/Articles/AZORESFlexSubstrate.pdf (prior to Jan. 30, 2013).
Giannini et al., "Anticipating, measuring, and minimizing MEMS mirror scan error to improve laser scanning microscopy's speed and accuracy," PLOS ONE, 14 pages (Oct. 3, 2017).
Grigoriyants et al., "Tekhnologicheskie protsessy lazernoy obrabotki," Moscow, izdatelstvo MGTU im. N.E. Baumana, p. 334 (2006).
International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for International Application No. PCT/US2016/063086, 6 pages, dated Mar. 23, 2017.
International Search Report and Written Opinion for International Application No. PCT/US2017/014182, 9 pages, dated Mar. 31, 2017.
International Search Report and Written Opinion for International Application No. PCT/US2018/026110, 12 pages, dated Aug. 8, 2018.
Java—Transform a triangle to another triangle—Stack Overflow, http://stackoverflow.com/questions/1114257/transform-a-triangle-to-another-triangle?1q=1, downloaded Feb. 21, 2014, 3 pages.
Kummer et al., "Method to quantify accuracy of position feedback signals of a three-dimensional two-photon laser-scanning microscope," Biomedical Optics Express, 6(10):3678-3693 (Sep. 1, 2015).
Ludtke, et al., "Calibration of Galvanometric Laser Scanners Using Statistical Learning Methods," Bildverabeitung für die Medizin, pp. 467-472 (Feb. 25, 2015).
Manakov, et al., "A Mathematical Model and Calibration Procedure for Galvanometric Laser Scanning Systems," Vision, Modeling, and Visualization, 8 pages (Jan. 2011).
Notice of Preliminary Rejection from the Korean Intellectual Property Office for related Application No. 10-2015-7025813, dated Jun. 26, 2018, 18 pages.
Official Letter and Search Report from the Taiwan Intellectual Property Office for related Application No. 102139285, 21 pages, dated Jun. 13, 2016 (with English translation).
Official Letter and Search Report from the Taiwan Intellectual Property Office for related Application No. 103106020, 21 pages, dated Apr. 20, 2016 (with English translation).
Official Letter and Search Report from the Taiwan Intellectual Property Office for related Application No. 102139285, 8 pages, dated Nov. 21, 2016 (with English translation).
Official Letter and Search Report from Taiwan Application No. 103130968, dated Dec. 20, 2016, 16 pages (with English translation).
Official Letter and Search Report from Taiwan Application No. 103106020, dated Jun. 6, 2017, 7 pages (with English translation).
Office Action (no English translation) for related Chinese Application No. 201480022179.9, 5 pages, dated Mar. 30, 2017.
Office Action (with English translation) for related Chinese Application No. 201380075745.8, 21 pages, dated Jun. 2, 2017.
Product Brochure entitled "3-Axis and High Power Scanning" by Cambridge Technology, 4 pages, downloaded Dec. 21, 2013.
Product Brochure supplement entitled "Theory of Operation" by Cambridge Technology, 2 pages, downloaded Dec. 21, 2013.
Search Report from the Taiwan Intellectual Property Office for related Application No. 102139285, 21 pages, dated Sep. 1, 2015 (with English translation).
Search Report from the Taiwan Intellectual Property Office for related Application No. 102139285, 9 pages, dated Sep. 4, 2017 (with English translation).
Second Office Action from Chinese Application No. 201410455972.X, dated Nov. 22, 2016, 22 pages (with English translation).
Second Office Action from Chinese Application No. 201480019324.8, dated Nov. 16, 2017, 21 pages (with English translation).

(56) References Cited

OTHER PUBLICATIONS

Second Office Action from Chinese Application No. 201380075745. 8, dated Feb. 26, 2018, 6 pages (with English translation).
Third Office Action from Chinese Application No. 201480019324. 8, dated Apr. 13, 2018, 8 pages (with English translation).
Website describing 3-Axis Laser Scanning Systems at http://www.camtech.com/index.php?option=com_content&view=article&id=131&Itemid=181, 4 pages, accessed Dec. 31, 2014.
Office Action (with English translation) for related Korea Application No. 10-2014-0120247, dated Apr. 14, 2017, 11 pages.
Official Action (with English translation) for related Taiwan application No. 103130968 dated Jun. 7, 2017, 5 pages.
Office Action (with English translation) for related Korea Application No. 10-2014-0120247, dated Oct. 18, 2017, 6 pages.
PCI-6110, Multifunction I/O Device, http.//www.ni.com/en-us-support/model.pci-6110.html, downloaded Dec. 15, 2017, 1 page.
Adelman et al., "Measurement of Relative State-to-State Rate Constants for the Reaction $D + H_2(v, j) \rightarrow HD(v', j') + H$," *J. Chem. Phys.*, 97:7323-7341 (Nov. 15, 1992).
Alfano et al., "Photodissociation and Recombination Dynamics of $I_2$ in Solution," *Ultrafast Phenomena VIII*, (Springer-Verlag, New York), pp. 653-655 (Jan. 1993).
"ARM," Coherent, available at: http://www.corelase.fi/products/arm/, 6 pages, retrieved May 26, 2017.
Bernasconi et al., "Kinetics of Ionization of Nitromethane and Phenylnitromethane by Amines and Carboxylate Ions in $Me_2SO$-Water Mixtures. Evidence of Ammonium Ion-Nitronate Ion Hydrogen Bonded Complex Formation in $Me_2SO$-Rich Solvent Mixtures," *J. Org. Chem.*, 53:3342-3351 (Jul. 1988).
Blake et al., "The $H + D_2$ Reaction: $HD(v=1, J)$ and $HD(v=2, J)$ Distributions at a Collision Energy of 1.3 eV," *Chem. Phys. Lett.*, 153:365-370 (Dec. 23, 1988).
Daniel et al., "Novel technique for mode selection in a large-mode-area fiber laser," Conference on Lasers and Electro-Optics 2010, OSA Technical Digest (CD) (Optical Society of America), paper CWC5, 2 pages (Jan. 2010).
Daniel et al., "Novel technique for mode selection in a multimode fiber laser," *Optics Express*, 19:12434-12439 (Jun. 20, 2011).
Di Teodoro et al., "Diffraction-Limited, 300-kW Peak-Power Pulses from a Coiled Multimode Fiber Amplifier," *Optics Letters*, 27:518-520 (May 2002).
Di Teodoro et al., "Diffraction-limited, 300-kW-peak-power Pulses from a Yb-doped Fiber Amplifier," Conference on Lasers and Electro-Optics, OSA Technical Digest (Optical Society of America, Washington, DC), p. 592-593 (May 22-24, 2002).
Di Teodoro et al., "High-peak-power pulsed fiber sources," *Proc. of SPIE*, 5448:561-571 (Sep. 20, 2004).
"Efficient and Simple Precision, Laser Processing Head PDT-B," HIGHYAG, 6 pages, (Jan. 2010).
"ENSIS Series," Amada America, Inc., available at: http://www.amada.com/america/ensis-3015-aj, 2 pages, retrieved May 26, 2017.
"EX-F Series," MC Machinery Systems, Inc., available at: https://www.mcmachinery.com/products-and-solutions/ex-f-series/, 2 pages, retrieved May 26, 2017.
Farrow et al., "Bend-Loss Filtered, Large-Mode-Area Fiber Amplifiers: Experiments and Modeling," Proceedings of the Solid State and Diode Laser Technology Review (Directed Energy Professional Society), P-9, 5 pages (2006).
Farrow et al., "Compact Fiber Lasers for Efficient High-Power Generation," *Proc. of SPIE*, 6287:62870C-1-62870C-6 (Sep. 1, 2006).
Farrow et al., "Design of Refractive-Index and Rare-Earth-Dopant Distributions for Large-Mode-Area Fibers Used in Coiled High-Power Amplifiers," *Proc. of SPIE*, 6453:64531C-1-64531C-11 (Feb. 22, 2007).
Farrow et al., "High-Peak-Power (>1.2 MW) Pulsed Fiber Amplifier," *Proc. of the SPIE*, 6102:61020L-1-61020L-11 (Mar. 2006).
Farrow et al., "Numerical Modeling of Self-Focusing Beams in Fiber Amplifiers," *Proc. of the SPIE*, 6453:645309-1-645309-9 (2007).

Farrow et al., "Peak-Power Limits on Pulsed Fiber Amplifiers Imposed by Self-Focusing," *Optics Lett.*, 31:3423-3425 (Dec. 1, 2006).
Fève et al., "Four-wave mixing in nanosecond pulsed fiber amplifiers," *Optics Express*, 15:4647-4662 (Apr. 16, 2007).
Fève et al., "Limiting Effects of Four-Wave Mixing in High-Power Pulsed Fiber Amplifiers," *Proc. of the SPIE*, 6453:64531P-1-64531P-11 (Feb. 22, 2007).
Final Office action from U.S. Appl. No. 15/607,411, dated Feb. 1, 2018, 27 pages.
Fini, "Bend-compensated design of large-mode-area fibers," *Optics Letters*, 31:1963-1965 (Jul. 1, 2006).
Fini, "Large mode area fibers with asymmetric bend compensation," *Optics Express*, 19:21868-21873 (Oct. 24, 2011).
Fini et al., "Bend-compensated large-mode-area fibers: achieving robust single-modedness with transformation optics," *Optics Express*, 21:19173-19179 (Aug. 12, 2013).
Fox et al., "Effect of low-earth orbit space on radiation-induced absorption in rare-earth-doped optical fibers," *J. Non-Cryst. Solids*, 378:79-88 (Oct. 15, 2013).
Fox et al., "Gamma Radiation Effects in Yb-Doped Optical Fiber," *Proc. of the SPIE*, 6453:645328-1-645328-9 (Feb. 23, 2007).
Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).
Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).
Fox et al., "Radiation damage effects in doped fiber materials," *Proc. of the SPIE*, 6873:68731F-1-68731F-9 (Feb. 22, 2008).
Fox et al., "Spectrally Resolved Transmission Loss in Gamma Irradiated Yb-Doped Optical Fibers," *IEEE J. Quant. Electron.*, 44:581-586 (Jun. 2008).
Fox et al., "Temperature and Dose-Rate Effects in Gamma Irradiated Rare-Earth Doped Fibers," *Proc. of SPIE*, 7095:70950B-1-70950B-8 (Aug. 26, 2008).
Ghasemi et al., "Beam shaping design for coupling high power diode laser stack to fiber," *Applied Optics*, 50:2927-2930 (Jun. 20, 2011).
Ghatak et al., "Design of Waveguide Refractive Index Profile to Obtain Flat Model Field," SPIE, 3666:40-44 (Apr. 1999).
Goers et al., "Development of a Compact Gas Imaging Sensor Employing cw Fiber-Amp-Pumped PPLN OPO," Conference on Lasers and Electro-Optics, OSA Technical Digest (Optical Society of America, Washington, DC), p. 521 (May 11, 2001).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).
Goldberg et al., "Deep UV Generation by Frequency Quadrupling of a High-Power GaAlAs Semiconductor Laser," *Optics Lett.*, 20:1145-1147 (May 15, 1995).
Goldberg et al., "High Efficiency 3 W Side-Pumped Yb Fiber Amplifier and Laser," Conference on Lasers and Electro-Optics, OSA Technical Digest (Optical Society of America, Washington, DC), p. 11-12 (May 24, 1999).
Goldberg et al., "Highly Efficient 4-W Yb-Doped Fiber Amplifier Pumped by a Broad-Stripe Laser Diode," *Optics Lett.*, 24:673-675 (May 15, 1999).
Goldberg et al., "High-Power Superfluorescent Source with a Side-Pumped Yb-Doped Double-Cladding Fiber," *Optics Letters*, 23:1037-1039 (Jul. 1, 1998).
Goldberg et al., "Tunable UV Generation at 286 nm by Frequency Tripling of a High-Power Modelocked Semiconductor Laser," *Optics Lett.*, 20:1640-1642 (Aug. 1, 1995).
Golub, "Laser Beam Splitting by Diffractive Optics," *Optics and Photonics News*, 6 pages (Feb. 2004).
Han et al., "Reshaping collimated laser beams with Gaussian profile to uniform profiles," *Applied Optics*, 22:3644-3647 (Nov. 15, 1983).
Headrick et al., "Application of laser photofragmentation-resonance enhanced multiphoton ionization to ion mobility spectrometry," *Applied Optics*, 49:2204-2214 (Apr. 10, 2010).

(56) References Cited

OTHER PUBLICATIONS

Hemenway et al., "Advances in high-brightness fiber-coupled laser modules for pumping multi-kW CW fiber lasers," Proceedings of SPIE, 10086:1008605-1-1008605-7 (Feb. 22, 2017).

Hemenway et al., "High-brightness, fiber-coupled pump modules in fiber laser applications," Proc. of SPIE, 8961:89611V-1-89611V-12 (Mar. 7, 2014).

Hoops et al., "Detection of mercuric chloride by photofragment emission using a frequency-converted fiber amplifier," Applied Optics, 46:4008-4014 (Jul. 1, 2007).

Hotoleanu et al., "High Order Modes Suppression in Large Mode Area Active Fibers by Controlling the Radial Distribution of the Rare Earth Dopant," Proc. of the SPIE, 6102:61021T-1-61021T-8 (Feb. 23, 2006).

"How to Select a Beamsplitter," IDEX—Optics & Photonics Marketplace, available at: https://www.cvilaseroptics.com/file/general/beamSplitters.pdf, 5 pages (Jan. 8, 2014).

Huang et al., "Double-cutting beam shaping technique for high-power diode laser area light source," Optical Engineering, 52:106108-1-106108-6 (Oct. 2013).

International Search Report and Written Opinion for related International Application No. PCT/US2016/041526, 6 pages, dated Oct. 20, 2016.

International Search Report and Written Opinion from International Application No. PCT/US2017/034848, dated Nov. 28, 2017, 15 pages.

International Search Report and Written Opinion for related International Application No. PCT/US2016/053807, 6 pages, dated Jan. 19, 2017.

Ishiguro et al., "High Efficiency 4-kW Fiber Laser Cutting Machine," Rev. Laser Eng., 39:680-684 (May 21, 2011).

Johnson et al., "Experimental and Theoretical Study of Inhomogeneous Electron Transfer in Betaine: Comparisons of Measured and Predicted Spectral Dynamics," Chem. Phys., 176:555-574 (Oct. 15, 1993).

Johnson et al., "Ultrafast Experiments on the Role of Vibrational Modes in Electron Transfer," Pure and Applied Chem., 64:1219-1224 (May 1992).

Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (Jun. 21-25, 2015).

Kliner et al., "4-kW fiber laser for metal cutting and welding," Proc. of SPIE, 7914:791418-791418-8 (Feb. 22, 2011).

Kliner et al., "Comparison of Experimental and Theoretical Absolute Rates for Intervalence Electron Transfer," J. Am. Chem. Soc., 114:8323-8325 (Oct. 7, 1992).

Kliner et al., "Comparison of Experimental and Theoretical Integral Cross Sections for D + $H_2$(v=1, j=1) → HD(v'=1, j') + H," J. Chem. Phys., 95:1648-1662 (Aug. 1, 1991).

Kliner et al., "D + $H_2$(v=1, J=1): Rovibronic State to Rovibronic State Reaction Dynamics," J. Chem. Phys., 92:2107-2109 (Feb. 1, 1990).

Kliner et al., "Effect of Indistinguishable Nuclei on Product Rotational Distributions: H + HI → $H_2$ + I reaction[a]," J. Chem. Phys., 90:4625-4327 (Apr. 15, 1989).

Kliner et al., "Efficient second, third, fourth, and fifth harmonic generation of a Yb-doped fiber amplifier," Optics Communications, 210:393-398 (Sep. 15, 2002).

Kliner et al., "Efficient UV and Visible Generation Using a Pulsed Yb-Doped Fiber Amplifier," Conference on Lasers and Electro-Optics, OSA Technical Digest (Optical Society of America, Washington, DC), p. CPDC10-1-CPDC10-3 (May 19-22, 2002).

Kliner et al., "Efficient visible and UV generation by frequency conversion of a mode-filtered fiber amplifier," Proc. of SPIE, 4974:230-235 (Jul. 3, 2003).

Kliner et al., "Fiber laser allows processing of highly reflective materials," Industrial Laser Solutions, 31:1-9 (Mar. 16, 2016).

Kliner et al., "High-Power Fiber Lasers," Photonics & Imaging Technology, pp. 2-5 (Mar. 2017).

Kliner et al., "Laboratory Investigation of the Catalytic Reduction Technique for Detection of Atmospheric $NO_y$," J. Geophys. Res., 102:10759-10776 (May 20, 1997).

Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).

Kliner et al., "Measurements of Ground-State OH Rotational Energy-Transfer Rates," J. Chem. Phys., 110:412-422 (Jan. 1, 1999).

Kliner et al., "Mode-Filtered Fiber Amplifier," Sandia National Laboratories—Brochure, 44 pages (Sep. 13, 2007).

Kliner et al., "Narrow-Band, Tunable, Semiconductor-Laser-Based Source for Deep-UV Absorption Spectroscopy," Optics Lett., 22:1418-1420 (Sep. 15, 1997).

Kliner et al., "Overview of Sandia's fiber laser program," Proceedings of SPIE—The International Society for Optical Engineering, 6952:695202-1-695202-12 (Apr. 14, 2008).

Kliner et al., "Photodissociation and Vibrational Relaxation of $I_2^-$ in Ethanol," J. Chem. Phys., 98:5375-5389 (Apr. 1, 1993).

Kliner et al., "Photodissociation Dynamics of $I_2^-$ in Solution," Ultrafast Reaction Dynamics and Solvent Effects, (American Institute of Physics, New York), pp. 16-35 (Feb. 1994).

Kliner et al., "Polarization-Maintaining Amplifier Employing Double-Clad, Bow-Tie Fiber," Optics Lett., 26:184-186 (Feb. 15, 2001).

Kliner et al., "Power Scaling of Diffraction-Limited Fiber Sources," Proc. of SPIE, 5647:550-556 (Feb. 21, 2005).

Kliner et al., "Power Scaling of Rare-Earth-Doped Fiber Sources," Proc. of SPIE, 5653:257-261 (Jan. 12, 2005).

Kliner et al., "Product Internal-State Distribution for the Reaction H + HI → $H_2$ + I," J. Chem. Phys., 95:1663-1670 (Aug. 1, 1991).

Kliner et al., "The D + $H_2$ Reaction: Comparison of Experiment with Quantum-Mechanical and Quasiclassical Calculations," Chem. Phys. Lett., 166:107-111 (Feb. 16, 1990).

Kliner et al., "The H+para-$H_2$ reaction: Influence of dynamical resonances on $H_2$(v'=1, j'=1 and 3) Integral Cross Sections," J. Chem. Phys., 94:1069-1080 (Jan. 15, 1991).

Koplow et al., A New Method for Side Pumping of Double-Clad Fiber Sources, J. Quantum Electronics, 39:529-540 (Apr. 4, 2003).

Koplow et al., "Compact 1-W Yb-Doped Double-Cladding Fiber Amplifier Using V-Groove Side-Pumping," IEEE Photonics Technol. Lett., 10:793-795 (Jun. 1998).

Koplow et al., "Development of a Narrowband, Tunable, Frequency-Quadrupled Diode Laser for UV Absorption Spectroscopy," Appl. Optics, 37:3954-3960 (Jun. 20, 1998).

Koplow et al., "Diode-Bar Side-Pumping of Double-Clad Fibers," Proc. of SPIE, 5709:284-300 (Apr. 22, 2005).

Koplow et al., "High Power PM Fiber Amplifier and Broadband Source," Optical Fiber Communication Conference, OSA Technical Digest (Optical Society of America, Washington, DC), p. 12-13 (Mar. 7-10, 2000).

Koplow et al., "Polarization-Maintaining, Double-Clad Fiber Amplifier Employing Externally Applied Stress-Induced Birefringence," Optics Lett., 25:387-389 (Mar. 15, 2000).

Koplow et al., "Single-mode operation of a coiled multimode fiber amplifier," Optics Letters, 25:442-444 (Apr. 1, 2000).

Koplow et al., Use of Bend Loss to Obtain Single-Transverse-Mode Operation of a Multimode Fiber Amplifier, Conference on Lasers and Electro-Optics, OSA Technical Digest (Optical Society of America, Washington, DC), p. 286-287 (May 7-12, 2000).

Koplow et al., "UV Generation by Frequency Quadrupling of a Yb-Doped Fiber Amplifier," IEEE Photonics Technol. Lett., 10:75-77 (Jan. 1998).

Koponen et al., "Photodarkening Measurements in Large-Mode-Area Fibers," Proc. of SPIE, 6453:64531E-1-64531E-12 (Feb. 2007).

Kotlyar et al., "Asymmetric Bessel-Gauss beams," J. Opt. Soc. Am. A, 31:1977-1983 (Sep. 2014).

Kulp et al., "The application of quasi-phase-matched parametric light sources to practical infrared chemical sensing systems," Appl. Phys. B, 75:317-327 (Jun. 6, 2002).

(56) References Cited

OTHER PUBLICATIONS

"Laser cutting machines," TRUMPF, available at: http://www.us.trumpf.com/en/products/machine-tools/products/2d-laser-cutting/innovative-technology/brightline.html, 9 pages, retrieved May 26, 2017.
Longhi et al., "Self-focusing and nonlinear periodic beams in parabolic index optical fibres," *J. Opt. B: Quantum Semiclass. Opt.*, 6:S303-S308 (May 2004).
Maechling et al., "Sum Frequency Spectra in the C—H Stretch Region of Adsorbates on Iron," *Appl. Spectrosc.*, 47:167-172 (Feb. 1, 1993).
McComb et al., "Pulsed Yb:fiber system capable of >250 kW peak power with tunable pulses in the 50 ps to 1.5 ns range," *Proc. of SPIE*, 8601:86012T-1-86012T-11 (Mar. 22, 2013).
Moore et al., "Diode-bar side pumping of double-clad fibers," *Proc. of SPIE*, 6453:64530K-1-64530K-9 (Feb. 20, 2007).
Neuhauser et al., "State-to-State Rates for the D + $H_2$(v=1, j=1) → HD(v', j') + H Reaction: Predictions and Measurements," *Science*, 257:519-522 (Jul. 24, 1992).
Office action from U.S. Appl. No. 15/607,399, dated Sep. 20, 2017, 25 pages.
Office action from U.S. Appl. No. 15/607,411, dated Sep. 26, 2017, 15 pages.
Office action from U.S. Appl. No. 15/607,410, dated Oct. 3, 2017, 32 pages.
Price et al., "High-brightness fiber-coupled pump laser development," *Proc. of SPIE*, 7583:758308-1-758308-7 (Feb. 2010).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: D + DI → $D_2$ + I," *Chem. Phys. Lett.*, 169:365-371 (Jun. 15, 1990).
Rinnen et al. "Quantitative Determination of HD Internal State Distributions via (2+1) REMPI," *Isr. J. Chem.*, 29:369-382 (Mar. 7, 1989).
Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).
Rinnen et al., "The H + $D_2$ Reaction: "Prompt" HD Distributions at High Collision Energies," *Chem. Phys. Lett.*, 153:371-375 (Dec. 23, 1988).
Rinnen et al., "The H + $D_2$ Reaction: Quantum State Distributions at Collision Energies of 1.3 and 0.55 eV," *J. Chem. Phys.*, 91:7514-7529 (Dec. 15, 1989).
Romero et al., "Lossless laser beam shaping," *J. Opt. Soc. Am. A*, 13:751-760 (Apr. 1996).
Sanchez-Rubio et al., "Wavelength Beam Combining for Power and Brightness Scaling of Laser Systems," *Lincoln Laboratory Journal*, 20:52-66 (2014).
Saracco et al., Compact, 17 W average power, 100 kW peak power, nanosecond fiber laser system, *Proc. of SPIE*, 8601:86012U-1-86012U-13 (Mar. 22, 2013).
Schrader et al., "Fiber-Based Laser with Tunable Repetition Rate, Fixed Pulse Duration, and Multiple Wavelength Output," *Proc. of the SPIE*, 6453:64530D-1-64530D-9 (Feb. 20, 2007).
Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).
Schrader et al., "Power scaling of fiber-based amplifiers seeded with microchip lasers," *Proc. of the SPIE*, 6871:68710T-1-68710T-11 (Feb. 2008).
Sheehan et al., "Faserlaser zur Bearbeitung hochreflektierender Materialien (Fiber laser processing of highly reflective materials)," *Laser*, 3:92-94 (Jun. 2017).
Sheehan et al. "High-brightness fiber laser advances remote laser processing," *Industrial Laser Solutions*, 31:1-9 (Nov. 2, 2016).
Sun et al., "Optical Surface Transformation: Changing the optical surface by homogeneous optic-null medium at will," *Scientific Reports*, 5:16032-1-16032-20 (Oct. 30, 2015).
Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).
Tominaga et al., "Ultrafast Studies of Intervalence Charge Transfer," *Ultrafast Phenomena VIII*, (Springer-Verlag, New York), pp. 582-584 (1993).
"Triple Clad Ytterbium-Doped Polarization Maintaining Fibers," nuFERN Driven to Light Specifications, 1 page (Jan. 2006).
Varshney et al., "Design of a flat field fiber with very small dispersion slope," Optical Fiber Technology, 9(3):189-198 (Oct. 2003).
Xiao et al., "Fiber coupler for mode selection and high-efficiency pump coupling," *Optics Letters*, 38:1170-1172 (Apr. 1, 2013).
Yaney et al., "Distributed-Feedback Dye Laser for Picosecond UV and Visible Spectroscopy," *Rev. Sci. Instrum*, 71:1296-1305 (Mar. 2000).
Yu et al., "1.2-kW single-mode fiber laser based on 100-W high-brightness pump diodes," *Proc. of SPIE*, 8237:82370G-1-82370G-7 (Feb. 16, 2012).

\* cited by examiner

```
┌─────────────────────────────┐
│ PERTURBING A FIRST LENGTH   │
│ OF FIBER AND/OR AN OPTICAL  │
│ BEAM TO ADJUST ONE OR MORE  │
│ BEAM CHARACTERISTICS OF     │
│ THE OPTICAL BEAM            │
│           2502              │
└──────────────┬──────────────┘
               │
┌──────────────┴──────────────┐
│ LAUNCHING THE OPTICAL BEAM  │
│ INTO A SECOND LENGTH OF     │
│ FIBER                       │
│           2504              │
└──────────────┬──────────────┘
               │
┌──────────────┴──────────────┐
│ PROPAGATING THE OPTICAL     │
│ BEAM HAVING THE ADJUSTED    │
│ BEAM CHARACTERISTICS IN THE │
│ SECOND LENGTH OF FIBER      │
│           2506              │
└──────────────┬──────────────┘
               │
┌──────────────┴──────────────┐
│ MAINTAINING AT LEAST A      │
│ PORTION OF THE ONE OR MORE  │
│ ADJUSTED BEAM               │
│ CHARACTERISTICS OF THE      │
│ OPTICAL BEAM WITHIN ONE OR  │
│ MORE CONFINEMENT REGIONS    │
│ OF THE SECOND LENGTH OF     │
│ FIBER                       │
│           2508              │
└─────────────────────────────┘
```

FIG. 25

FIBER-COUPLED DEVICE FOR VARYING BEAM CHARACTERISTICS

CROSS REFERENCE TO RELATED APPLICATIONS

This application is a continuation-in-part of U.S. patent application Ser. No. 15/607,399, filed May 26, 2017, U.S. patent application Ser. No. 15/607,410, filed May 26, 2017, U.S. patent application Ser. No. 15/607,411, filed May 26, 2017, and Patent Cooperation Treaty Application No. PCT/US2017/034848, filed May 26, 2017, all of which claim the benefit of U.S. Provisional Application No. 62/401,650, filed Sep. 29, 2016. These applications are incorporated by reference herein in their entireties.

FIELD

The disclosure pertains to methods and apparatus for modifying laser beam characteristics.

BACKGROUND

Control of laser beam spatial and divergence distributions ("beam characteristics") is important in many applications. In many conventional optical processing systems, a laser beam is directed to a workpiece via an optical fiber and optics that receive an optical beam from the optical fiber. While optics that receive optical beams from the optical fiber can produce selected beam characteristics, such beam characteristics tend to be difficult to vary without introducing significant complexity, cost, size, weight, optical loss, or other undesirable features into the optical system. Typically, beam characteristics at the output of the beam delivery fiber are fixed, and the optics downstream of the delivery fiber (e.g., the process head) transform the beam into one with another fixed set of characteristics (e.g., by imaging the output of the delivery fiber). As processing or other application requirements change (or in applications requiring multiple beam profiles), adapting an available laser to meet the changed requirements can be challenging for the same reasons.

Other practical issues make on-site beam modification difficult. Many high power laser systems include safety interlocks and power monitoring systems to provide operator safety and to control signals that can aid in detection of laser output anomalies that permit laser repair or adjustment prior to optical damage. Such interlocks and monitoring systems are built-in, and many desirable reconfigurations either render these safety measures ineffective, or require complex, delicate adjustments to reset.

While fiber splicing is straightforward in communication applications, introducing splices into high power laser systems can be challenging. Splices used to couple high power lasers to other fibers often must be potted, strain relieved, coated or otherwise mechanically protected, and often a splice region must be optically and thermally monitored to detect unacceptable operating conditions. Thus, splicing fibers in such applications tends to be impractical, especially for end users who generally do not have access to the processes and assembly tools used by laser manufacturers. Accordingly, improved approaches to providing variable and controllable beam profiles are needed, especially approaches adapted to reconfiguration of installed high power lasers.

SUMMARY

At least disclosed herein are methods, systems and apparatus for varying optical beam characteristics. Methods may include, perturbing an optical beam propagating within a first length of fiber to adjust one or more beam characteristics of the optical beam in the first length of fiber or a second length of fiber or a combination thereof, coupling the perturbed optical beam into a second length of fiber and maintaining at least a portion of one or more adjusted beam characteristics within a second length of fiber having one or more confinement regions. Methods may further include generating a selected output beam from the second length of fiber having the adjusted beam characteristics responsive to a selection of a first refractive index profile (RIP) of the first length of fiber or a second RIP of the second length of fiber or a combination thereof. In some examples, the one or more beam characteristics of the perturbed optical beam are adjusted based on selection of one or more core dimensions of the first length of fiber or one or more confinement region dimensions of the second length of fiber or a combination thereof to generate an adjusted optical beam responsive to perturbing the first length of fiber, the adjusted optical beam having a particular adjusted: beam diameter, divergence distribution, beam parameter product (BPP), intensity distribution, luminance, $M^2$ value, numerical aperture (NA), optical intensity, power density, radial beam position, radiance, or spot size, or any combination thereof at an output of the second length of fiber. In some example, methods include perturbing the optical beam by bending the first length of fiber to alter a bend radius or alter a length of a bent region of the first length of fiber or a combination thereof such that one or more modes of the optical beam are displaced radially with respect to a longitudinal axis of the first length of fiber wherein the second length of fiber has an RIP that defines a first confinement region and a second confinement region. In some examples, the adjusted one or more beam characteristics are produced by confining the optical beam in the two or more confinement regions of the second length of fiber. The example methods may further comprise launching the perturbed optical beam from the first length of fiber into the first confinement region or the second confinement region or a combination thereof such that one or more displaced modes of the optical beam are selectively coupled into and maintained in the first confinement region or the second confinement region, or a combination thereof. Disclosed methods may include, perturbing the one or more beam characteristics of the optical beam by perturbing the first length of fiber or the optical beam in the first length of fiber or a combination thereof to adjust at least one beam characteristic of the optical beam at an output of the second length of fiber. Perturbing the first length of fiber may include bending, bending over a particular length, microbending, applying acousto-optic excitation, thermal perturbation, stretching, or applying piezo-electric perturbation, or any combination thereof. The second length of fiber may comprise a first confinement region comprising a central core and a second confinement region comprising an annular core encompassing the first confinement region. Adjusting the one or more beam characteristics of the optical beam may include selecting a RIP of the first length of fiber to generate a desired mode shape of a lowest order mode, one or more higher order modes, or a combination thereof subsequent to the adjusting. In some examples, the first length of fiber has a core with a parabolic index profile radially spanning some or all of the core. A RIP of the first length of fiber may be selected to increase or decrease a width of the lowest order mode, the higher order modes, or a combination thereof responsive to the perturbing the optical beam. The first length of fiber or the second length of fiber or a combination thereof may include at least one divergence structure configured to modify a divergence profile of the optical beam. The confinement regions may be separated by one or more cladding structures, wherein the divergence structure may be disposed within at least one confinement region separate from the cladding structure and comprising material having a lower index than the confinement region adjacent to the divergence structure. In some examples, the second length of fiber may be azimuthally asymmetric.

Apparatus disclosed herein may include an optical beam delivery device, comprising a first length of fiber comprising a first RIP formed to enable modification of one or more beam characteristics of an optical beam by a perturbation device and a second length of fiber having a second RIP coupled to the first length of fiber, the second RIP formed to confine at least a portion of the modified beam characteristics of the optical beam within one or more confinement regions. In some examples, the first RIP and the second RIP are different. In some examples, the second length of fiber comprises a plurality of confinement regions. The perturbation device may be coupled to the first length of fiber or integral with the first length of fiber or a combination thereof. The first length of fiber may comprise a graded-index RIP in at least a radially central portion and the second length of fiber has a first confinement region comprising a central core and a second confinement region that is annular and encompasses the first confinement region. The first confinement region and the second confinement region may be separated by a cladding structure having a refractive index that is lower than the indexes of first confinement region and the second confinement region. The cladding structure may comprise a fluorosilicate material. The first length of fiber or the second length of fiber or a combination thereof may include at least one divergence structure configured to modify a divergence profile of the optical beam and wherein the divergence structure may comprise a first material having a lower index of refraction than a second material encompassing the divergence structure. The second length of fiber may be azimuthally asymmetric and may comprise a first confinement region comprising a first core and a second confinement region comprising a second core. In some examples, the first confinement region and the second confinement region may be coaxial. In other examples, the first confinement region and the second confinement region may be non-coaxial. The second confinement region may be crescent shaped in some examples. The first RIP may be parabolic in a first portion having a first radius. In some examples, the first RIP may be constant in a second portion having a second radius, wherein the second radius is larger than the first radius. The first RIP may comprise a radially graded index extending to an edge of a core of the first length of fiber, wherein the first RIP is formed to increase or decrease a width of one or more modes of the optical beam responsive to the modification of the beam characteristics by the perturbation device. The first length of fiber may have a radially graded index core extending to a first radius followed by a constant index portion extending to a second radius, wherein the second radius is larger than the first radius. In some examples, the second length of fiber comprises a central core having a diameter in a range of about 0 to 100 microns, a first annular core encompassing the central core having a diameter in a range of about 10 to 600 microns and a second annual core having a diameter in a range of about 20 to 1200 microns. The perturbation device may comprise a bending assembly configured to alter a bend radius or alter a bend length of the first length of fiber or a combination thereof to modify the beam characteristics of the optical beam. In some examples, a perturbation assembly may comprise a bending assembly, a mandrel, micro-bend in the fiber, an acousto-optic transducer, a thermal device, a fiber stretcher, or a piezo-electric device, or any combination thereof. The first length of fiber and the second length of fiber may be separate passive fibers that are spliced together.

Systems disclosed herein may include, an optical beam delivery system, comprising an optical fiber including a first and second length of fiber and an optical system coupled to the second length of fiber including one or more free-space optics configured to receive and transmit an optical beam comprising modified beam characteristics. The first length of fiber may include a first RIP formed to enable, at least in part, modification of one or more beam characteristics of an optical beam by a perturbation assembly arranged to modify the one or more beam characteristics, the perturbation assembly may be coupled to the first length of fiber or integral with the first length of fiber, or a combination thereof. The second length of fiber may be coupled to the first length of fiber and may include a second RIP formed to preserve at least a portion of the one or more beam characteristics of the optical beam modified by the perturbation assembly within one or more first confinement regions. In some examples, the first RIP and the second RIP are different.

The optical beam delivery system may further include a first process fiber coupled between a first process head and the optical system, wherein the first process fiber is configured to receive the optical beam comprising the modified one or more beam characteristics. The first process fiber may comprise a third RIP configured to preserve at least a portion of the modified one or more beam characteristics of the optical beam within one or more second confinement regions of the first process fiber. In an example, at least a portion of the free-space optics may be configured to further modify the modified one or more beam characteristics of the optical beam. The one or more beam characteristics may include beam diameter, divergence distribution, BPP, intensity distribution, luminance, $M^2$ value, NA, optical intensity, power density, radial beam position, radiance, or spot size, or any combination thereof. The third RIP may be the same as or different from the second RIP. The third RIP may be configured to further modify the modified one or more beam characteristics of the optical beam. In some examples, at least one of the one or more second confinement regions includes at least one divergence structure configured to modify a divergence profile of the optical beam. The divergence structure may comprise an area of lower-index material than that of the second confinement region.

The optical beam delivery system may further include a second process fiber having a fourth RIP that is coupled between the optical system and a second process head, wherein the second process fiber may be configured to receive the optical beam comprising the modified one or more beam characteristics within one or more second confinement regions of the second process fiber. In some examples, the first process fiber or the second process fiber or a combination thereof may be configured to further modify the modified one or more beam characteristics of the optical beam. The second process fiber may include at least one divergence structure configured to modify a divergence profile of the optical beam. The second process fiber may comprise a central core surrounded by at least one of the one or more second confinement regions, wherein the core and the second confinement region are separated by a cladding structure having a first index of refraction that is lower than a second index of refraction of the central core and a third index of refraction of the second confinement region, wherein the second confinement region may include the at least one divergence structure. The at least one divergence structure may comprise an area of lower-index material than that of the second confinement region. In an example, the second RIP may be different from the third RIP or the fourth RIP or a combination thereof. Alternatively, the second RIP may be the same as the third RIP or the fourth RIP or a combination thereof. The one or more beam characteristics that may be modified can include beam diameter, divergence distribution, BPP, intensity distribution, luminance, $M^2$ value, NA, optical intensity, power density, radial beam position, radiance, or spot size, or any combination thereof.

In some examples, at least a portion of the free-space optics may be configured to further modify the modified one or more beam characteristics of the optical beam. The first process fiber may be coupled between a first process head and the optical system, wherein the first process fiber is configured to receive the optical beam comprising twice modified one or more beam characteristics. The first process fiber may have a third RIP configured to preserve at least a portion of the twice modified one or more beam characteristics of the optical beam within one or more second confinement regions of the first process fiber. The third RIP may be different from the second RIP, wherein the third RIP is configured to further modify the twice modified one or more beam characteristics of the optical beam.

In some examples, the first process fiber may include a divergence structure configured to further modify the twice modified one or more beam characteristics of the optical beam. In some examples, a second process fiber may be coupled between the optical system and a second process head, wherein the second process fiber is configured to receive the twice modified one or more beam characteristics.

In some examples, the first process fiber or the second process fiber or a combination thereof is configured to further modify the twice modified one or more beam characteristics of the optical beam. The first process fiber or the second process fiber or a combination thereof may include at least one divergence structure configured to further modify the twice modified one or more beam characteristics of the optical beam. The optical system may be a fiber-to-fiber coupler, a fiber-to-fiber switch or a process head, or the like or a combination thereof.

In other examples, apparatus comprise a beam coupler situated to receive an input beam and produce an output beam, wherein an optical path defined by the beam coupler includes a free space portion. A VBC device is coupled to the beam coupler and includes an input fiber, a perturbation assembly, and an output fiber, wherein the input fiber is optically coupled to the output fiber. A perturbation assembly is coupled to at least one of the input fiber and the output fiber to modify one or more beam characteristics of the output beam received from the beam coupler so that the output fiber delivers a modified beam. The output fiber has a refractive index profile that preserves at least a portion of the one or more beam characteristics modified by the perturbation assembly. In some examples, a refractive index profile (RIP) of the input fiber is different from an RIP of the output fiber. In some embodiments, the beam coupler comprises at least one lens situated to direct the output beam produced by the beam coupler to the input fiber of the VBC device. In still other examples, the at least one lens of the beam coupler includes a first lens and a second lens. The first lens is situated to receive an unguided input optical beam and deliver a collimated optical beam to the second lens, and the second lens is situated to focus the collimated optical beam to the input fiber of the VBC device.

According to some examples, the beam coupler comprises a fiber-to-fiber coupler (FFC) that includes at least one lens situated to receive an optical beam from an optical fiber and direct the optical beam from the optical fiber to the input fiber of the VBC device. The at least one lens of the FFC includes a first lens and a second lens. The first lens is situated to receive the optical beam from the optical fiber and deliver a collimated optical beam to the second lens, and the second lens is situated to focus the collimated optical beam to the input fiber of the VBC device. In further examples, a beam delivery fiber is coupled to provide the output beam from the beam coupler to the input fiber of the VBC device. Typically, the beam delivery fiber has an RIP different from the RIP of the input fiber and the output fiber of the VBC device. In some examples, the one or more beam characteristics include beam diameter, divergence distribution, beam parameter product (BPP), intensity distribution, luminance, $M^2$ value, numerical aperture (NA), optical intensity, power density, radial beam position, radiance, or spot size, or any combination thereof.

Representative methods comprise receiving an input optical beam and allowing the input optical beam to propagate as an unguided beam, and coupling the propagating unguided beam to a first length of fiber having a first RIP. One or more beam characteristics of the optical beam coupled to the first length of fiber are modified by perturbing the first length of fiber. The modified beam is coupled from the first length of fiber to a second length fiber having a second RIP formed to preserve at least a portion of the one or more beam modified beam characteristics within one or more first confinement regions wherein the first RIP and the second RIP are different. In some embodiments, the input optical beam is received from a fiber and is focused with a lens to the first length of fiber. In other examples, the input optical beam is an unguided optical beam that is focused with a lens to the first length of fiber. In additional examples, the input optical beam is an unguided optical beam that is collimated with a first lens and focused with a second lens to the first length of fiber.

In still further examples, apparatus comprise a beam delivery system optically coupled to receive a laser beam, wherein the beam delivery system comprises an input fiber, an output fiber optically coupled to the input fiber, and a perturbation assembly coupled to at least one of the input fiber and the output fiber to modify one or more beam characteristics of the laser beam received and deliver a modified laser beam from the output fiber. The input fiber and the output fiber having different RIPs and the beam delivery system defines an optical path that includes a free space portion. In some examples, a FFC is situated to receive the laser beam and couple the laser beam to the input fiber, wherein the FFC defines the free space portion of the optical path. In other examples, a laser input fiber is situated to receive the laser beam and couple the laser beam to the FFC. In still further examples, a beam delivery fiber is optically coupled to the output fiber and the input fiber, the output, fiber, and the beam delivery fiber have different RIPs. According to some examples, a fiber-to-fiber optical switch is situated so that the input fiber is switchably coupled to receive the laser beam from the laser, and the free space portion of the optical path is defined by the fiber-to-fiber optical switch. In further examples, a laser is situated to provide a laser beam at a laser output fiber, and the beam delivery system includes a FFC situated to receive the laser beam from the laser. The FFC includes a first lens situated to collimate the laser beam from the laser output fiber and a second lens situated to direct the collimated laser beam to the input fiber, wherein a RIP of the laser output fiber is different from the RIP of the input fiber. In some embodiments, a focal length of the first lens is different than a focal length of the second lens.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

FIG. 25 illustrates an example process for adjusting and maintaining modified characteristics of an optical beam.

DETAILED DESCRIPTION

Figure 1:
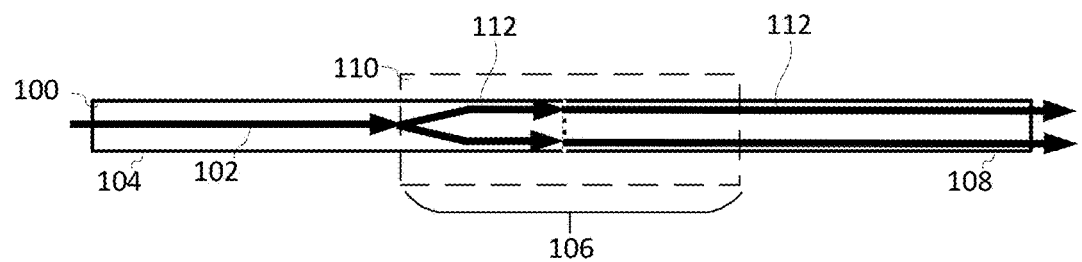
FIG. 1 illustrates an example fiber structure for providing a laser beam having variable beam characteristics.

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Definitions

Definitions of words and terms as used herein:
1. The term "beam characteristics" refers to one or more of the following terms used to describe an optical beam. In general, the beam characteristics of most interest depend on the specifics of the application or optical system.
2. The term "beam diameter" is defined as the distance across the center of the beam along an axis for which the irradiance (intensity) equals $1/e^2$ of the maximum irradiance. While examples disclosed herein generally use beams that propagate in azimuthally symmetric modes, elliptical or other beam shapes can be used, and beam diameter can be different along different axes. Circular beams are characterized by a single beam diameter. Other beam shapes can have different beam diameters along different axes.
3. The term "spot size" is the radial distance (radius) from the center point of maximum irradiance to the $1/e^2$ point.
4. The term "beam divergence distribution" is the power vs the full cone angle. This quantity is sometimes called the "angular distribution" or "NA distribution."
5. The term "beam parameter product" (BPP) of a laser beam is defined as the product of the beam radius (measured at the beam waist) and the beam divergence half-angle (measured in the far field). The units of BPP are typically mm-mrad.
6. A "confinement fiber" is defined to be a fiber that possesses one or more confinement regions, wherein a confinement region comprises a higher-index region (core region) surrounded by a lower-index region (cladding region). The RIP of a confinement fiber may include one or more higher-index regions (core regions) surrounded by lower-index regions (cladding regions), wherein light is guided in the higher-index regions. Each confinement region and each cladding region can have any RIP, including but not limited to step-index and graded-index. The confinement regions may or may not be concentric and may be a variety of shapes such as circular, annular, polygonal, arcuate, elliptical, or irregular, or the like or any combination thereof. The confinement regions in a particular confinement fiber may all have the same shape or may be different shapes. Moreover, confinement regions may be co-axial or may have offset axes with respect to one another. Confinement regions may be of uniform thickness about a central axis in the longitudinal direction, or the thicknesses may vary about the central axis in the longitudinal direction.
7. The term "intensity distribution" refers to optical intensity as a function of position along a line (1D profile) or on a plane (2D profile). The line or plane is usually taken perpendicular to the propagation direction of the light. It is a quantitative property.
8. "Luminance" is a photometric measure of the luminous intensity per unit area of light travelling in a given direction.
9. "$M^2$ factor" (also called "beam quality factor" or "beam propagation factor") is a dimensionless parameter for quantifying the beam quality of laser beams, with $M^2=1$ being a diffraction-limited beam, and larger M2 values corresponding to lower beam quality. $M^2$ is equal to the BPP divided by $\lambda/\pi$, where $\lambda$ is the wavelength of the beam in microns (if BPP is expressed in units of mm-mrad).
10. The term "numerical aperture" or "NA" of an optical system is a dimensionless number that characterizes the range of angles over which the system can accept or emit light.
11. The term "optical intensity" is not an official (SI) unit, but is used to denote incident power per unit area on a surface or passing through a plane.
12. The term "power density" refers to optical power per unit area, although this is also referred to as "optical intensity."
13. The term "radial beam position" refers to the position of a beam in a fiber measured with respect to the center of the fiber core in a direction perpendicular to the fiber axis.
14. "Radiance" is the radiation emitted per unit solid angle in a given direction by a unit area of an optical source (e.g., a laser). Radiance may be altered by changing the beam intensity distribution and/or beam divergence profile or distribution. The ability to vary the radiance profile of a laser beam implies the ability to vary the BPP.
15. The term "refractive-index profile" or "RIP" refers to the refractive index as a function of position along a line (1D) or in a plane (2D) perpendicular to the fiber axis. Many fibers are azimuthally symmetric, in which case the 1D RIP is identical for any azimuthal angle.
16. A "step-index fiber" has a RIP that is flat (refractive index independent of position) within the fiber core.
17. A "graded-index fiber" has a RIP in which the refractive index decreases with increasing radial position (i.e., with increasing distance from the center of the fiber core).
18. A "parabolic-index fiber" is a specific case of a graded-index fiber in which the refractive index decreases quadratically with increasing distance from the center of the fiber core.
19. "Free space propagation" and "unguided propagation" are used to refer to optical beams that propagate without being constrained to one or more waveguides (such as optical fibers) over optical distances that are typically 5, 10, 20, 100 times or more than a beam Rayleigh range. Such propagation can be in optical media such as glass, fused silica, semiconductors, air, crystalline materials, or vacuum.
20. "Collimated beams" are generally produced by situating a lens or other focusing element such as a curved mirror, a Fresnel lens, or a holographic optical element such that an apparent distance from a location at which a beam has, would have, or appears to have a planar wavefront (such as at a focus of a Gaussian beam or at an output of an optical fiber) that is less than 10%, 5%, 2%, 1%, 0.5%, 0.1% of a focal length f from a focal point of a focal length f.
21. "Optical path" refers to a path taken by an optical beam in traversing an optical system including spaces between optical elements. An optical path length is related to the actual length of the optical path but includes also contributions associated with refractive indices of any optical media situated on the optical path.

Fiber for Varying Beam Characteristics

Disclosed herein are methods, systems, and apparatus configured to provide a fiber operable to provide a laser beam having variable beam characteristics (VBC) that may reduce cost, complexity, optical loss, or other drawbacks of the conventional methods described above. This VBC fiber is configured to vary a wide variety of optical beam characteristics. Such beam characteristics can be controlled using the VBC fiber thus allowing users to tune various beam characteristics to suit the particular requirements of an extensive variety of laser processing applications. For example, a VBC fiber may be used to tune: beam diameter, beam divergence distribution, BPP, intensity distribution, $M^2$ factor, NA, optical intensity, power density, radial beam position, radiance, spot size, or the like, or any combination thereof.

In general, the disclosed technology entails coupling a laser beam into a fiber in which the characteristics of the laser beam in the fiber can be adjusted by perturbing the laser beam and/or perturbing a first length of fiber by any of a variety of methods (e.g., bending the fiber or introducing one or more other perturbations) and fully or partially maintaining adjusted beam characteristics in a second length of fiber. The second length of fiber is specially configured to maintain and/or further modify the adjusted beam characteristics. In some cases, the second length of fiber preserves the adjusted beam characteristics through delivery of the laser beam to its ultimate use (e.g., materials processing). The first and second lengths of fiber may comprise the same or different fibers.

The disclosed technology is compatible with fiber lasers and fiber-coupled lasers. Fiber-coupled lasers typically deliver an output via a delivery fiber having a step-index refractive index profile (RIP), i.e., a flat or constant refractive index within the fiber core. In reality, the RIP of the delivery fiber may not be perfectly flat, depending on the design of the fiber. Important parameters are the fiber core diameter ($d_{core}$) and NA. The core diameter is typically in the range of 10-1000 micron (although other values are possible), and the NA is typically in the range of 0.06-0.22 (although other values are possible). A delivery fiber from the laser may be routed directly to the process head or work piece, or it may be routed to a fiber-to-fiber coupler (FFC) or fiber-to-fiber switch (FFS), which couples the light from the delivery fiber into a process fiber that transmits the beam to the process head or the work piece.

Most materials processing tools, especially those at high power (>1 kW), employ multimode (MM) fiber, but some employ single-mode (SM) fiber, which is at the lower end of the $d_{core}$ and NA ranges. The beam characteristics from a SM fiber are uniquely determined by the fiber parameters. The beam characteristics from a MM fiber, however, can vary (unit-to-unit and/or as a function of laser power and time), depending on the beam characteristics from the laser source(s) coupled into the fiber, the launching or splicing conditions into the fiber, the fiber RIP, and the static and dynamic geometry of the fiber (bending, coiling, motion, micro-bending, etc.). For both SM and MM delivery fibers, the beam characteristics may not be optimum for a given materials processing task, and it is unlikely to be optimum for a range of tasks, motivating the desire to be able to systematically vary the beam characteristics in order to customize or optimize them for a particular processing task.

In one example, the VBC fiber may have a first length and a second length and may be configured to be interposed as an in-fiber device between the delivery fiber and the process head to provide the desired adjustability of the beam characteristics. To enable adjustment of the beam, a perturbation device and/or assembly is disposed in close proximity to and/or coupled with the VBC fiber and is responsible for perturbing the beam in a first length such that the beam's characteristics are altered in the first length of fiber, and the altered characteristics are preserved or further altered as the beam propagates in the second length of fiber. The perturbed beam is launched into a second length of the VBC fiber configured to conserve adjusted beam characteristics. The first and second lengths of fiber may be the same or different fibers and/or the second length of fiber may comprise a confinement fiber. The beam characteristics that are conserved by the second length of VBC fiber may include any of: beam diameter, beam divergence distribution, BPP, intensity distribution, luminance, $M^2$ factor, NA, optical intensity, power density, radial beam position, radiance, spot size, or the like, or any combination thereof.

FIG. 1 illustrates an example VBC fiber 100 for providing a laser beam having variable beam characteristics without requiring the use of free-space optics to change the beam characteristics. VBC fiber 100 comprises a first length of fiber 104 and a second length of fiber 108. First length of fiber 104 and second length of fiber 108 may be the same or different fibers and may have the same or different RIPs. The first length of fiber 104 and the second length of fiber 108 may be joined together by a splice. First length of fiber 104 and second length of fiber 108 may be coupled in other ways, may be spaced apart, or may be connected via an interposing component such as another length of fiber, free-space optics, glue, index-matching material, or the like or any combination thereof.

A perturbation device 110 is disposed proximal to and/or envelops perturbation region 106. Perturbation device 110 may be a device, assembly, in-fiber structure, and/or other feature. Perturbation device 110 at least perturbs optical beam 102 in first length of fiber 104 or second length of fiber 108 or a combination thereof in order to adjust one or more beam characteristics of optical beam 102. Adjustment of beam 102 responsive to perturbation by perturbation device 110 may occur in first length of fiber 104 or second length of fiber 108 or a combination thereof. Perturbation region 106 may extend over various widths and may or may not extend into a portion of second length of fiber 108. As beam 102 propagates in VBC fiber 100, perturbation device 110 may physically act on VBC fiber 100 to perturb the fiber and adjust the characteristics of beam 102. Alternatively, perturbation device 110 may act directly on beam 102 to alter its beam characteristics. Subsequent to being adjusted, perturbed beam 112 has different beam characteristics than beam 102, which will be fully or partially conserved in second length of fiber 108. In another example, perturbation device 110 need not be disposed near a splice. Moreover, a splice may not be needed at all, for example VBC fiber 100 may be a single fiber, first length of fiber and second length of fiber could be spaced apart, or secured with a small gap (air-spaced or filled with an optical material, such as optical cement or an index-matching material).

Perturbed beam 112 is launched into second length of fiber 108, where perturbed beam 112 characteristics are largely maintained or continue to evolve as perturbed beam 112 propagates yielding the adjusted beam characteristics at the output of second length of fiber 108. In one example, the new beam characteristics may include an adjusted intensity distribution. In an example, an altered beam intensity distribution will be conserved in various structurally bounded confinement regions of second length of fiber 108. Thus, the beam intensity distribution may be tuned to a desired beam intensity distribution optimized for a particular laser processing task. In general, the intensity distribution of perturbed beam 112 will evolve as it propagates in the second length of fiber 108 to fill the confinement region(s) into which perturbed beam 112 is launched responsive to conditions in first length of fiber 104 and perturbation caused by perturbation device 110. In addition, the angular distribution may evolve as the beam propagates in the second fiber, depending on launch conditions and fiber characteristics. In general, fibers largely preserve the input divergence distribution, but the distribution can be broadened if the input divergence distribution is narrow and/or if the fiber has irregularities or deliberate features that perturb the divergence distribution. The various confinement regions, perturbations, and fiber features of second length of fiber 108 are described in greater detail below. Beams 102 and 112 are conceptual abstractions intended to illustrate how a beam may propagate through a VBC fiber 100 for providing variable beam characteristics and are not intended to closely model the behavior of a particular optical beam.

VBC fiber 100 may be manufactured by a variety of methods including PCVD (Plasma Chemical Vapor Deposition), OVD (Outside Vapor Deposition), VAD (Vapor Axial Deposition), MOCVD (Metal-Organic Chemical Vapor Deposition.) and/or DND (Direct Nanoparticle Deposition). VBC fiber 100 may comprise a variety of materials. For example, VBC fiber 100 may comprise $SiO_2$, $SiO_2$ doped with $GeO_2$, germanosilicate, phosphorus pentoxide, phosphosilicate, $Al_2O_3$, aluminosilicate, or the like or any combinations thereof. Confinement regions may be bounded by cladding doped with fluorine, boron, or the like or any combinations thereof. Other dopants may be added to active fibers, including rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like or any combination thereof. Confinement regions may be bounded by cladding having a lower index than the confinement region with fluorine or boron doping. Alternatively, VBC fiber 100 may comprise photonic crystal fibers or micro-structured fibers.

VBC fiber 100 is suitable for use in any of a variety of fiber, fiber optic, or fiber laser devices, including continuous wave and pulsed fiber lasers, disk lasers, solid state lasers, or diode lasers (pulse rate unlimited except by physical constraints). Furthermore, implementations in a planar waveguide or other types of waveguides and not just fibers are within the scope of the claimed technology.

Figure 2:
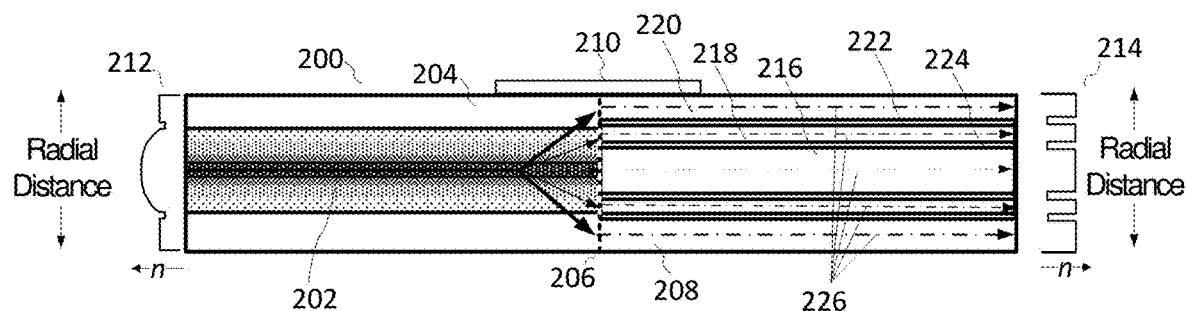
FIG. 2 depicts a cross-sectional view of an example fiber structure for delivering a beam with variable beam characteristics.

FIG. 2 depicts a cross-sectional view of an example VBC fiber 200 for adjusting beam characteristics of an optical beam. In an example, VBC fiber 200 may be a process fiber because it may deliver the beam to a process head for material processing. VBC fiber 200 comprises a first length of fiber 204 spliced at junction 206 to a second length of fiber 208. A perturbation assembly 210 is disposed proximal to junction 206. Perturbation assembly 210 may be any of a variety of devices configured to enable adjustment of the beam characteristics of an optical beam 202 propagating in VBC fiber 200. In an example, perturbation assembly 210 may be a mandrel and/or another device that may provide means of varying the bend radius and/or bend length of VBC fiber 200 near the splice. Other examples of perturbation devices are discussed below with respect to FIG. 24.

In an example, first length of fiber 204 has a parabolic-index RIP 212 as indicated by the left RIP graph. Most of the intensity distribution of beam 202 is concentrated in the center of fiber 204 when fiber 204 is straight or nearly straight. Second length of fiber 208 is a confinement fiber having RIP 214 as shown in the right RIP graph. Second length of fiber 208 includes confinement regions 216, 218 and 220. Confinement region 216 is a central core surrounded by two annular (or ring-shaped) confinement regions 218 and 220. Layers 222 and 224 are structural barriers of lower index material between confinement regions (216, 218 and 220), commonly referred to as "cladding" regions. In one example, layers 222 and 224 may comprise rings of fluorosilicate; in some embodiments, the fluorosilicate cladding layers are relatively thin. Other materials may be used as well and claimed subject matter is not limited in this regard.

In an example, as beam 202 propagates along VBC fiber 200, perturbation assembly 210 may physically act on fiber 208 and/or beam 202 to adjust its beam characteristics and generate adjusted beam 226. In the current example, the intensity distribution of beam 202 is modified by perturbation assembly 210. Subsequent to adjustment of beam 202 the intensity distribution of adjusted beam 226 may be concentrated in outer confinement regions 218 and 220 with relatively little intensity in the central confinement region 216. Because each of confinement regions 216, 218, and/or 220 is isolated by the thin layers of lower index material in barrier layers 222 and 224, second length of fiber 208 can substantially maintain the adjusted intensity distribution of adjusted beam 226. The beam will typically become distributed azimuthally within a given confinement region but will not transition (significantly) between the confinement regions as it propagates along the second length of fiber 208. Thus, the adjusted beam characteristics of adjusted beam 226 are largely conserved within the isolated confinement regions 216, 218, and/or 220. In some cases, it be may desirable to have the beam 226 power divided among the confinement regions 216, 218, and/or 220 rather than concentrated in a single region, and this condition may be achieved by generating an appropriately adjusted beam 226.

In one example, core confinement region 216 and annular confinement regions 218 and 220 may be composed of fused silica glass, and cladding 222 and 224 defining the confinement regions may be composed of fluorosilicate glass. Other materials may be used to form the various confinement regions (216, 218 and 220), including germanosilicate, phospho silicate, aluminosilicate, or the like, or a combination thereof and claimed subject matter is not so limited. Other materials may be used to form the barrier rings (222 and 224), including fused silica, borosilicate, or the like or a combination thereof, and claimed subject matter is not so limited. In other embodiments, the optical fibers or waveguides include or are composed of various polymers or plastics or crystalline materials. Generally, the core confinement regions have refractive indices that are greater than the refractive indices of adjacent barrier/cladding regions.

In some examples, it may be desirable to increase a number of confinement regions in a second length of fiber to increase granularity of beam control over beam displacements for fine-tuning a beam profile. For example, confinement regions may be configured to provide stepwise beam displacement.

Figure 3:
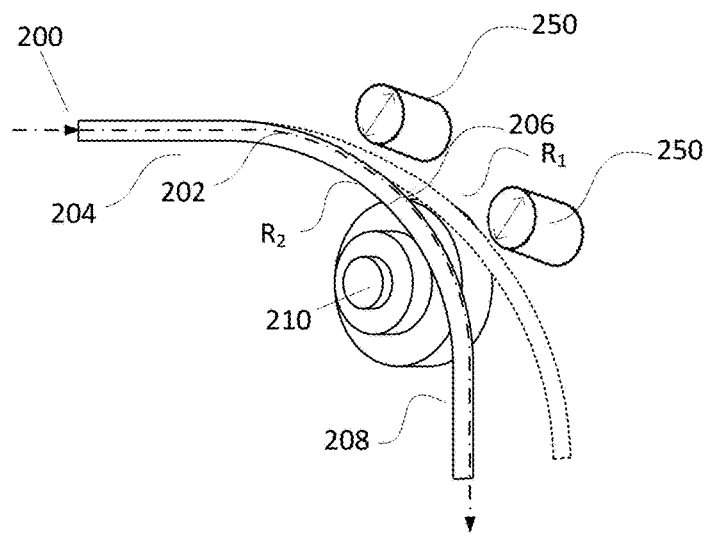
FIG. 3 illustrates an example method of perturbing a fiber structure for providing a beam having variable beam characteristics.

FIG. 3 illustrates an example method of perturbing fiber 200 for providing variable beam characteristics of an optical beam. Changing the bend radius of a fiber may change the radial beam position, divergence angle, and/or radiance profile of a beam within the fiber. The bend radius of VBC fiber 200 can be decreased from a first bend radius $R_1$ to a second bend radius $R_2$ about splice junction 206 by using a stepped mandrel or cone as the perturbation assembly 210. Additionally or alternatively, the engagement length on the mandrel(s) or cone can be varied. Rollers 250 may be employed to engage VBC fiber 200 across perturbation assembly 210. In an example, an amount of engagement of rollers 250 with fiber 200 has been shown to shift the distribution of the intensity profile to the outer confinement regions 218 and 220 of fiber 200 with a fixed mandrel radius. There are a variety of other methods for varying the bend radius of fiber 200, such as using a clamping assembly, flexible tubing, or the like, or a combination thereof, and claimed subject matter is not limited in this regard. In another example, for a particular bend radius the length over which VBC fiber 200 is bent can also vary beam characteristics in a controlled and reproducible way. In examples, changing the bend radius and/or length over which the fiber is bent at a particular bend radius also modifies the intensity distribution of the beam such that one or more modes may be shifted radially away from the center of a fiber core.

Maintaining the bend radius of the fibers across junction 206 ensures that the adjusted beam characteristics such as radial beam position and radiance profile of optical beam 202 will not return to beam 202's unperturbed state before being launched into second length of fiber 208. Moreover, the adjusted radial beam characteristics, including position, divergence angle, and/or intensity distribution, of adjusted beam 226 can be varied based on an extent of decrease in the bend radius and/or the extent of the bent length of VBC fiber 200. Thus, specific beam characteristics may be obtained using this method.

In the current example, first length of fiber 204 having first RIP 212 is spliced at junction 206 to a second length of fiber 208 having a second RIP 214. However, it is possible to use a single fiber having a single RIP formed to enable perturbation (e.g., by micro-bending) of the beam characteristics of beam 202 and also to enable conservation of the adjusted beam. Such a RIP may be similar to the RIPs shown in fibers illustrated in FIGS. 17, 18, and/or 19.

Figure 4:
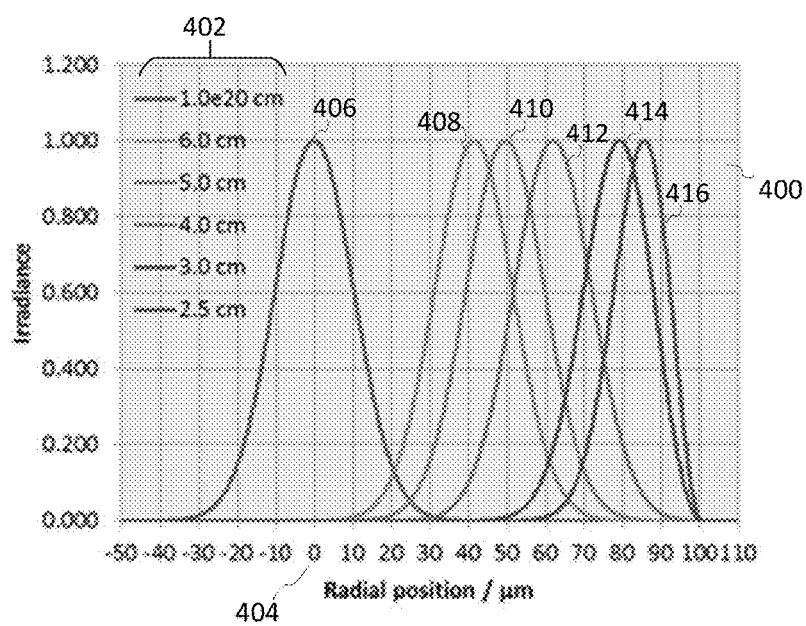
FIG. 4 is a graph illustrating the calculated spatial profile of the lowest-order mode ($LP_{01}$) for a first length of a fiber for different fiber bend radii.
Figure 5:
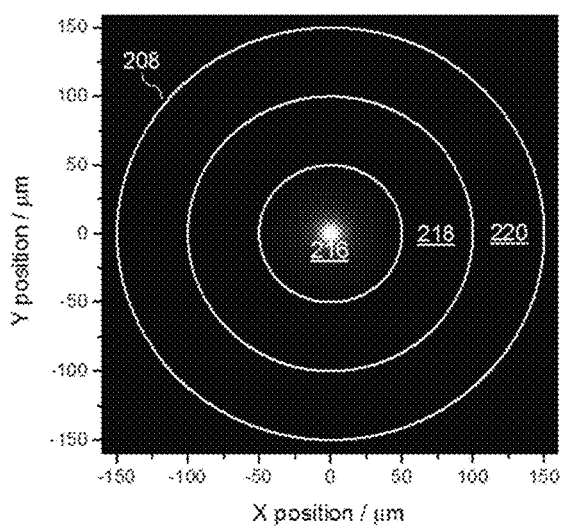
FIG. 5 illustrates an example of a two-dimensional intensity distribution at a junction when a fiber for varying beam characteristics is nearly straight.
Figure 6:
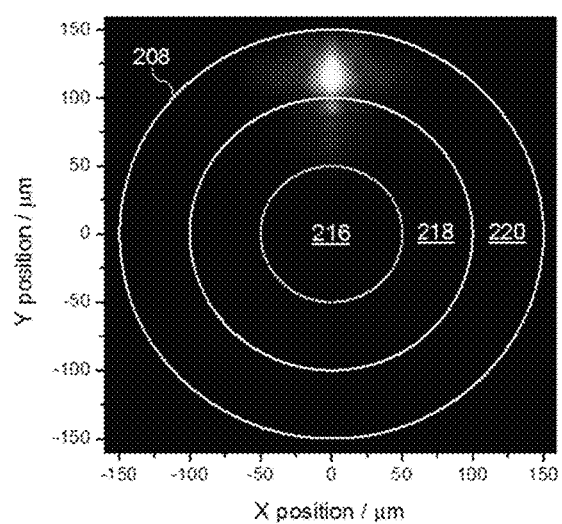
FIG. 6 illustrates an example of a two-dimensional intensity distribution at a junction when a fiber for varying beam characteristics is bent with a radius chosen to preferentially excite a particular confinement region of a second length of fiber.

FIGS. 7-10 provide experimental results for VBC fiber 200 (shown in FIGS. 2 and 3) and illustrate further a beam response to perturbation of VBC fiber 200 when a perturbation assembly 210 acts on VBC fiber 200 to bend the fiber. FIGS. 4-6 are simulations and FIGS. 7-10 are experimental results wherein a beam from a SM 1050 nm source was launched into an input fiber (not shown) with a 40 micron core diameter. The input fiber was spliced to first length of fiber 204.

FIG. 4 is an example graph 400 illustrating the calculated profile of the lowest-order mode ($LP_{01}$) for a first length of fiber 204 for different fiber bend radii 402, wherein a perturbation assembly 210 involves bending VBC fiber 200. As the fiber bend radius is decreased, an optical beam propagating in VBC fiber 200 is adjusted such that the mode shifts radially away from the center 404 of a VBC fiber 200 core (r=0 micron) toward the core/cladding interface (located at r=100 micron in this example). Higher-order modes ($LP_{in}$) also shift with bending. Thus, a straight or nearly straight fiber (very large bend radius), curve 406 for $LP_{01}$ is centered at or near the center of VBC fiber 200. At a bend radius of about 6 cm, curve 408 for $LP_{01}$ is shifted to a radial position of about 40 μm from the center 406 of VBC fiber 200. At a bend radius of about 5 cm, curve 410 for $LP_{01}$ is shifted to a radial position about 50 μm from the center 406 of VBC fiber 200. At a bend radius of about 4 cm, curve 412 for $LP_{01}$ is shifted to a radial position about 60 μm from the center 406 of VBC fiber 200. At a bend radius of about 3 cm, curve 414 for $LP_{01}$ is shifted to a radial position about 80 μm from the center 406 of VBC fiber 200. At a bend radius of about 2.5 cm, a curve 416 for $LP_{01}$ is shifted to a radial position about 85 μm from the center 406 of VBC fiber 200. Note that the shape of the mode remains relatively constant (until it approaches the edge of the core), which is a specific property of a parabolic RIP. Although, this property may be desirable in some situations, it is not required for the VBC functionality, and other RIPs may be employed.

In an example, if VBC fiber 200 is straightened, $LP_{01}$ mode will shift back toward the center of the fiber. Thus, the purpose of second length of fiber 208 is to "trap" or confine the adjusted intensity distribution of the beam in a confinement region that is displaced from the center of the VBC fiber 200. The splice between fibers 204 and 208 is included in the bent region, thus the shifted mode profile will be preferentially launched into one of the ring-shaped confinement regions 218 and 220 or be distributed among the confinement regions. FIGS. 5 and 6 illustrate this effect.

FIG. 5 illustrates an example two-dimensional intensity distribution at junction 206 within second length of fiber 208 when VBC fiber 200 is nearly straight. A significant portion of $LP_{01}$ and $LP_{in}$ are within confinement region 216 of fiber 208. FIG. 6 illustrates the two-dimensional intensity distribution at junction 206 within second length of fiber 208 when VBC fiber 200 is bent with a radius chosen to preferentially excite confinement region 220 (the outermost confinement region) of second length of fiber 208. A significant portion of $LP_{01}$ and $LP_{in}$ are within confinement region 220 of fiber 208.

In an example, second length of fiber 208 confinement region 216 has a 100 micron diameter, confinement region 218 is between 120 micron and 200 micron in diameter, and confinement region 220 is between 220 micron and 300 micron diameter. Confinement regions 216, 218, and 220 are separated by 10 um thick rings of fluorosilicate, providing an NA of 0.22 for the confinement regions. Other inner and outer diameters for the confinement regions, thicknesses of the rings separating the confinement regions, NA values for the confinement regions, and numbers of confinement regions may be employed.

Referring again to FIG. 5, with the noted parameters, when VBC fiber 200 is straight about 90% of the power is contained within the central confinement region 216, and about 100% of the power is contained within confinement regions 216 and 218. Referring now to FIG. 6, when fiber 200 is bent to preferentially excite second ring confinement region 220, nearly 75% of the power is contained within confinement region 220, and more than 95% of the power is contained within confinement regions 218 and 220. These calculations include $LP_{01}$ and two higher-order modes, which is typical in some 2-4 kW fiber lasers.

It is clear from FIGS. 5 and 6 that in the case where a perturbation assembly 210 acts on VBC fiber 200 to bend the fiber, the bend radius determines the spatial overlap of the modal intensity distribution of the first length of fiber 204 with the different guiding confinement regions (216, 218, and 220) of the second length of fiber 208. Changing the bend radius can thus change the intensity distribution at the output of the second length of fiber 208, thereby changing the diameter or spot size of the beam, and thus also changing its radiance and BPP value. This adjustment of the spot size may be accomplished in an all-fiber structure, involving no free-space optics and consequently may reduce or eliminate the disadvantages of free-space optics discussed above. Such adjustments can also be made with other perturbation assemblies that alter bend radius, bend length, fiber tension, temperature, or other perturbations discussed below.

In a typical materials processing system (e.g., a cutting or welding tool), the output of the process fiber is imaged at or near the work piece by the process head. Varying the intensity distribution as shown in FIGS. 5 and 6 thus enables variation of the beam profile at the work piece in order to tune and/or optimize the process, as desired. Specific RIPs for the two fibers were assumed for the purpose of the above calculations, but other RIPs are possible, and claimed subject matter is not limited in this regard.

FIGS. 7-10 depict experimental results (measured intensity distributions) to illustrate further output beams for various bend radii of VBC fiber 200 shown in FIG. 2.

Figure 7:
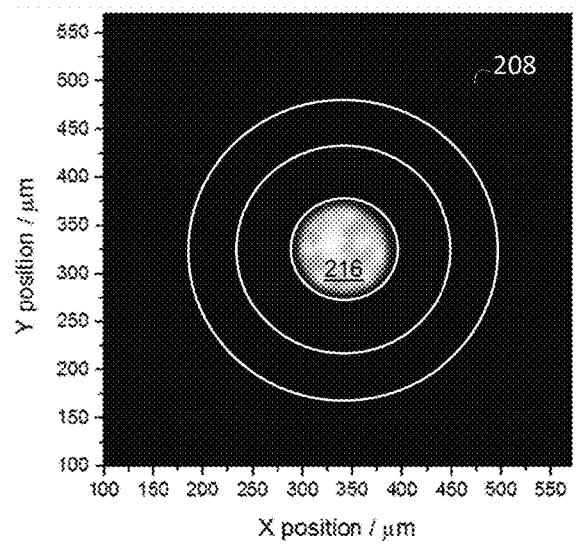
FIGS. 7-10 depict experimental results to illustrate further output beams for various bend radii of a fiber for varying beam characteristics shown in FIG. 2.
Figure 8:
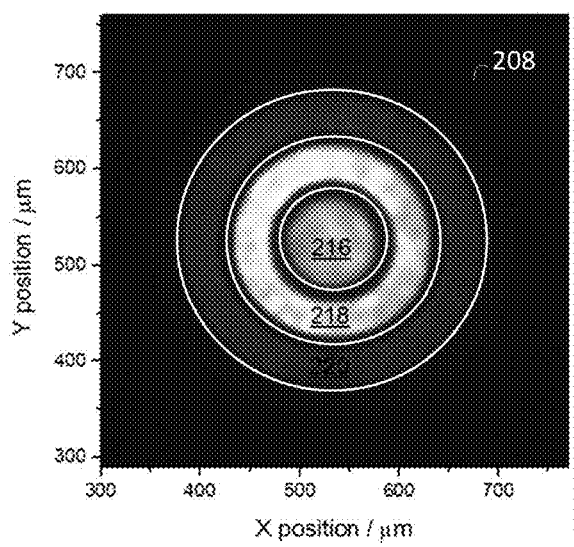
Figure 9:
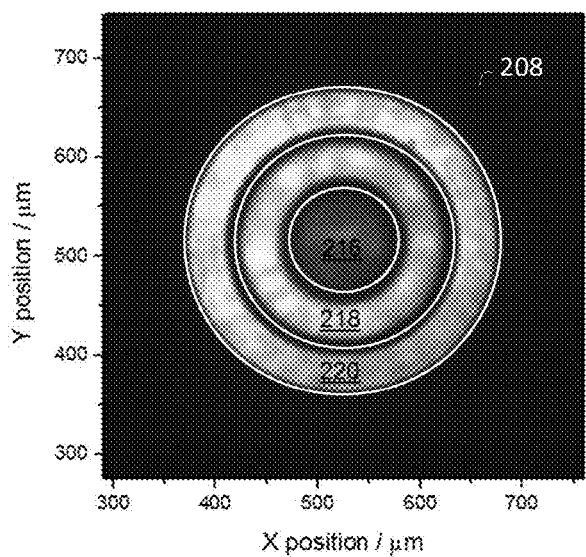
Figure 10:
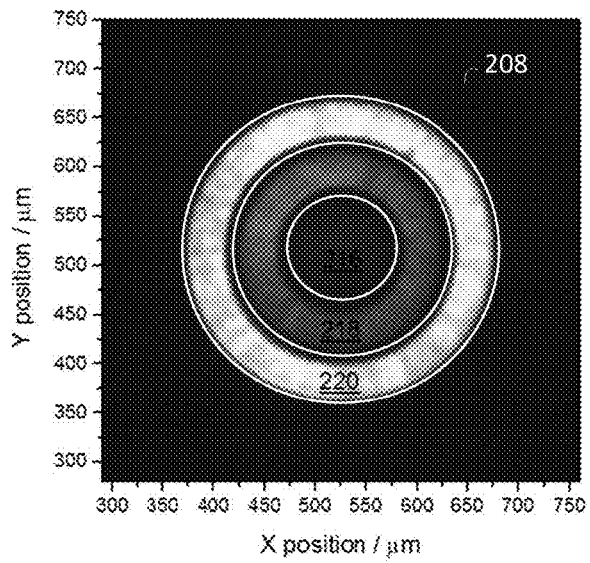

In FIG. 7 when VBC fiber 200 is straight, the beam is nearly completely confined to confinement region 216. As the bend radius is decreased, the intensity distribution shifts to higher diameters (FIGS. 8-10). FIG. 8 depicts the intensity distribution when the bend radius of VBC fiber 200 is chosen to shift the intensity distribution preferentially to confinement region 218. FIG. 9 depicts the experimental results when the bend radius is further reduced and chosen to shift the intensity distribution outward to confinement region 220 and confinement region 218. In FIG. 10, at the smallest bend radius, the beam is nearly a "donut mode", with most of the intensity in the outermost confinement region 220.

Despite excitation of the confinement regions from one side at the splice junction 206, the intensity distributions are nearly symmetric azimuthally because of scrambling within confinement regions as the beam propagates within the VBC fiber 200. Although the beam will typically scramble azimuthally as it propagates, various structures or perturbations (e.g., coils) could be included to facilitate this process.

For the fiber parameters used in the experiment shown in FIGS. 7-10, particular confinement regions were not exclusively excited because some intensity was present in multiple confinement regions. This feature may enable advantageous materials processing applications that are optimized by having a flatter or distributed beam intensity distribution. In applications requiring cleaner excitation of a given confinement region, different fiber RIPs could be employed to enable this feature.

The results shown in FIGS. 7-10 pertain to the particular fibers used in this experiment, and the details will vary depending on the specifics of the implementation. In particular, the spatial profile and divergence distribution of the output beam and their dependence on bend radius will depend on the specific RIPs employed, on the splice parameters, and on the characteristics of the laser source launched into the first fiber.

Different fiber parameters than those shown in FIG. 2 may be used and still be within the scope of the claimed subject matter. Specifically, different RIPs and core sizes and shapes may be used to facilitate compatibility with different input beam profiles and to enable different output beam characteristics. Example RIPs for the first length of fiber, in addition to the parabolic-index profile shown in FIG. 2, include other graded-index profiles, step-index, pedestal designs (i.e., nested cores with progressively lower refractive indices with increasing distance from the center of the fiber), and designs with nested cores with the same refractive index value but with various NA values for the central core and the surrounding rings. Example RIPs for the second length of fiber, in addition to the profile shown in FIG. 2, include confinement fibers with different numbers of confinement regions, non-uniform confinement-region thicknesses, different and/or non-uniform values for the thicknesses of the rings surrounding the confinement regions, different and/or non-uniform NA values for the confinement regions, different refractive-index values for the high-index and low-index portions of the RIP, non-circular confinement regions (such as elliptical, oval, polygonal, square, rectangular, or combinations thereof), as well as other designs as discussed in further detail with respect to FIGS. 26-28. Furthermore, VBC fiber 200 and other examples of a VBC fiber described herein are not restricted to use of two fibers. In some examples, implementation may include use of one fiber or more than two fibers. In some cases, the fiber(s) may not be axially uniform; for example, they could include fiber Bragg gratings or long-period gratings, or the diameter could vary along the length of the fiber. In addition, the fibers do not have to be azimuthally symmetric, e.g., the core(s) could have square or polygonal shapes. Various fiber coatings (buffers) may be employed, including high-index or index-matched coatings (which strip light at the glass-polymer interface) and low-index coatings (which guide light by total internal reflection at the glass-polymer interface). In some examples, multiple fiber coatings may be used on VBC fiber 200.

FIGS. 11-16 illustrate cross-sectional views of examples of first lengths of fiber for enabling adjustment of beam characteristics in a VBC fiber responsive to perturbation of an optical beam propagating in the first lengths of fiber. Some examples of beam characteristics that may be adjusted in the first length of fiber are: beam diameter, beam divergence distribution, BPP, intensity distribution, luminance, $M^2$ factor, NA, optical intensity profile, power density profile, radial beam position, radiance, spot size, or the like, or any combination thereof. The first lengths of fiber depicted in FIGS. 11-16 and described below are merely examples and do not provide an exhaustive recitation of the variety of first lengths of fiber that may be utilized to enable adjustment of beam characteristics in a VBC fiber assembly. Selection of materials, appropriate RIPs, and other variables for the first lengths of fiber illustrated in FIGS. 11-16 at least depend on a desired beam output. A wide variety of fiber variables are contemplated and are within the scope of the claimed subject matter. Thus, claimed subject matter is not limited by examples provided herein.

Figure 11:
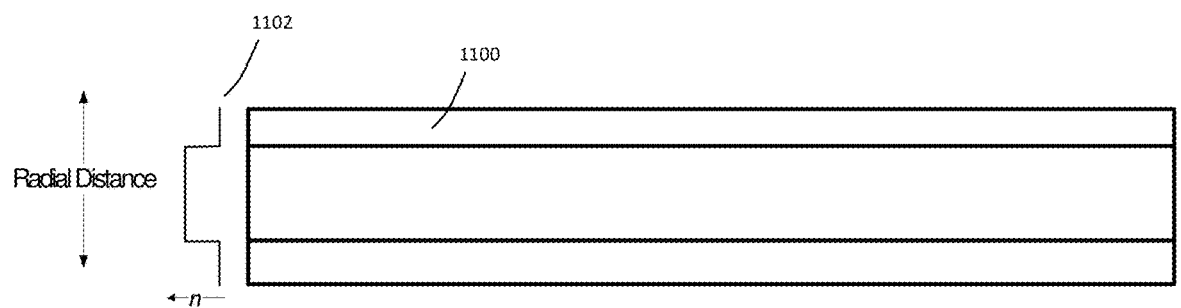
FIGS. 11-16 illustrate cross-sectional views of example first lengths of fiber for enabling adjustment of beam characteristics in a fiber assembly.
Figure 12:
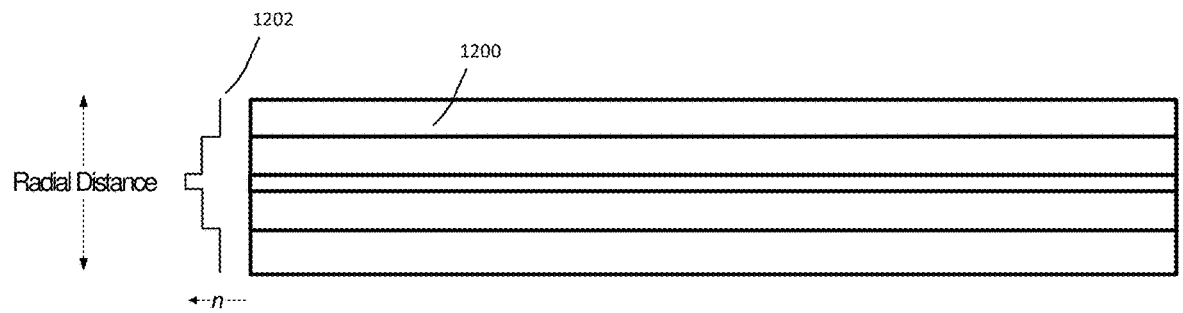
Figure 13:
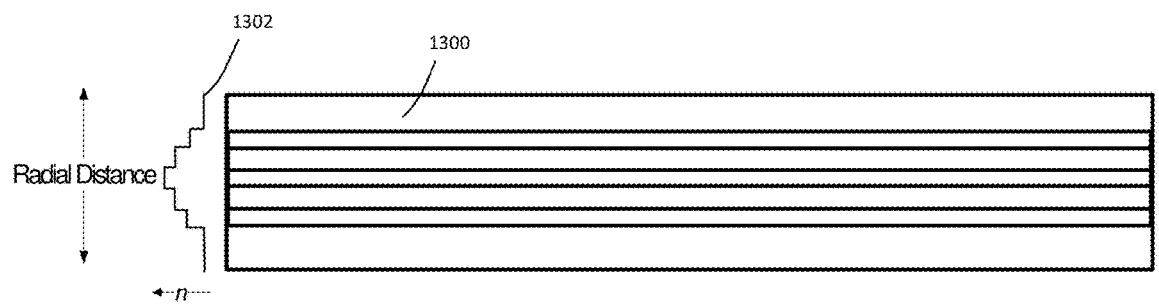

In FIG. 11 first length of fiber 1100 comprises a step-index profile 1102. FIG. 12 illustrates a first length of fiber 1200 comprising a "pedestal RIP" (i.e., a core comprising a step-index region surrounded by a larger step-index region) 1202. FIG. 13 illustrates first length of fiber 1300 comprising a multiple-pedestal RIP 1302.

Figure 14A:
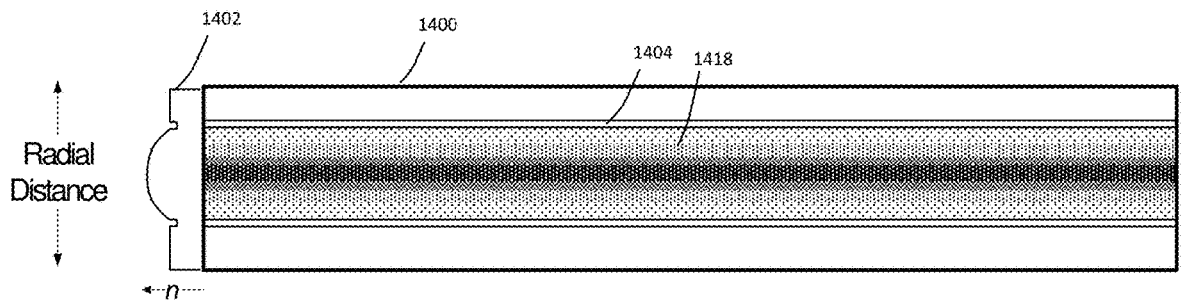

FIG. 14A illustrates first length of fiber 1400 comprising a graded-index profile 1418 surrounded by a down-doped region 1404. When the fiber 1400 is perturbed, modes may shift radially outward in fiber 1400 (e.g., during bending of fiber 1400). Graded-index profile 1402 may be designed to promote maintenance or even compression of modal shape. This design may promote adjustment of a beam propagating in fiber 1400 to generate a beam having a beam intensity distribution concentrated in an outer perimeter of the fiber (i.e., in a portion of the fiber core that is displaced from the fiber axis). As described above, when the adjusted beam is coupled into a second length of fiber having confinement regions, the intensity distribution of the adjusted beam may be trapped in the outermost confinement region, providing a donut shaped intensity distribution. A beam spot having a narrow outer confinement region may be useful to enable certain material processing actions.

Figure 14B:
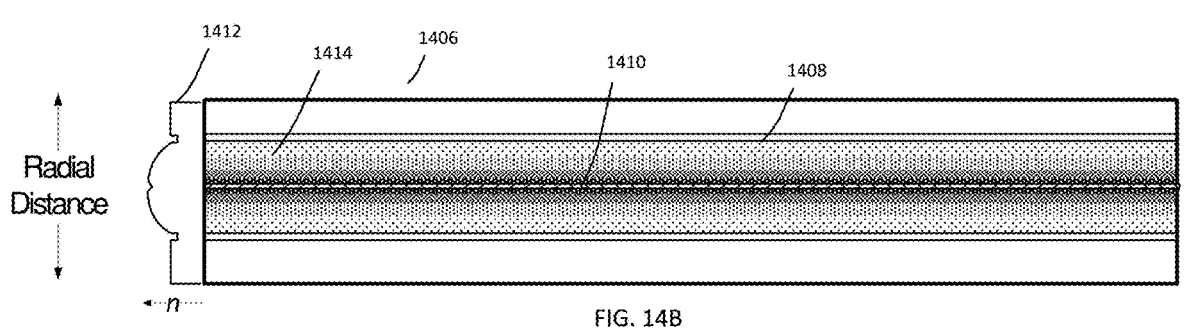

FIG. 14B illustrates first length of fiber 1406 comprising a graded-index profile 1414 surrounded by a down-doped region 1408 similar to fiber 1400. However, fiber 1406 includes a divergence structure 1410 (a lower-index region) as can be seen in profile 1412. The divergence structure 1410 is an area of material with a lower refractive index than that of the surrounding core. As the beam is launched into first length of fiber 1406, refraction from divergence structure 1410 causes the beam divergence to increase in first length of fiber 1406. The amount of increased divergence depends on the amount of spatial overlap of the beam with the divergence structure 1410 and the magnitude of the index difference between the divergence structure 1410 and the core material. Divergence structure 1410 can have a variety of shapes, depending on the input divergence distribution and desired output divergence distribution. In an example, divergence structure 1410 has a triangular or graded index shape.

Figure 15:
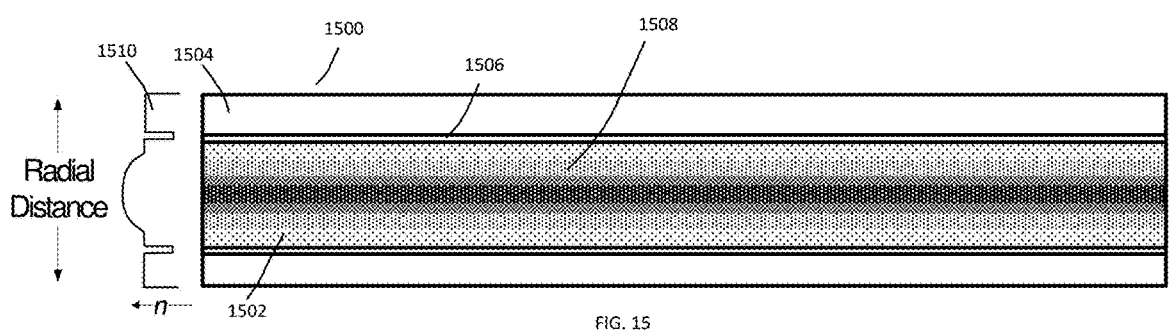

FIG. 15 illustrates a first length of fiber 1500 comprising a parabolic-index central region 1502 surrounded by a constant-index region 1504, and the constant-index region 1504 is surrounded by a lower-index annular layer 1506. The lower-index annulus 1506 helps guide a beam propagating in fiber 1500. When the propagating beam is perturbed, modes shift radially outward in fiber 1500 (e.g., during bending of fiber 1500). As one or more modes shift radially outward, parabolic-index region 1502 promotes retention of modal shape. When the modes reach the constant-index region of the RIP 1510, they will be compressed against the low-index ring 1506, which may cause preferential excitation of the outermost confinement region in the second fiber (in comparison to the first fiber RIP shown in FIG. 14). In one implementation, this fiber design works with a confinement fiber having a central step-index core and a single annular core. The parabolic-index portion 1502 of the RIP overlaps with the central step-index core of the confinement fiber. The constant-index portion 1504 overlaps with the annular core of the confinement fiber. The constant-index portion 1504 of the first fiber is intended to make it easier to move the beam into overlap with the annular core by bending. This fiber design also works with other designs of the confinement fiber.

Figure 16:
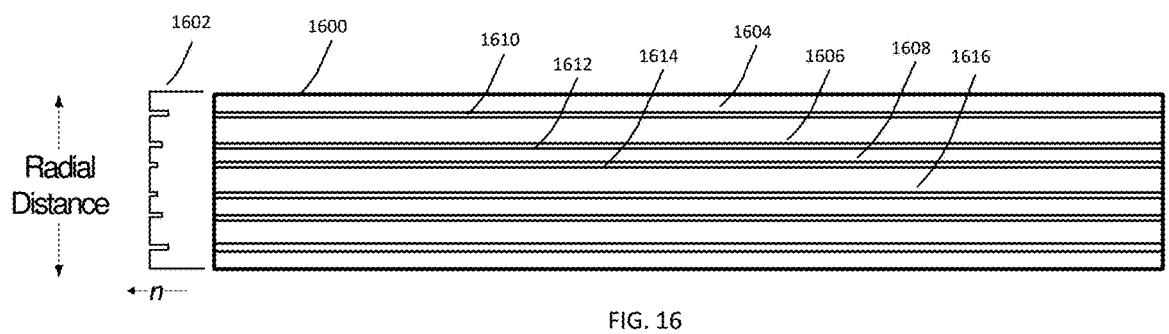

FIG. 16 illustrates a first length of fiber 1600 comprising guiding regions 1604, 1606, 1608, and 1616 bounded by lower-index layers 1610, 1612, and 1614 where the indexes of the lower-index layers 1610, 1612, and 1614 are stepped or, more generally, do not all have the same value. The stepped-index layers may serve to bound the beam intensity to certain guiding regions (1604, 1606, 1608, and 1616) when the perturbation assembly 210 (see FIG. 2) acts on the fiber 1600. In this way, adjusted beam light may be trapped in the guiding regions over a range of perturbation actions (such as over a range of bend radii, a range of bend lengths, a range of micro-bending pressures, and/or a range of acousto-optical signals), allowing for a certain degree of perturbation tolerance before a beam intensity distribution is shifted to a more distant radial position in fiber 1600. Thus, variation in beam characteristics may be controlled in a step-wise fashion. The radial widths of the guiding regions 1604, 1606, 1608, and 1616 may be adjusted to achieve a desired ring width, as may be required by an application. Also, a guiding region can have a thicker radial width to facilitate trapping of a larger fraction of the incoming beam profile if desired. Region 1606 is an example of such a design.

FIGS. 17-21 depict examples of fibers configured to enable maintenance and/or confinement of adjusted beam characteristics in the second length of fiber (e.g., fiber 208). These fiber designs are referred to as "ring-shaped confinement fibers" because they contain a central core surrounded by annular or ring-shaped cores. These designs are merely examples and not an exhaustive recitation of the variety of fiber RIPs that may be used to enable maintenance and/or confinement of adjusted beam characteristics within a fiber. Thus, claimed subject matter is not limited to the examples provided herein. Moreover, any of the first lengths of fiber described above with respect to FIGS. 11-16 may be combined with any of the second length of fiber described FIGS. 17-21.

Figure 17:
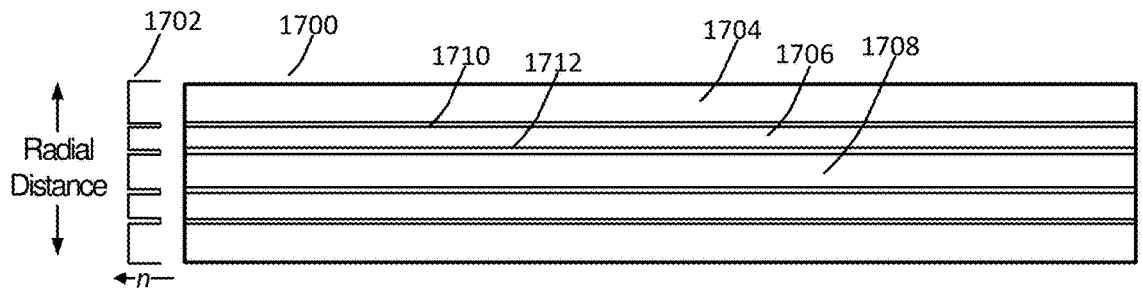
FIGS. 17-19 illustrate cross-sectional views of example second lengths of fiber ("confinement fibers") for confining adjusted beam characteristics in a fiber assembly.

FIG. 17 illustrates a cross-sectional view of an example second length of fiber for maintaining and/or confining adjusted beam characteristics in a VBC fiber assembly. As the perturbed beam is coupled from a first length of fiber to second length of fiber 1700, the second length of fiber 1700 may maintain at least a portion of the beam characteristics adjusted in response to perturbation in the first length of fiber within one or more of confinement regions 1704, 1706, and/or 1708. Fiber 1700 has a RIP 1702. Each of confinement regions 1704, 1706, and/or 1708 is bounded by a lower index layer 1710 and/or 1712. This design enables second length of fiber 1700 to maintain the adjusted beam characteristics. As a result, a beam output by fiber 1700 will substantially maintain the received adjusted beam as modified in the first length of fiber giving the output beam adjusted beam characteristics, which may be customized to a processing task or other application.

Figure 18:
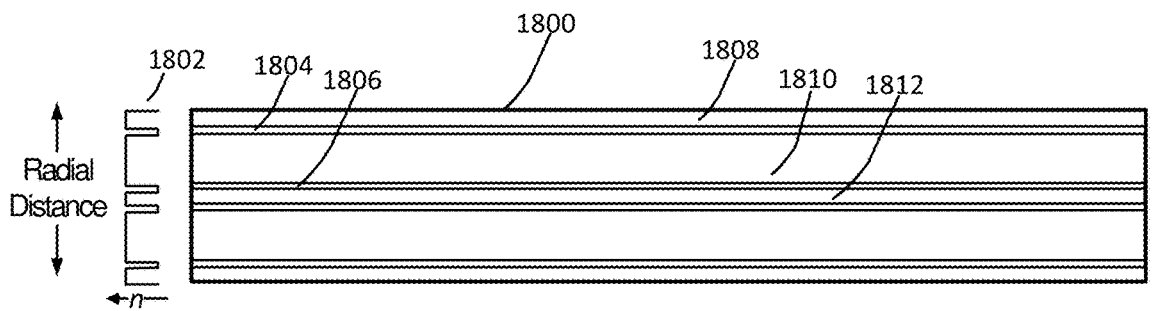

Similarly, FIG. 18 depicts a cross-sectional view of an example second length of fiber 1800 for maintaining and/or confining beam characteristics adjusted in response to perturbation in the first length of fiber in a VBC fiber assembly. Fiber 1800 has a RIP 1802. However, confinement regions 1808, 1810, and/or 1812 have different thicknesses than confinement regions 1704, 1706, and 1708. Each of confinement regions 1808, 1810, and/or 1812 is bounded by a lower index layer 1804 and/or 1806. Varying the thicknesses of the confinement regions (and/or barrier regions) enables tailoring or optimization of a confined adjusted radiance profile by selecting particular radial positions within which to confine an adjusted beam.

Figure 19:
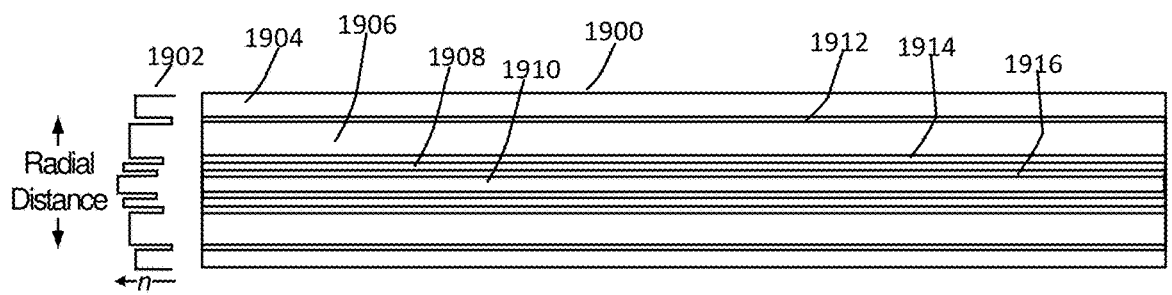

FIG. 19 depicts a cross-sectional view of an example second length of fiber 1900 having a RIP 1902 for maintaining and/or confining an adjusted beam in a VBC fiber assembly configured to provide variable beam characteristics. In this example, the number and thicknesses of confinement regions 1904, 1906, 1908, and 1910 are different from fiber 1700 and 1800 and the barrier layers 1912, 1914, and 1916 are of varied thicknesses as well. Furthermore, confinement regions 1904, 1906, 1908, and 1910 have different indexes of refraction and barrier layers 1912, 1914, and 1916 have different indexes of refraction as well. This design may further enable a more granular or optimized tailoring of the confinement and/or maintenance of an adjusted beam radiance to particular radial locations within fiber 1900. As the perturbed beam is launched from a first length of fiber to second length of fiber 1900 the modified beam characteristics of the beam (having an adjusted intensity distribution, radial position, and/or divergence angle, or the like, or a combination thereof) is confined within a specific radius by one or more of confinement regions 1904, 1906, 1908 and/or 1910 of second length of fiber 1900.

As noted previously, the divergence angle of a beam may be conserved or adjusted and then conserved in the second length of fiber. There are a variety of methods to change the divergence angle of a beam. The following are examples of fibers configured to enable adjustment of the divergence angle of a beam propagating from a first length of fiber to a second length of fiber in a fiber assembly for varying beam characteristics. However, these are merely examples and not an exhaustive recitation of the variety of methods that may be used to enable adjustment of divergence of a beam. Thus, claimed subject matter is not limited to the examples provided herein.

Figure 20:
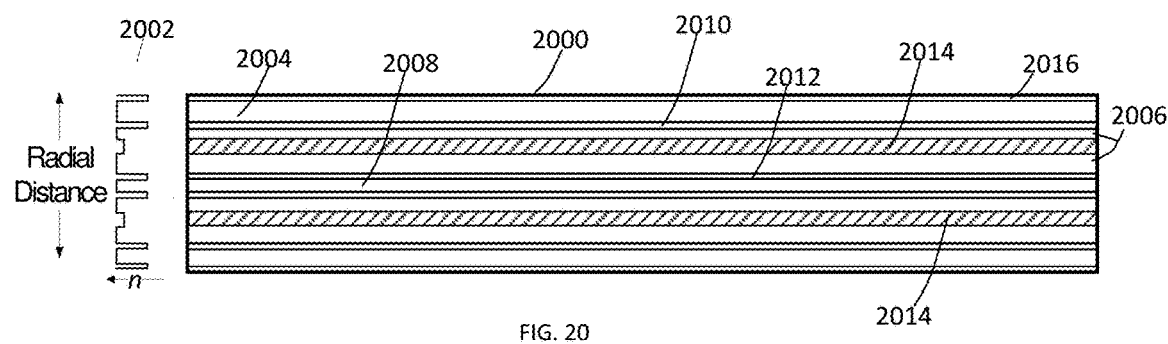
FIGS. 20 and 21 illustrate cross-sectional views of example second lengths of fiber for changing a divergence angle of and confining an adjusted beam in a fiber assembly configured to provide variable beam characteristics.

FIG. 20 depicts a cross-sectional view of an example second length of fiber 2000 having RIP 2002 for modifying, maintaining, and/or confining beam characteristics adjusted in response to perturbation in the first length of fiber. In this example, second length of fiber 2000 is similar to the previously described second lengths of fiber and forms a portion of the VBC fiber assembly for delivering variable beam characteristics as discussed above. There are three confinement regions 2004, 2006, and 2008 and three barrier layers 2010, 2012, and 2016. Second length of fiber 2000 also has a divergence structure 2014 situated within the confinement region 2006. The divergence structure 2014 is an area of material with a lower refractive index than that of the surrounding confinement region. As the beam is launched into second length of fiber 2000 refraction from divergence structure 2014 causes the beam divergence to increase in second length of fiber 2000. The amount of increased divergence depends on the amount of spatial overlap of the beam with the divergence structure 2014 and the magnitude of the index difference between the divergence structure 2014 and the core material. By adjusting the radial position of the beam near the launch point into the second length of fiber 2000, the divergence distribution may be varied. The adjusted divergence of the beam is conserved in fiber 2000, which is configured to deliver the adjusted beam to the process head, another optical system (e.g., fiber-to-fiber coupler or fiber-to-fiber switch), the work piece, or the like, or a combination thereof. In an example, divergence structure 2014 may have an index dip of about $10^{-5}$-$3\times10^{-2}$ with respect to the surrounding material. Other values of the index dip may be employed within the scope of this disclosure and claimed subject matter is not so limited.

Figure 21:
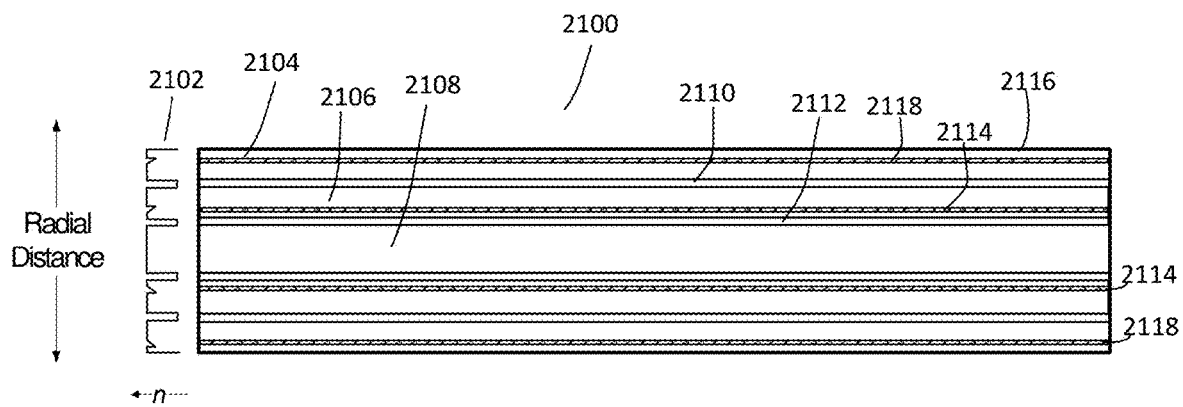

FIG. 21 depicts a cross-sectional view of an example second length of fiber 2100 having a RIP 2102 for modifying, maintaining, and/or confining beam characteristics adjusted in response to perturbation in the first length of fiber. Second length of fiber 2100 forms a portion of a VBC fiber assembly for delivering a beam having variable characteristics. In this example, there are three confinement regions 2104, 2106, and 2108 and three barrier layers 2110, 2112, and 2116. Second length of fiber 2100 also has a plurality of divergence structures 2114 and 2118. The divergence structures 2114 and 2118 are areas of graded lower index material. As the beam is launched from the first length fiber into second length of fiber 2100, refraction from divergence structures 2114 and 2118 causes the beam divergence to increase. The amount of increased divergence depends on the amount of spatial overlap of the beam with the divergence structure and the magnitude of the index difference between the divergence structure 2114 and/or 2118 and the surrounding core material of confinement regions 2106 and 2104 respectively. By adjusting the radial position of the beam near the launch point into the second length of fiber 2100, the divergence distribution may be varied. The design shown in FIG. 21 allows the intensity distribution and the divergence distribution to be varied somewhat independently by selecting both a particular confinement region and the divergence distribution within that conferment region (because each confinement region may include a divergence structure). The adjusted divergence of the beam is conserved in fiber 2100, which is configured to deliver the adjusted beam to the process head, another optical system, or the work piece. Forming the divergence structures 2114 and 2118 with a graded or non-constant index enables tuning of the divergence profile of the beam propagating in fiber 2100. An adjusted beam characteristic such as a radiance profile and/or divergence profile may be conserved as it is delivered to a process head by the second fiber. Alternatively, an adjusted beam characteristic such as a radiance profile and/or divergence profile may be conserved or further adjusted as it is routed by the second fiber through a fiber-to-fiber coupler (FFC) and/or fiber-to-fiber switch (FFS) and to a process fiber, which delivers the beam to the process head or the work piece.

Figure 26:
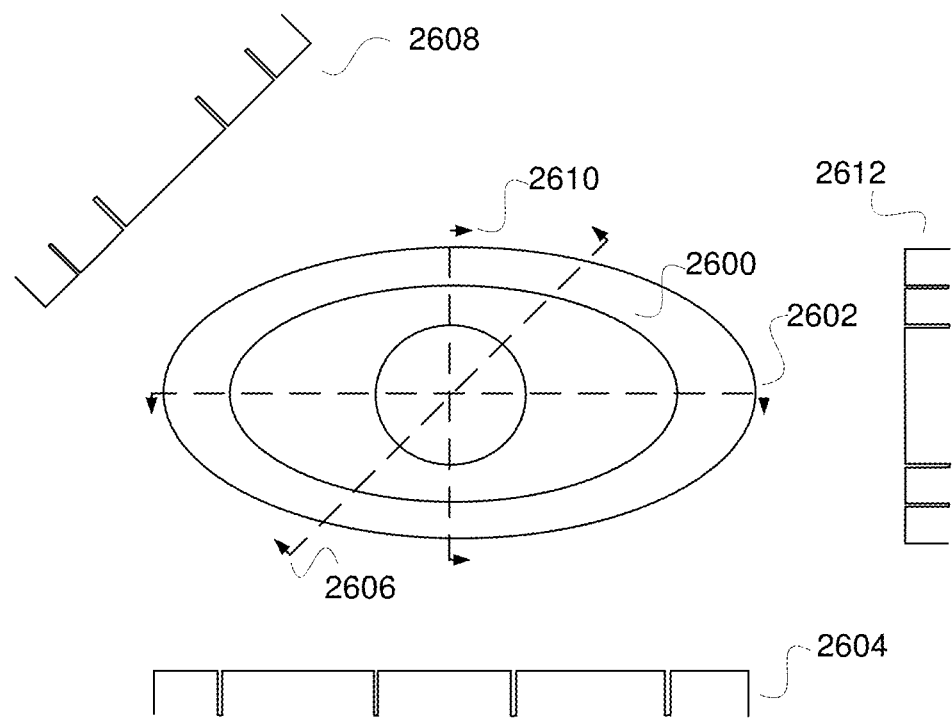
FIGS. 26-28 are cross-sectional views illustrating example second lengths of fiber ("confinement fibers") for confining adjusted beam characteristics in a fiber assembly.
Figure 27:
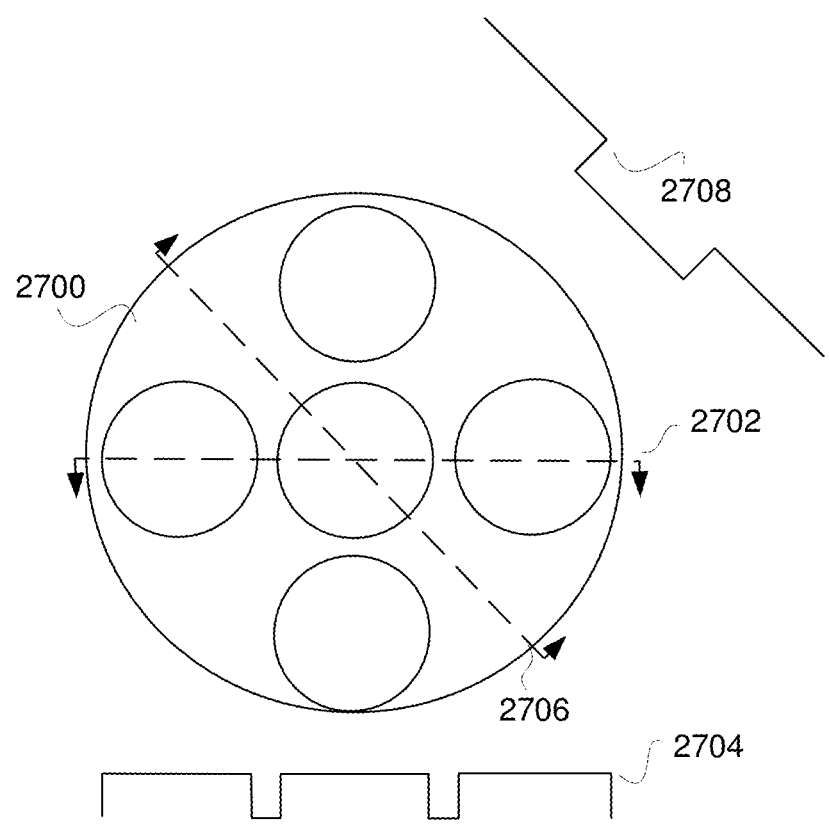
Figure 28:
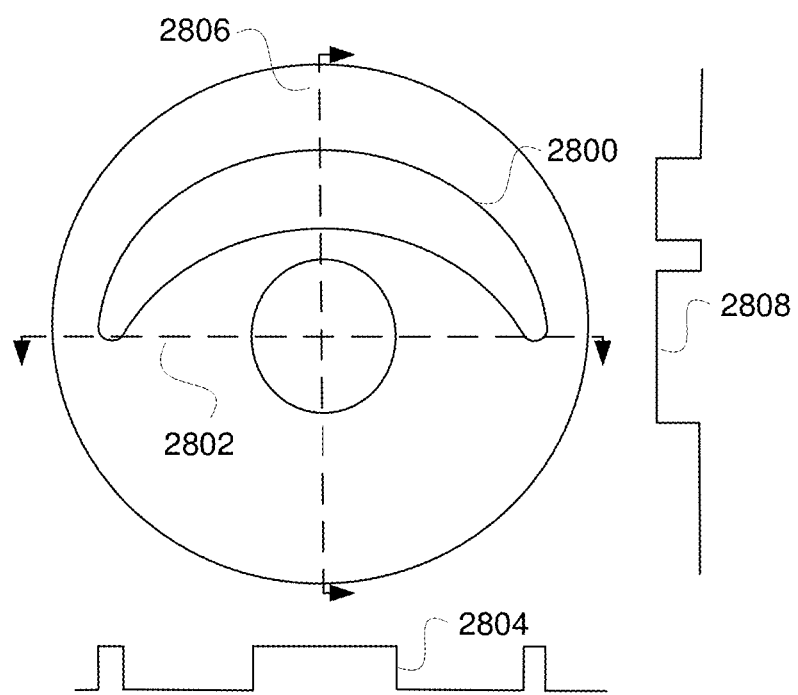

FIGS. 26-28 are cross-sectional views illustrating examples of fibers and fiber RIPs configured to enable maintenance and/or confinement of adjusted beam characteristics of a beam propagating in an azimuthally asymmetric second length of fiber wherein the beam characteristics are adjusted responsive to perturbation of a first length of fiber coupled to the second length of fiber and/or perturbation of the beam by a perturbation device 110. These azimuthally asymmetric designs are merely examples and are not an exhaustive recitation of the variety of fiber RIPs that may be used to enable maintenance and/or confinement of adjusted beam characteristics within an azimuthally asymmetric fiber. Thus, claimed subject matter is not limited to the examples provided herein. Moreover, any of a variety of first lengths of fiber (e.g., like those described above) may be combined with any azimuthally asymmetric second length of fiber (e.g., like those described in FIGS. 26-28).

FIG. 26 illustrates RIPs at various azimuthal angles of a cross-section through an elliptical fiber 2600. At a first azimuthal angle 2602, fiber 2600 has a first RIP 2604. At a second azimuthal angle 2606 that is rotated 45° from first azimuthal angle 2602, fiber 2600 has a second RIP 2608. At a third azimuthal angle 2610 that is rotated another 45° from second azimuthal angle 2606, fiber 2600 has a third RIP 2612. First, second and third RIPs 2604, 2608 and 2612 are all different.

FIG. 27 illustrates RIPs at various azimuthal angles of a cross-section through a multicore fiber 2700. At a first azimuthal angle 2702, fiber 2700 has a first RIP 2704. At a second azimuthal angle 2706, fiber 2700 has a second RIP 2708. First and second RIPs 2704 and 2708 are different. In an example, perturbation device 110 may act in multiple planes in order to launch the adjusted beam into different regions of an azimuthally asymmetric second fiber.

FIG. 28 illustrates RIPs at various azimuthal angles of a cross-section through a fiber 2800 having at least one crescent shaped core. In some cases, the corners of the crescent may be rounded, flattened, or otherwise shaped, which may minimize optical loss. At a first azimuthal angle 2802, fiber 2800 has a first RIP 2804. At a second azimuthal angle 2806, fiber 2800 has a second RIP 2808. First and second RIPs 2804 and 2808 are different.

Figure 22A:
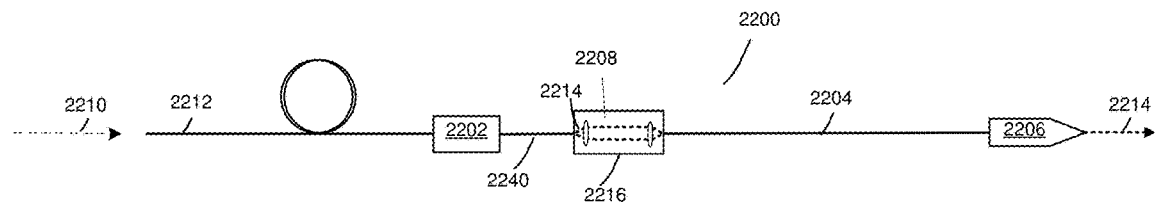
FIG. 22A illustrates an example laser system including a fiber assembly configured to provide variable beam characteristics disposed between a feeding fiber and process head.

FIG. 22A illustrates an example of a laser system 2200 including a VBC fiber assembly 2202 configured to provide variable beam characteristics. VBC fiber assembly 2202 comprises a first length of fiber 104, second length of fiber 108, and a perturbation device 110. VBC fiber assembly 2202 is disposed between feeding fiber 2212 (i.e., the output fiber from the laser source) and VBC delivery fiber 2240. VBC delivery fiber 2240 may comprise second length of fiber 108 or an extension of second length of fiber 108 that modifies, maintains, and/or confines adjusted beam characteristics. Beam 2210 is coupled into VBC fiber assembly 2202 via feeding fiber 2212. Fiber assembly 2202 is configured to vary the characteristics of beam 2210 in accordance with the various examples described above. The output of fiber assembly 2202 is adjusted beam 2214 which is coupled into VBC delivery fiber 2240. VBC delivery fiber 2240 delivers adjusted beam 2214 to free-space optics assembly 2208, which then couples beam 2214 into a process fiber 2204. Adjusted beam 2214 is then delivered to process head 2206 by process fiber 2204. The process head can include guided wave optics (such as fibers and fiber coupler), free space optics such as lenses, mirrors, optical filters, diffraction gratings), beam scan assemblies such as galvanometer scanners, polygonal mirror scanners, or other scanning systems that are used to shape the beam 2214 and deliver the shaped beam to a workpiece.

In laser system 2200, one or more of the free-space optics of assembly 2208 may be disposed in an FFC or other beam coupler 2216 to perform a variety of optical manipulations of an adjusted beam 2214 (represented in FIG. 22A with different dashing than beam 2210). For example, free-space optics assembly 2208 may preserve the adjusted beam characteristics of beam 2214. Process fiber 2204 may have the same RIP as VBC delivery fiber 2240. Thus, the adjusted beam characteristics of adjusted beam 2214 may be preserved all the way to process head 2206. Process fiber 2204 may comprise a RIP similar to any of the second lengths of fiber described above, including confinement regions.

FFCs can include one, two, or more lenses, but in typical examples, two lenses having are used. In most practical examples, the focal lengths of the two lenses result in a magnification between 0.8 and 1.2 (i.e., the ratio of the focal lengths of the lenses is between 0.8 and 1.2), although other values are possible and are sometimes used.

Figure 22B:
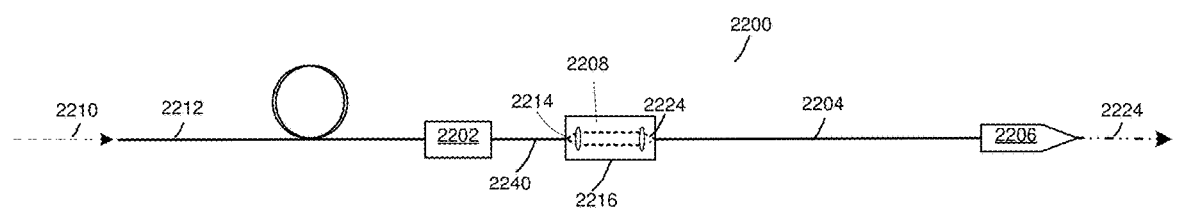
FIG. 22B illustrates an example a laser system including a fiber assembly configured to provide variable beam characteristics disposed between a feeding fiber and process head.

Alternatively, as illustrated in FIG. 22B, free-space optics assembly 2208 may change the adjusted beam characteristics of beam 2214 by, for example, increasing or decreasing the divergence and/or the spot size of beam 2214 (e.g., by magnifying or demagnifying beam 2214) and/or otherwise further modifying adjusted beam 2214. Furthermore, process fiber 2204 may have a different RIP than VBC delivery fiber 2240. Accordingly, the RIP of process fiber 2204 may be selected to preserve additional adjustment of adjusted beam 2214 made by the free-space optics of assembly 2208 to generate a twice adjusted beam 2224 (represented in FIG. 22B with different dashing than beam 2214).

Figure 23:
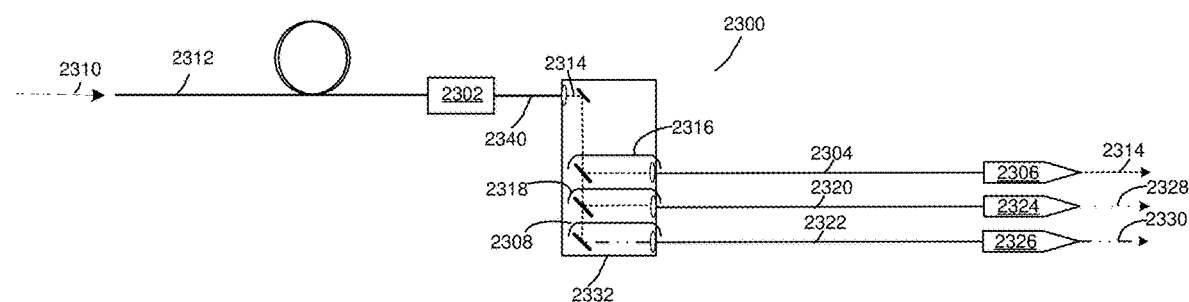
FIG. 23 illustrates an example laser system including a fiber assembly configured to provide variable beam characteristics disposed between a feeding fiber and multiple process fibers.

FIG. 23 illustrates an example of a laser system 2300 including VBC fiber assembly 2302 disposed between feeding fiber 2312 and VBC delivery fiber 2340. During operation, beam 2310 is coupled into VBC fiber assembly 2302 via feeding fiber 2312. Fiber assembly 2302 includes a first length of fiber 104, second length of fiber 108, and a perturbation device 110 and is configured to vary characteristics of beam 2310 in accordance with the various examples described above. Fiber assembly 2302 generates adjusted beam 2314 output by VBC delivery fiber 2340. VBC delivery fiber 2340 comprises a second length of fiber 108 of fiber for modifying, maintaining, and/or confining adjusted beam characteristics in a fiber assembly 2302 in accordance with the various examples described above (see FIGS. 17-21, for example). VBC delivery fiber 2340 couples adjusted beam 2314 into beam switch (FFS) 2332, which then couples its various output beams to one or more of multiple process fibers 2304, 2320, and 2322. Process fibers 2304, 2320, and 2322 deliver adjusted beams 2314, 2328, and 2330 to respective process heads 2306, 2324, and 2326.

In an example, beam switch 2332 includes one or more sets of free-space optics 2308, 2316, and 2318 configured to perform a variety of optical manipulations of adjusted beam 2314. Free-space optics 2308, 2316, and 2318 may preserve or vary adjusted beam characteristics of beam 2314. Thus, adjusted beam 2314 may be maintained by the free-space optics or adjusted further. Process fibers 2304, 2320, and 2322 may have the same or a different RIP as VBC delivery fiber 2340, depending on whether it is desirable to preserve or further modify a beam passing from the free-space optics assemblies 2308, 2316, and 2318 to respective process fibers 2304, 2320, and 2322. In other examples, one or more beam portions of beam 2310 are coupled to a workpiece without adjustment, or different beam portions are coupled to respective VBC fiber assemblies so that beam portions associated with a plurality of beam characteristics can be provided for simultaneous workpiece processing. Alternatively, beam 2310 can be switched to one or more of a set of VBC fiber assemblies.

Routing adjusted beam 2314 through any of free-space optics assemblies 2308, 2316, and 2318 enables delivery of a variety of additionally adjusted beams to process heads 2206, 2324, and 2326. Therefore, laser system 2300 provides additional degrees of freedom for varying the characteristics of a beam, as well as switching the beam between process heads ("time sharing") and/or delivering the beam to multiple process heads simultaneously ("power sharing").

For example, free-space optics in beam switch 2332 may direct adjusted beam 2314 to free-space optics assembly 2316 configured to preserve the adjusted characteristics of beam 2314. Process fiber 2304 may have the same RIP as VBC delivery fiber 2340. Thus, the beam delivered to process head 2306 will be a preserved adjusted beam 2314.

In another example, beam switch 2332 may direct adjusted beam 2314 to free-space optics assembly 2318 configured to preserve the adjusted characteristics of adjusted beam 2314. Process fiber 2320 may have a different RIP than VBC delivery fiber 2340 and may be configured with divergence altering structures as described with respect to FIGS. 20 and 21 to provide additional adjustments to the divergence distribution of beam 2314. Thus, the beam delivered to process head 2324 will be a twice adjusted beam 2328 having a different beam divergence profile than adjusted beam 2314.

Process fibers 2304, 2320, and/or 2322 may comprise a RIP similar to any of the second lengths of fiber described above, including confinement regions or a wide variety of other RIPs, and claimed subject matter is not limited in this regard.

In yet another example, free-space optics switch 2332 may direct adjusted beam 2314 to free-space optics assembly 2308 configured to change the beam characteristics of adjusted beam 2314. Process fiber 2322 may have a different RIP than VBC delivery fiber 2340 and may be configured to preserve (or alternatively further modify) the new further adjusted characteristics of beam 2314. Thus, the beam delivered to process head 2326 will be a twice adjusted beam 2330 having different beam characteristics (due to the adjusted divergence profile and/or intensity profile) than adjusted beam 2314.

In FIGS. 22A, 22B, and 23, the optics in the FFC or FFS may adjust the spatial profile and/or divergence profile by magnifying or demagnifying the beam 2214 before launching into the process fiber. They may also adjust the spatial profile and/or divergence profile via other optical transformations. They may also adjust the launch position into the process fiber. These methods may be used alone or in combination.

FIGS. 22A, 22B, and 23 merely provide examples of combinations of adjustments to beam characteristics using free-space optics and various combinations of fiber RIPs to preserve or modify adjusted beams 2214 and 2314. The examples provided above are not exhaustive and are meant for illustrative purposes only. Thus, claimed subject matter is not limited in this regard.

Figure 24:
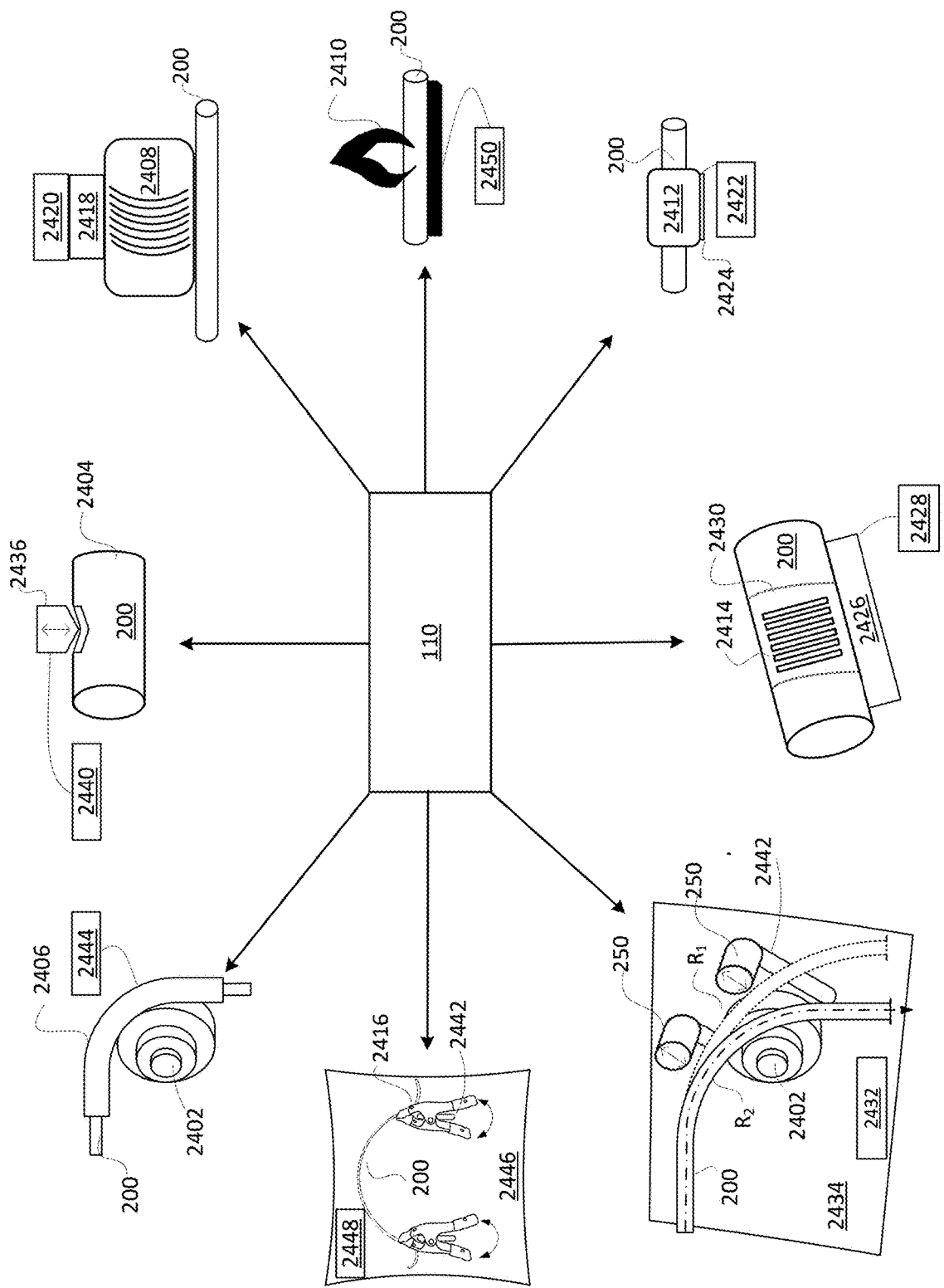
FIG. 24 illustrates examples of various perturbation assemblies for providing variable beam characteristics according to various examples provided herein.

FIG. 24 illustrates various examples of perturbation devices, assemblies or methods (for simplicity referred to collectively herein as "perturbation device 110") for perturbing a VBC fiber 200 and/or an optical beam propagating in VBC fiber 200 according to various examples provided herein. Perturbation device110 may be any of a variety of devices, methods, and/or assemblies configured to enable adjustment of beam characteristics of a beam propagating in VBC fiber 200. In an example, perturbation device 110 may be a mandrel 2402, a micro-bend 2404 in the VBC fiber, flexible tubing 2406, an acousto-optic transducer 2408, a thermal device 2410, a piezo-electric device 2412, a grating 2414, a clamp 2416 (or other fastener), or the like, or any combination thereof. These are merely examples of perturbation devices 100 and not an exhaustive listing of perturbation devices 100 and claimed subject matter is not limited in this regard.

Mandrel 2402 may be used to perturb VBC fiber 200 by providing a form about which VBC fiber 200 may be bent. As discussed above, reducing the bend radius of VBC fiber 200 moves the intensity distribution of the beam radially outward. In some examples, mandrel 2402 may be stepped or conically shaped to provide discrete bend radii levels. Alternatively, mandrel 2402 may comprise a cone shape without steps to provide continuous bend radii for more granular control of the bend radius. The radius of curvature of mandrel 2402 may be constant (e.g., a cylindrical form) or non-constant (e.g., an oval-shaped form). Similarly, flexible tubing 2406, clamps 2416 (or other varieties of fasteners), or rollers 250 may be used to guide and control the bending of VBC fiber 200 about mandrel 2402. Furthermore, changing the length over which the fiber is bent at a particular bend radius also may modify the intensity distribution of the beam. VBC fiber 200 and mandrel 2402 may be configured to change the intensity distribution within the first fiber predictably (e.g., in proportion to the length over which the fiber is bent and/or the bend radius). Rollers 250 may move up and down along a track 2442 on platform 2434 to change the bend radius of VBC fiber 200.

Clamps 2416 (or other fasteners) may be used to guide and control the bending of VBC fiber 200 with or without a mandrel 2402. Clamps 2416 may move up and down along a track 2442 or platform 2446. Clamps 2416 may also swivel to change bend radius, tension, or direction of VBC fiber 200. Controller 2448 may control the movement of clamps 2416.

In another example, perturbation device 110 may be flexible tubing 2406 and may guide bending of VBC fiber 200 with or without a mandrel 2402. Flexible tubing 2406 may encase VBC fiber 200. Tubing 2406 may be made of a variety of materials and may be manipulated using piezoelectric transducers controlled by controller 2444. In another example, clamps or other fasteners may be used to move flexible tubing 2406.

Micro-bend 2404 in VBC fiber is a local perturbation caused by lateral mechanical stress on the fiber. Microbending can cause mode coupling and/or transitions from one confinement region to another confinement region within a fiber, resulting in varied beam characteristics of the beam propagating in a VBC fiber 200. Mechanical stress may be applied by an actuator 2436 that is controlled by controller 2440. However, this is merely an example of a method for inducing mechanical stress in fiber 200 and claimed subject matter is not limited in this regard.

Acousto-optic transducer (AOT) 2408 may be used to induce perturbation of a beam propagating in the VBC fiber using an acoustic wave. The perturbation is caused by the modification of the refractive index of the fiber by the oscillating mechanical pressure of an acoustic wave. The period and strength of the acoustic wave are related to the acoustic wave frequency and amplitude, allowing dynamic control of the acoustic perturbation. Thus, a perturbation assembly 110 including AOT 2408 may be configured to vary the beam characteristics of a beam propagating in the fiber. In an example, piezo-electric transducer 2418 may create the acoustic wave and may be controlled by controller or driver 2420. The acoustic wave induced in AOT 2408 may be modulated to change and/or control the beam characteristics of the optical beam in VBC 200 in real-time. However, this is merely an example of a method for creating and controlling an AOT 2408 and claimed subject matter is not limited in this regard.

Thermal device 2410 may be used to induce perturbation of a beam propagating in VBC fiber using heat. The perturbation is caused by the modification of the RIP of the fiber induced by heat. Perturbation may be dynamically controlled by controlling an amount of heat transferred to the fiber and the length over which the heat is applied. Thus, a perturbation assembly 110 including thermal device 2410 may be configured to vary a range of beam characteristics. Thermal device 2410 may be controlled by controller 2450.

Piezo-electric transducer 2412 may be used to induce perturbation of a beam propagating in a VBC fiber using piezoelectric action. The perturbation is caused by the modification of the RIP of the fiber induced by a piezoelectric material attached to the fiber. The piezoelectric material in the form of a jacket around the bare fiber may apply tension or compression to the fiber, modifying its refractive index via the resulting changes in density. Perturbation may be dynamically controlled by controlling a voltage to the piezo-electric device 2412. Thus, a perturbation assembly 110 including piezo-electric transducer 2412 may be configured to vary the beam characteristics over a particular range.

In an example, piezo-electric transducer 2412 may be configured to displace VBC fiber 200 in a variety of directions (e.g., axially, radially, and/or laterally) depending on a variety of factors, including how the piezo-electric transducer 2412 is attached to VBC fiber 200, the direction of the polarization of the piezo-electric materials, the applied voltage, etc. Additionally, bending of VBC fiber 200 is possible using the piezo-electric transducer 2412. For example, driving a length of piezo-electric material having multiple segments comprising opposing electrodes can cause a piezoelectric transducer 2412 to bend in a lateral direction. Voltage applied to piezoelectric transducer 2412 by electrode 2424 may be controlled by controller 2422 to control displacement of VBC fiber 200. Displacement may be modulated to change and/or control the beam characteristics of the optical beam in VBC 200 in real-time. However, this is merely an example of a method of controlling displacement of a VBC fiber 200 using a piezo-electric transducer 2412 and claimed subject matter is not limited in this regard.

Gratings 2414 may be used to induce perturbation of a beam propagating in a VBC fiber 200. A grating 2414 can be written into a fiber by inscribing a periodic variation of the refractive index into the core. Gratings 2414 such as fiber Bragg gratings can operate as optical filters or as reflectors. A long-period grating can induce transitions among co-propagating fiber modes. The radiance, intensity profile, and/or divergence profile of a beam comprised of one or more modes can thus be adjusted using a long-period grating to couple one or more of the original modes to one or more different modes having different radiance and/or divergence profiles. Adjustment is achieved by varying the periodicity or amplitude of the refractive index grating. Methods such as varying the temperature, bend radius, and/or length (e.g., stretching) of the fiber Bragg grating can be used for such adjustment. VBC fiber 200 having gratings 2414 may be coupled to stage 2426. Stage 2426 may be configured to execute any of a variety of functions and may be controlled by controller 2428. For example, stage 2426 may be coupled to VBC fiber 200 with fasteners 2430 and may be configured to stretch and/or bend VBC fiber 200 using fasteners 2430 for leverage. Stage 2426 may have an embedded thermal device and may change the temperature of VBC fiber 200.

FIG. 25 illustrates an example process 2500 for adjusting and/or maintaining beam characteristics within a fiber without the use of free-space optics to adjust the beam characteristics. In block 2502, a first length of fiber and/or an optical beam are perturbed to adjust one or more optical beam characteristics. Process 2500 moves to block 2504, where the optical beam is launched into a second length of fiber. Process 2500 moves to block 2506, where the optical beam having the adjusted beam characteristics is propagated in the second length of fiber. Process 2500 moves to block 2508, where at least a portion of the one or more beam characteristics of the optical beam are maintained within one or more confinement regions of the second length of fiber. The first and second lengths of fiber may be comprised of the same fiber, or they may be different fibers.

The above VBC device can be coupled to any optical source to enable modification of beam characteristics. Thus, such a VBC device is associated with minimal changes to the optical source. For example, for a fiber-coupled diode laser, solid-state laser, or fiber laser, the output fiber, output optical connector, operating software, and/or a laser safety interlock system need not be altered. Such alterations would be prohibitively complicated in the application of high power lasers. Optical fibers used to couple high power laser outputs typically include a connector (or connector assembly) that is precisely positioned with respect to the laser beam and provided with cooling or protective materials. In some cases, fiber splices subject to high optical powers require protection, and recoating, potting, or other protective measures are needed. In other cases, splices and/or connectors are monitored to assess scattered or other optical power levels, or to determined connector, optical fiber, or splice temperature with one or more detectors, thermistors, or other devices. High power systems also include a safety interlock that is activated in response to optical power in the output optical fiber and any disturbance to the output optical fiber can require modifications to the safety interlock. Finally, such disturbances can result in unsafe optical powers at various locations in the laser system, produce optical damage, void warranties, or cause other types of safety concerns such as fire.

Figure 29:
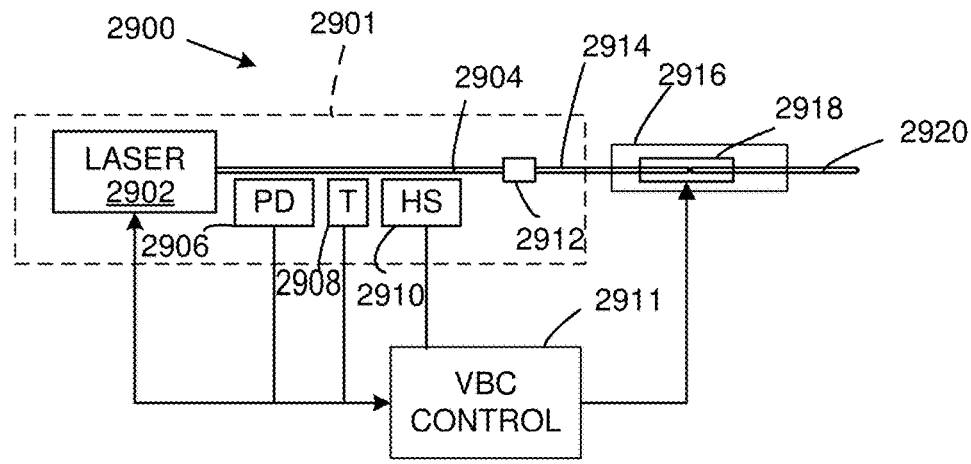
FIG. 29 illustrates a laser system having an output fiber that is spliced to an input fiber of a beam modification system.

Referring to FIG. 29, an optical system 2900 includes a laser system 2901 that includes a laser 2902 that couples an optical beam to an integral output fiber 2904. The laser system 2901 generally produces an output beam via the output fiber 2904 having predetermined characteristics. As shown schematically, the output fiber 2904 is coupled to one or more of a temperature sensor 2908 such as thermistor (T), a photodetector (PD) 2906 that is situated to detect portions of optical beams propagating in one or more of a core, cladding, coating, or other protective or shielding coating or enclosure associated with the output fiber 2904, or a temperature control device 2910 such as a heat sink (HS). The photodetector 2906, temperature sensor 2908, and heat sink 2910 are coupled to a controller 2911 that regulates temperature, optical beam powers, and typically provides safety interlock so that the laser 2902 is deactivated in response to optical powers detected by the photodetector 2906 that are not within ranges that are safe for personnel or within reliability or damage limits associated with laser operation. The fiber 2904 is generally situated to receive an optical beam from the laser 2902 to avoid operational problems, and is preferably coupled to the laser 2902 by a manufacturer. Disturbances of the optical fiber 2904 (such as adding or removing an optical connector, optically splicing, or shortening the optical fiber 2904) typically cause operational differences that are significant enough that the controller 2911 is no longer able to detect potential unsafe or destructive operating conditions, and differences can cause triggering of safety interlocks so that the laser system 2901 ceases to produce the optical beam.

As shown in FIG. 29, the laser system 2900 includes an optical splice 2912 that couples the output fiber 2904 to a first fiber 2914 that is adapted to serve as part of a VBC device 2916. The optical splice 2912 and the first fiber 2914 are generally coupled to the laser 2902 during laser manufacturing or otherwise during factory assembly. In some cases, the optical splice 2912 and the first fiber 2914 need not alter laser beam spatial profile, but serve to provide suitable connection to the VBC device 2916 that includes a perturbation unit 2918 and a second fiber 2920. Typically, the VBC device 2916 is coupled to the controller 2911 so that modulations or attenuations are selected with the controller 2911. In other examples, the VBC device 2916 is manually controlled.

As noted above, while optical splices can be used to couple high power lasers to VBC devices as illustrated in FIG. 29, splice characteristics must generally be tightly controlled to avoid optical damage at the splice, back reflection to the laser 2902, and to avoid unsafe optical beam leakage. If any such splice characteristics would tend to induce such failures or dangerous conditions, the controller 2911 is generally configured to detect such conditions and control the laser 2902 appropriately. Detection of such conditions typically requires that the output fiber 2904 and its coupling to the laser 2902 remain undisturbed from original factory settings. Changes to the laser 2902, the output fiber 2904, or the interlock provided by the controller 2911 in response to installation of a splice are undesirable, and are difficult or impossible to implement satisfactorily by laser system users. Thus factory installation (splicing) of the first fiber 2914 to the laser output fiber 2904 avoids the need to make laser adjustments in the field. In alternative examples, the laser output fiber 2904 can be selected as appropriate for subsequent beam profile adjustment, but such a replacement can be undesirable due to possible impacts on laser production.

With a suitable fiber 2914 spliced to the laser 2902, a user can situate the first fiber 2914 as needed with respect to the perturbation assembly 2918 and the second fiber 2920. The first fiber 2914 and the output fiber 2904 can be optically coupled with a fusion splice 2912 (or otherwise optically coupled). While these additional couplings can cause additional complications, the basic configuration of the laser 2902 is not changed, and thermal, optical, and other monitoring and control by the controller 2911 can continue. However, the fusion splice 2912 must generally be introduced by a laser manufacturer or supplier to permit safety interlocks and monitoring systems to work reliably. In most practical examples, fusion splicing by users outside of such a setting is not satisfactory.

Figure 30:
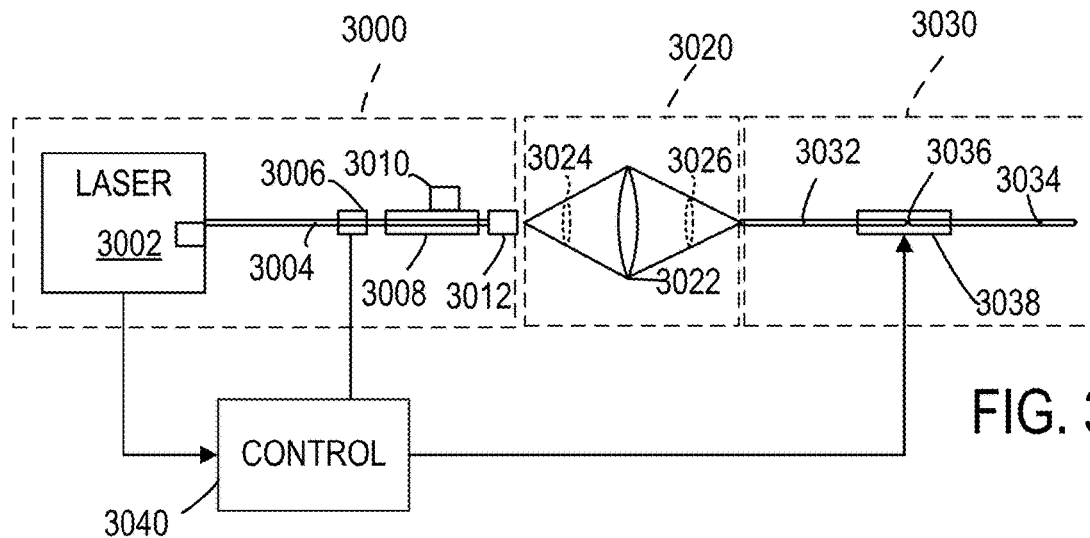
FIG. 30 illustrates a laser system having an output fiber coupled to an input fiber of a beam modification system by a fiber-to-fiber coupler (FFC).

In an alternative example illustrated in FIG. 30, a laser system 3000 includes a laser 3002 that couples a laser beam to a laser output fiber 3004. In this example, the optical fiber 3004 is coupled to a photodetector 3006 and a heat sink 3008 whose temperature can be monitored with thermistor 3010 or other thermal sensor. In some cases, a thermoelectric cooler or other cooling device can be coupled to the laser output fiber 3004. The laser output fiber 3004 terminates at an optical connector 3012.

A FFC 3020 is optically coupled to laser output fiber 3004 at a fiber surface provided in the optical connector 3012. The FFC 3020 includes a lens 3022 that receives a diverging beam 3024 from the connector 3012 and couples a converging beam 3026 into an input optical fiber 3032 of a VBC device 3030. The lens 3022 can be situated so that the diverging beam 3024 and the converging beam 3026 have different beam numerical apertures to, for example, accommodate different fiber numerical apertures. The input optical fiber 3032 is optically coupled to an output optical fiber 3034, and at least one of the optical fibers 3032, 3034 is coupled to a perturbation assembly 3038 that produces a perturbation in a beam characteristic in response to a control signal from a controller 3040. The perturbation assembly 3038, the input optical fiber 3032, and the output optical fiber 3034 can be any of those in any of the embodiments described above. Typically, perturbation of one or both of the optical fibers 3032, 3034 is applied at or near a coupling 3036 such as a fusion splice, a butt-coupling, or a proximity coupling.

The FFC 3020 permits the VBC device 3030 to be coupled to the laser 3002 without disturbing sensors, interlocks, and optical control of the laser system 3000. As noted above, direct coupling of the laser output fiber 3004 to the input fiber 3032 of the VBC device 3030 can be associated with heating, reflections, or other operational changes that are generally undesirable with high power lasers, and are difficult to accommodate, especially at user installations.

Figure 31:
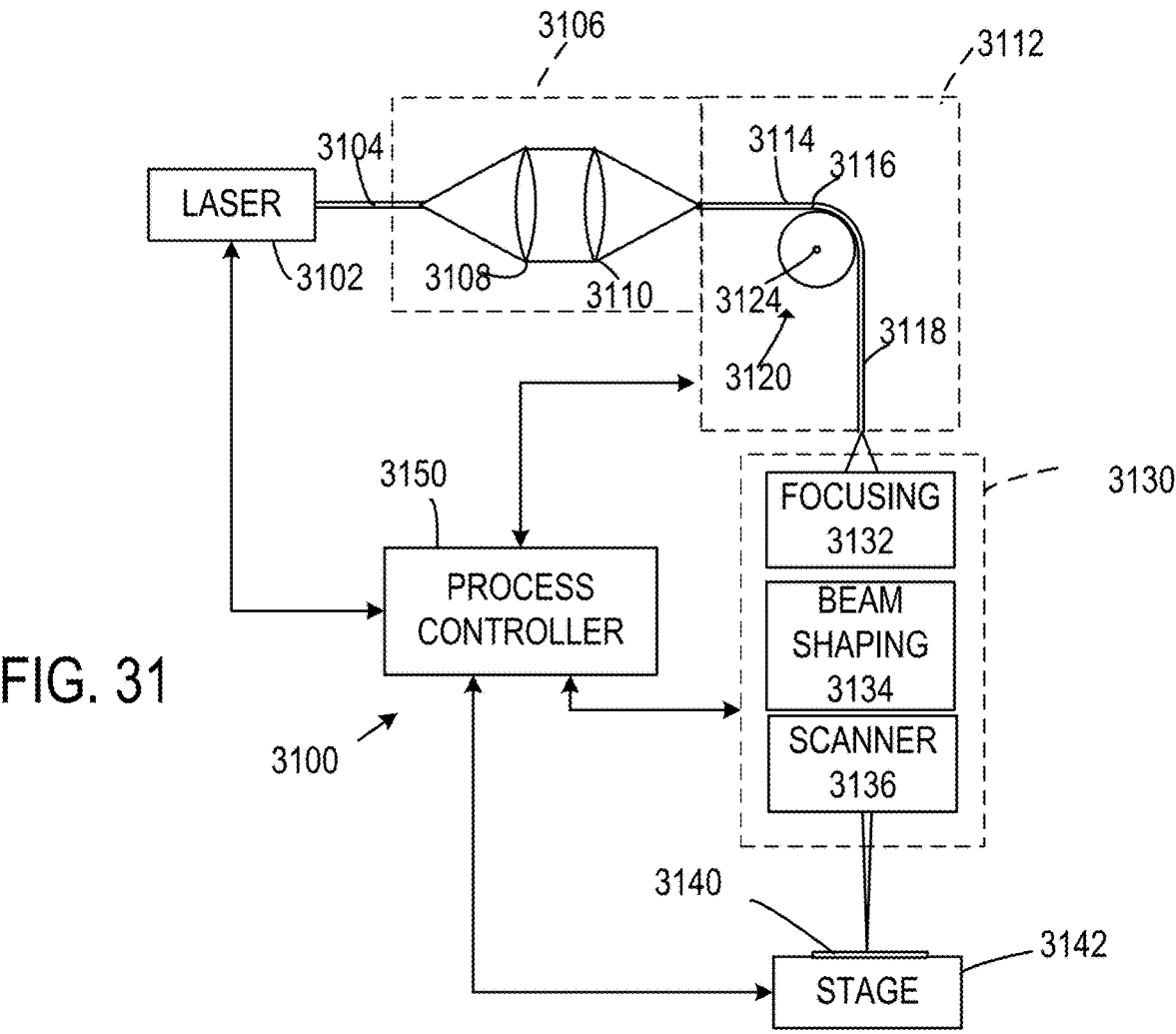
FIG. 31 illustrates a laser processing system that includes an FFC that couples a laser output beam to a beam modification system and an optical system that delivers a shape-modified optical beam to one or more selected target areas.

FIG. 31 illustrates a processing system 3100 that includes a laser 3102 that couples a processing beam to an optical fiber 3104. An FFC 3106 that includes lenses 3108, 3110 receives the processing beam and couples the processing beam to an input fiber 3114 of a VBC device 3112. An output fiber 3118 is situated to receive the processing beam from an interface region 3116 and direct a shaped processing beam to laser processing optics 3130. The VBC device 3112 includes a drum 3120 that is rotatable about an axis 3124. One or both of the input fiber 3114 and the output fiber 3118 contact or are otherwise deformable in response to rotations of the drum 3120 to produce variable beam perturbations.

The shaped beam is directed to the laser processing optics 3130 that include focusing optics 3132, additional beam shaping optics 3134 such as beam expanders, anamorphic lenses, anamorphic prisms, or other optical elements, and a scanner 3136 that scans the shaped beam to one or more locations on a substrate 3140. The scanner 3136 can include one or more polygonal mirrors, galvanometer, electro-optic, acousto-optic, or other beam scanning systems or elements. The substrate 3140 is typically retained by a substrate stage 3142 that can vary the position of the substrate 3140 with respect to the shaped beam. A processor controller 3150 is coupled to the laser 3102, the VBC device 3112, the laser processing optics 3130, and the substrate stage 3142 for control of laser beam power, repetition rate, wavelength, pulse length, state of polarization, beam focus location and size, beam shape, scanner areas and rates, dwell times at scanned locations, and translations of the substrate 3140 via the substrate stage. During processing of any particular substrate, multiple values of any of these parameters may be needed. For example, the process controller 3150 can be coupled to the VBC device 3112 to produce beams of different sizes and shapes for different process steps, or to vary beam shape and size during one or more process steps.

Figure 32:
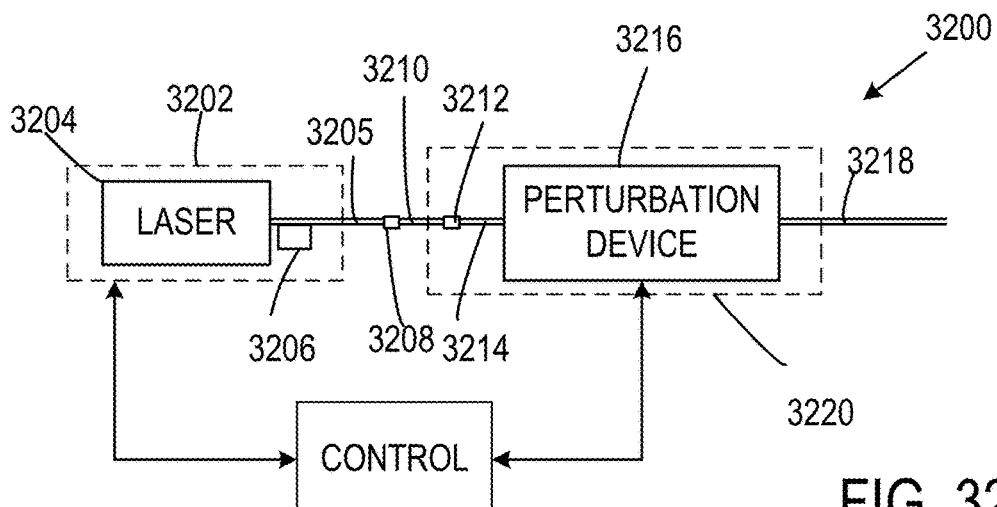
FIG. 32 illustrates a laser system having an output fiber that is spliced to a beam modification system having serially connected input fibers.

Referring to FIG. 32, a laser processing system 3200 includes a laser system 3202 having a laser 3204 that is coupled to direct an optical beam into a laser output fiber 3205. A photodiode, thermistor, heat sink or other monitoring or protective device 3206 is coupled to the laser 3204 or the laser output fiber 3205 to provide, for example, a safety interlock. The laser output fiber 3205 is coupled to a first input fiber 3210 of a VBC device 3220 with a splice 3208 or with optical connectors. The first input fiber 3210 is selected to have a core diameter and numerical aperture that are substantially the same as that of the laser output fiber 3205, and a connector can be selected based on an installed connector on the laser output fiber 3205. The VBC device 3220 also includes a second input fiber 3214 coupled to the first input fiber 3210 with a splice 3212 or other coupler. A perturbation device 3216 is in contact with or proximate at least one of the second input fiber 3214 and a beam output fiber 3218. A controller 3230 is coupled to the VBC device 3220 and the laser system 3202. The splice 3212 can be provided in a controlled setting, and the second input fiber 3212 can be selected as needed for beam characteristic perturbations, and typically has a RIP as described above.

Figure 33:
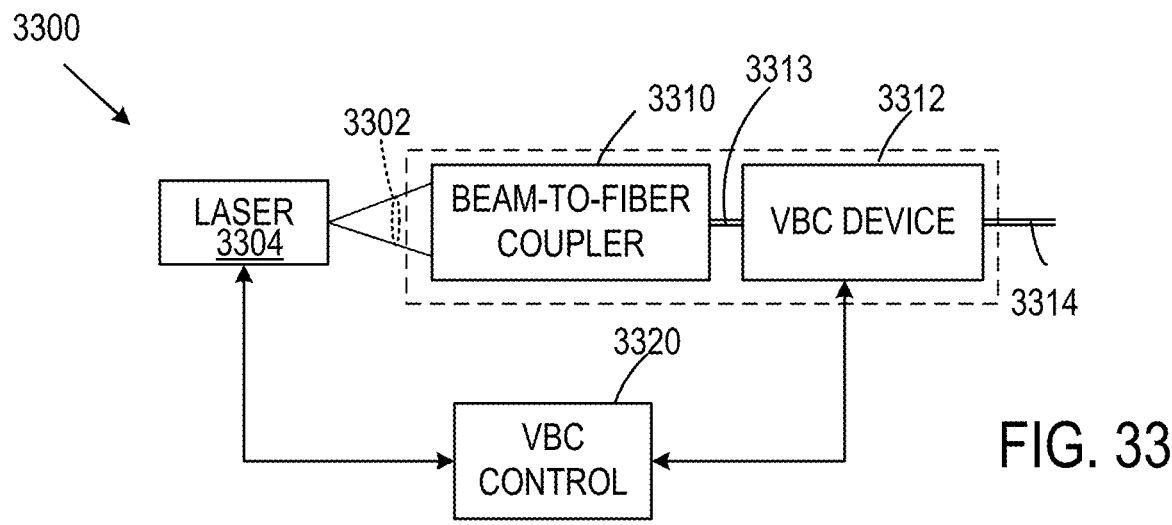
FIG. 33 illustrates a laser system in which an unguided laser beam is coupled to a VBC device.
Figure 34:
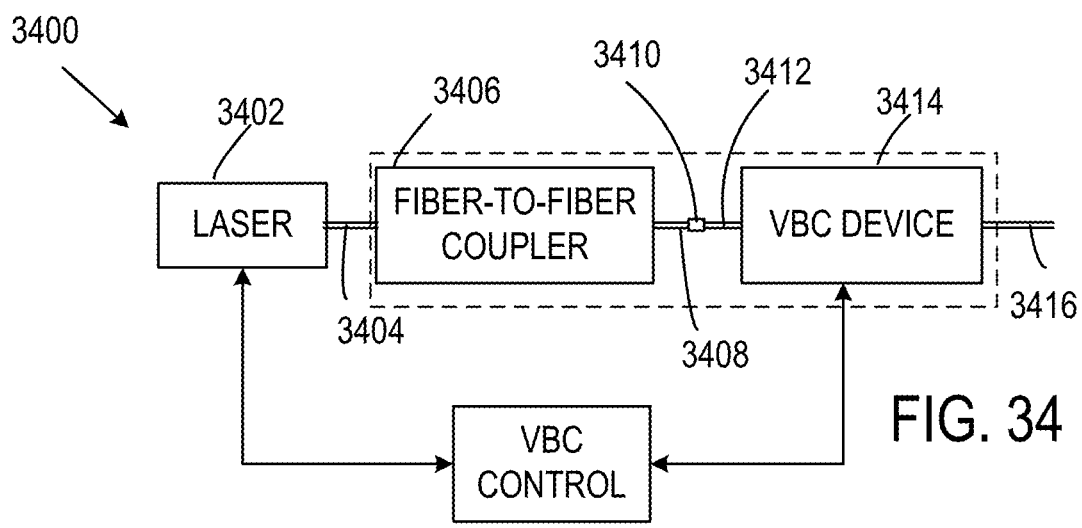
FIG. 34 illustrates a laser system in which a laser is coupled to an FFC which is then coupled to a VBC device.

With reference to FIG. 33, a laser system 3300 includes a laser 3304 that produces a beam 3302 that is directed to a beam-to-fiber coupler 3310 that typically includes a lens situated to receive the beam 3202 and focus the beam 3202 into an input fiber 3313 of a VBC device 3312. Based on a control signal from a VBC controller 3320, a beam having preferred beam characteristics is output via an output fiber 3314. This arrangement tends to reduce interactions of the VBC device 3312 and other components with the laser 3304. Referring to FIG. 34, a laser 3402 directs a laser beam to a fiber 3404 which is coupled to an FFC 3406. The FFC 3406 shapes the beam from the laser 3402 for coupling to an output fiber 3408. The output beam of the FFC 3406 is coupled by the output fiber 3408 to a splice 3410 (or other coupling) and to an input fiber 3412 of a VBC device 3414. An output fiber 3416 of the VBC device 3414 couples a shaped output beam to a target or additional optics with a beam profile as controlled by the VBC device 3414.

Figure 35:
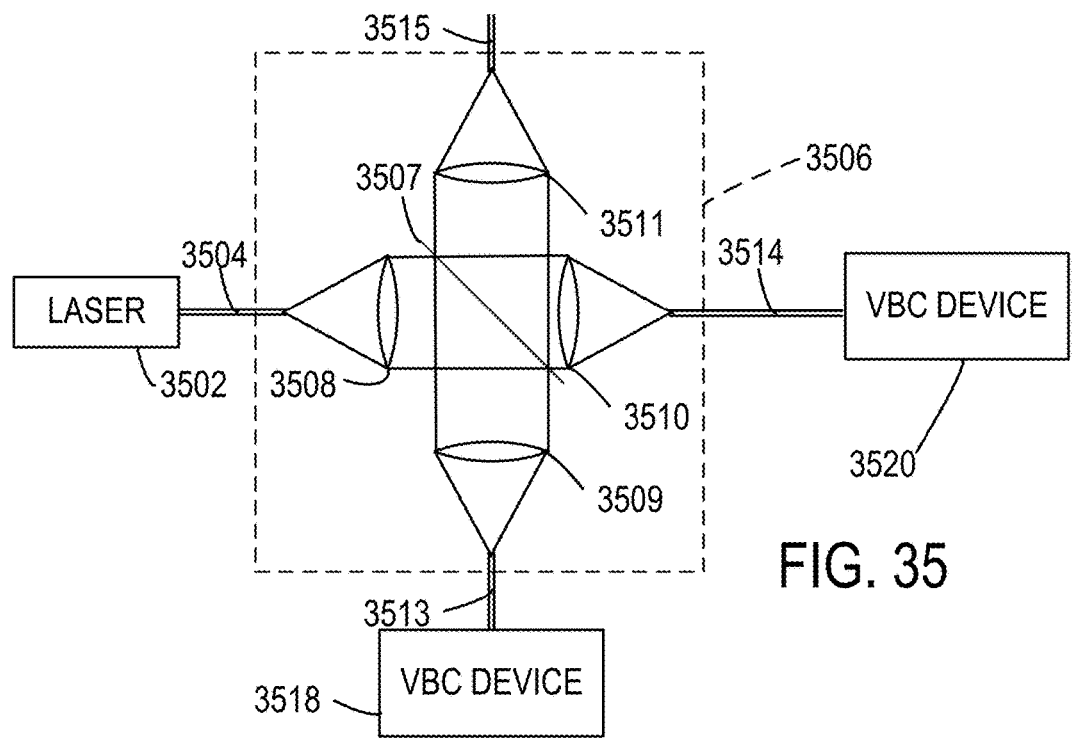
FIG. 35 illustrates a laser system that includes a fiber-to-fiber switch that selectively couples a laser beam to one or more VBC devices.

Referring to FIG. 35, a laser 3502 directs a beam via a fiber 3504 to a fiber-to-fiber switch (FFS) 3506. The FFS 3506 includes an input lens 3508 that is switchably coupled to lenses 3509, 3510, 3511 that can couple the beam or portions of the beam to respective fibers 3513, 3514, 3515 as selected based on a position of a reflector 3507. As shown in FIG. 35, VBC devices 3518, 3520 are coupled to fibers 3513, 3514 so that beam shapes can be independently selected. In other examples, the laser 3502 does not include an output fiber, and a free space or other unguided beam can be directed to the input lens 3508.

Figure 36:
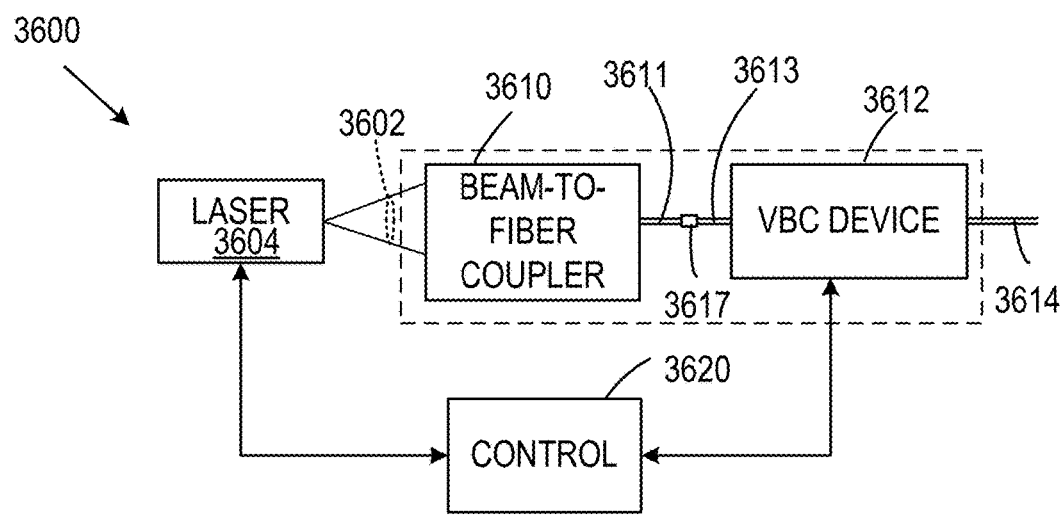
FIG. 36 illustrates an alternative laser system in which an unguided laser beam is coupled to a VBC device.

With reference to FIG. 36, a laser system 3600 includes a laser 3604 that produces a beam 3602 that is directed to a beam-to-fiber coupler 3610 that typically includes a lens situated to receive the beam 3602 and focus the beam 3602 into a first fiber 3611 that is coupled to an input fiber 3613 of a VBC device 3612 with an optical splice 3617. Based on a control signal from a beam controller 3620, a beam having a preferred beam shape is output via an output fiber 3614. This arrangement tends to reduce interactions of the VBC device 3612 and other components with the laser 3604.

With the configurations described above, control and sensor components for verifying and establishing safe or reliable laser operation such as those coupled to a laser output connector or output fiber can continue to operate as connected to fiber-based beam shapers.

Having described and illustrated the general and specific principles of examples of the presently disclosed technology, it should be apparent that the examples may be modified in arrangement and detail without departing from such principles. We claim all modifications and variation coming within the spirit and scope of the following claims.

We claim:

1. An apparatus, comprising:
a beam coupler situated to receive an input beam and produce an output beam, wherein an optical path defined by the beam coupler includes a free space portion; and
a variable beam characteristics (VBC) device that includes an input fiber, a perturbation assembly, and an output fiber having at least two confinement regions, the input fiber optically coupled to the output fiber, the input fiber and the output fiber forming at least a portion of a continuous length of fiber, wherein the perturbation assembly is coupled to at least one of the input fiber and the output fiber to modify two or more beam characteristics of the output beam received from the beam coupler so that the output fiber delivers a modified beam, wherein the output fiber has a refractive index profile that preserves at least a portion of the two or more beam characteristics modified by the perturbation assembly.

2. The apparatus of claim 1, wherein a refractive index profile (RIP) of the input fiber is different from an RIP of the output fiber.

3. The apparatus of claim 2, wherein the beam coupler comprises at least one lens situated to direct the output beam from the beam coupler to the input fiber of the VBC device.

4. The apparatus of claim 3, wherein the at least one lens of the beam coupler includes a first lens and a second lens, the first lens situated to receive an unguided input optical beam and deliver a collimated optical beam to the second lens, the second lens situated to focus the collimated optical beam to the input fiber of the VBC device.

5. The apparatus of claim 1, wherein the beam coupler comprises a fiber-to-fiber coupler (FFC) that includes at least one lens situated to receive an optical beam from an optical fiber and direct the optical beam from the optical fiber to the input fiber of the VBC device.

6. The apparatus of claim 5, wherein the at least one lens of the FFC includes a first lens and a second lens, the first lens situated to receive the optical beam from the optical fiber and deliver a collimated optical beam to the second lens, the second lens situated to focus the collimated optical beam to the input fiber of the VBC device.

7. The apparatus of claim 6, further comprising a beam delivery fiber coupled to provide the output beam from the beam coupler to the input fiber of the VBC device, the beam delivery fiber having an RIP different from the RIP of the input fiber of the VBC device.

8. The apparatus of claim 5, further comprising a beam delivery fiber coupled to provide the output beam from the beam coupler to the input fiber of the VBC device, the beam delivery fiber having an RIP different from an RIP of the input fiber of the VBC device.

9. The apparatus of claim 1, wherein the beam coupler includes a beam delivery fiber situated to receive the output optical beam, wherein the beam delivery fiber is coupled to the input fiber of the VBC device.

10. The apparatus of claim 1, wherein the one or more beam characteristics include beam diameter, divergence distribution, beam parameter product (BPP), intensity distribution, luminance, $M^2$ value, numerical aperture (NA), optical intensity, power density, radial beam position, radiance, or spot size, or any combination thereof.

11. A method, comprising:
receiving an optical beam and allowing the optical beam to propagate as an unguided beam; and
coupling the propagating unguided beam to the apparatus of claim 1, wherein the propagating unguided beam is directed to the beam coupler.

12. The method of claim 11, wherein the optical beam is received from a fiber.

13. The method of claim 11, wherein the input optical beam is an unguided optical beam.

14. The method of claim 11, wherein the optical beam is an unguided optical beam, and further comprising collimating the optical beam with a first lens and directing the collimated beam to the beam coupler.

15. An apparatus, comprising:
a beam delivery system optically coupled to receive a laser beam, the beam delivery system comprising an input fiber, an output fiber optically coupled to the input fiber, wherein the input fiber and the output fiber from at least a portion of a continuous length of fiber, and a perturbation assembly coupled to at least one of the input fiber and the output fiber to modify one or more beam characteristics of the laser beam received and deliver a modified laser beam from the output fiber, the input fiber and the output fiber having different RIPs, wherein the output fiber has a RIP that defines at least two confinement regions and preserves at least a portion of the one or more beam characteristics as modified by the perturbation assembly, and the beam delivery system defines an optical path that includes a free space portion.

16. The apparatus of claim 15, further comprising a FFC situated to receive the laser beam and couple the laser beam to the input fiber, wherein the FFC defines the free space portion of the optical path.

17. The apparatus of claim 16, further comprising a laser input fiber situated to receive the laser beam and couple the laser beam to the FFC.

18. The apparatus of claim 17, further comprising a beam delivery fiber that is optically coupled to the output fiber, wherein the input fiber, the output, fiber, and the beam delivery fiber have different RIPs.

19. The apparatus of claim 15, further comprising a fiber-to-fiber switch so that the input fiber is switchably coupled to receive the laser beam from the laser, wherein the free space portion of the optical path is defined by the fiber-to-fiber optical switch.

20. The apparatus of claim 15, further comprising:
a laser situated to provide a laser beam at a laser output fiber, wherein the beam delivery system includes a FFC situated to receive the laser beam from the laser, the FFC includes a first lens situated to collimate the laser beam from the laser output fiber and a second lens situated to direct the collimated laser beam to the input fiber, wherein an RIP of the laser output fiber is different from the RIP of the input fiber, wherein the one or more beam characteristics include beam diameter, divergence distribution, beam parameter product (BPP), intensity distribution, luminance, $M^2$ value, numerical aperture (NA), optical intensity, power density, radial beam position, radiance, or spot size, or any combination thereof.

21. The apparatus of claim 20, wherein a focal length of the first lens is different than a focal length of the second lens.

22. The apparatus of claim 15, wherein the perturbation assembly is coupled to the output fiber.

23. The apparatus of claim 17, further comprising a beam delivery fiber that is optically coupled to the output fiber, wherein two or more of the input fiber, the output, fiber, and the beam delivery fiber have a common RIP.

* * * * *